US011424777B2

(12) United States Patent
Cyzs

(10) Patent No.: US 11,424,777 B2
(45) Date of Patent: Aug. 23, 2022

(54) METHODS AND SYSTEMS FOR MITIGATION OF INTERFERENCE SIGNALS FOR A WIRELESS NETWORK RECEIVER

(71) Applicant: Ubiqam Ltd., Petach-Tikva (IL)

(72) Inventor: Baruch Cyzs, Kiryat-Motzkin (IL)

(73) Assignee: Ubiqam Ltd., Petach-Tikva (IL)

(*) Notice: Subject to any disclaimer, the term of this patent is extended or adjusted under 35 U.S.C. 154(b) by 0 days.

(21) Appl. No.: 17/251,839

(22) PCT Filed: Jun. 14, 2019

(86) PCT No.: PCT/IL2019/050674
§ 371 (c)(1),
(2) Date: Dec. 14, 2020

(87) PCT Pub. No.: WO2019/239418
PCT Pub. Date: Dec. 19, 2019

(65) Prior Publication Data
US 2021/0258029 A1 Aug. 19, 2021

Related U.S. Application Data

(60) Provisional application No. 62/684,771, filed on Jun. 14, 2018.

(51) Int. Cl.
*H04B 1/10* (2006.01)
(52) U.S. Cl.
CPC ................. *H04B 1/1036* (2013.01)
(58) Field of Classification Search
CPC ...................................................... H04B 1/1036
(Continued)

(56) References Cited

U.S. PATENT DOCUMENTS 3,699,444 A 10/1972 Ghose et al.
5,894,473 A * 4/1999 Dent ...................... H04J 13/00
370/342
(Continued)

FOREIGN PATENT DOCUMENTS

WO WO 2016/206893 12/2016

OTHER PUBLICATIONS

International Preliminary Report on Patentability dated Dec. 24, 2020 From the International Bureau of WIPO Re. Application No. PCT/IL2019/050674. (7 Pages).
(Continued)

*Primary Examiner* — Kevin M Burd

(57) ABSTRACT

There is provided a mitigation module for mitigating interference complementing a receiver of a wireless network, comprising: at least one processor executing a code for: obtaining digital baseband signals received by a plurality of reception sources, matching at least a portion of a signature signal to at least a portion of the baseband signals, the signature signal indicative of a presence of interference signals originating from at least one external interference source, calculating a plurality of mitigation weights for at least the portion of the baseband signal corresponding to the matched at least portion of the signature signal, performing an interference mitigation process on the digital baseband signals received from the plurality of reception sources using the plurality of mitigation weights to generate clean digital baseband signals, and providing the clean digital baseband signals to a receiver of the wireless network.

23 Claims, 30 Drawing Sheets

(58) Field of Classification Search
USPC .......................................................... 375/346
See application file for complete search history.

(56) References Cited

U.S. PATENT DOCUMENTS

| | | | |
|---|---|---|---|
| 9,137,083 B1* | 9/2015 | Lu | ........................ H04L 27/2663 |
| 9,496,904 B2 | 11/2016 | Cys et al. | |
| 2002/0136331 A1 | 9/2002 | Wilhelmsson et al. | |
| 2006/0030287 A1* | 2/2006 | Vanderhelm | ........... H04B 1/126 |
| | | | 455/296 |
| 2009/0086863 A1 | 4/2009 | Komninakis et al. | |
| 2010/0323653 A1 | 12/2010 | Sullivan | |
| 2015/0003226 A1* | 1/2015 | Bernard | ................ H04W 24/08 |
| | | | 370/210 |
| 2015/0381221 A1* | 12/2015 | Cyzs | ................. H04W 72/0453 |
| | | | 375/346 |

OTHER PUBLICATIONS

International Search Report and the Written Opinion dated Sep. 23, 2019 From the International Searching Authority Re. Application No. PCT/IL2019/050674. (12 Pages).

* cited by examiner

DI implementation in partial time signature $$m_M^* = \operatorname{argmax}_m \left| \sum_{i=0}^{N-1} Y[i+m] S_M^*[i] \right|^2$$

where $i$ is time index, $m$ is the timing offset, $N$ is the PSS time-domain signal length, $Y[i]$ is the received signal at time instant $i$ and $S_M[i]$ is the PSS with root $M$ replica signal at time $i$

FIG. 25

METHODS AND SYSTEMS FOR MITIGATION OF INTERFERENCE SIGNALS FOR A WIRELESS NETWORK RECEIVER

RELATED APPLICATIONS

This application is a National Phase of PCT Patent Application No. PCT/IL2019/050674 having International filing date of Jun. 14, 2019, which claims the benefit of priority under 35 USC § 119(e) of U.S. Provisional Patent Application No. 62/684,771 filed on Jun. 14, 2018. The contents of the above applications are all incorporated by reference as if fully set forth herein in their entirety.

FIELD AND BACKGROUND OF THE PRESENT INVENTION

The present invention, in some embodiments thereof, relates to data communication networks and, more particularly, but not exclusively, to systems and methods for mitigation of interference signals transmitted by interference transmitters.

Wireless communication network (e.g., cellular networks) receivers are susceptible to interference from different sources. One type of interference originates from a foreign interferer, a transmitter that is not part of the immediate network. The interference may originate, for example, from a remotely located transmitter, carried by atmospheric propagation such as a tropospheric duct, or from a near-by located transmitter that transmits on frequencies that are overlapping and/or adjacent to the spectrum used by the interfered receiver. Remote interferers may broadcast transmissions such as analog or digital TV from other countries.

The transmission may occur on the same channel as the cellular network, for a variety of reasons for example, due to lack of harmonization between countries with respect to use of spectrum, or through remote time-division duplex (TDD) base stations that exhibit large propagation delays which hamper the uplink/downlink duplexing separation that was planned through synchronized TDD.

There are several scenarios that may result in unwanted interference at the received spectrum of a base-station or access point. One example is intentional interference, also known as jamming. Such interference is created intentionally in order to harm a wireless network and prevent communication. Jammers may be employed in defense scenarios and the proposed solution may be used to protect a communication system against hostile jammers.

In civilian communication, the usage of jammers is rare and in many cases, the interference is caused unintentionally. For example, the interference may be a result of transmission in a different spectrum resulting in interference due to radiofrequency (RF) impairments in the desired signal spectrum. Several reasons for interference include, for example, differences in usage of licensed spectrum among countries, usage of Time Domain Duplexing schemes, and usage of unlicensed spectrum.

In different countries, the same parts of the spectrum may be used for different applications. For example, in one country a certain spectrum is used for uplink cellular communications (communication from the users to the base-station) while in another country the same spectrum is used for TV broadcasting. This scenario may result in strong interference signals being generated by the broadcast transmitters when received by a cellular base-station. Such phenomenon may be significantly intensified by tropospheric ducts that may extend the range of the interfering signals by hundreds or even thousands of kilometers. As a result, interference due to lack of spectral harmonization may be present between countries which do not have a common border.

In another example, self interference may be created by a Time Domain Duplexing (TDD) regime network among sites separated by large distances during strong propagation created by tropospheric ducts. A tropospheric duct carrying a signal beyond the optical horizon may result in unwanted interference where the network sites are synchronized to a specific downlink/uplink framing in time so that all the network base-stations are transmitting or receiving at the same time. When weather conditions create strong duct propagation, these TDD signals may travel for several tens or hundreds of kilometers, and hit another site of the same TDD network. The time delay over the duct can be several hundreds of micro-seconds or even more than one millisecond. The delay may result in downlink signals transmitted from one site during downlink frame time, being received during uplink frame time at a site located tens or hundreds of kilometers away.

Another example of interference created in TDD network implementations, are cases where different or unsynchronized TDD networks are used within the same or neighboring areas. For instance, two operators using different downlink/uplink ratios, or even the same ratio but out of phase might interfere with each other if they have adjacent spectrum or the same spectrum across two sides of a common border.

In the case of two TDD technologies (e.g., WiMAX and TD-LTE) being used in the same geographic area, the different frame structures make it impossible to synchronize them, and hence interference is inevitable.

In yet another example of interference resulting from different spectral regimes between countries is a case where a part of the spectrum is licensed in one country, but unlicensed in another country. For example, the spectrum between 902 Mega-Hertz (MHz) and 915 MHz is part of the GSM uplink band used in Europe, The Middle East and other parts of the world. In North America this spectrum is part of the ISM license free band and used for cordless phones, surveillance cameras and other consumer applications.

As a result, equipment purchased in North America operating in the 900 MHz ISM band that is then brought to and used in Europe or other areas where the 900 MHz spectrum is used for cellular communication, may result in unwanted interference in base-station sites.

Yet another case of interference generated by misuse of equipment in licensed frequencies, are oscillating repeaters/bi-directional amplifiers, due to lack of isolation between their service and donor antennas.

When using unlicensed spectrum, interference can be expected from other communication systems sharing the same spectrum. Methods for avoiding interference, for example, retransmission MAC, frequency hopping, and other methods, may enable reliable communication over unlicensed frequency at the expense of throughput and capacity.

SUMMARY OF THE PRESENT INVENTION

According to a first aspect, a mitigation module for mitigating interference complementing a receiver of a wireless network, comprises: at least one processor executing a code for: obtaining digital baseband signals received by a plurality of reception sources, matching at least a portion of a signature signal to at least a portion of the baseband signals, the signature signal indicative of a presence of interference signals originating from at least one external interference source, calculating a plurality of mitigation weights for at least the portion of the baseband signal corresponding to the matched at least portion of the signature signal, performing an interference mitigation process on the digital baseband signals received from the plurality of reception sources using the plurality of mitigation weights to generate clean digital baseband signals, and providing the clean digital baseband signals to a receiver of the wireless network.

According to a second aspect, a method for mitigating interference complementing a receiver of a wireless network, comprises: obtaining digital baseband signals received by a plurality of reception sources, matching at least a portion of a signature signal to at least a portion of the baseband signals, the signature signal indicative of a presence of interference signals originating from at least one external interference source, calculating a plurality of mitigation weights for at least the portion of the baseband signal corresponding to the matched at least portion of the signature signal, performing an interference mitigation process on the digital baseband signals received from the plurality of reception sources using the plurality of mitigation weights to generate clean digital baseband signals, and providing the clean digital baseband signals to a receiver of the wireless network.

According to a third aspect, a computer program product for mitigating interference complementing a receiver of a wireless network, comprises: a non-transitory memory having stored thereon a code for execution by at least one hardware processor adapted to execute the code for: obtaining digital baseband signals received by a plurality of reception sources, matching at least a portion of a signature signal to at least a portion of the baseband signals, the signature signal indicative of a presence of interference signals originating from at least one external interference source, calculating a plurality of mitigation weights for at least the portion of the baseband signal corresponding to the matched at least portion of the signature signal, performing an interference mitigation process on the digital baseband signals received from the plurality of reception sources using the plurality of mitigation weights to generate clean digital baseband signals, and providing the clean digital baseband signals to a receiver of the wireless network.

In a further implementation of the first, second, and third aspects, the interference mitigation process is performed using the plurality of mitigation weights computed for the at least the portion of the baseband signal corresponding to the matched at least portion of the signature signal, on the at least an unmatched portion of the baseband signals unmatched to at least the portion of the signature signal, and on the at least portion of the baseband signals matched to at least the portion of the signature signal, to generate the clean digital baseband signals.

In a further implementation of the first, second, and third aspects, when another portion of the baseband signals is unmatched to at least the portion of the signature signal, the plurality of mitigation weights are extrapolated for the another portion and the interference mitigation process is performed using the extrapolated plurality of mitigation weights for the unmatched portion of the baseband signals.

In a further implementation of the first, second, and third aspects, the portion of the baseband signal that is matched to the at least portion of the signature signal comprises at least one frequency band, and the another portion of the baseband signal that is unmatched to the baseband signals comprises another at least one frequency band, wherein the plurality of mitigation weights are computed for the at least one frequency band of the baseband signal that is matched and the plurality of mitigation weights are computed for the another at least one frequency band of the baseband signal that is unmatched by extrapolation from the said matched baseband signal frequency band computed plurality of mitigation weights.

In a further implementation of the first, second, and third aspects, the portion of the baseband signal that is matched to the at least portion of the signature signal comprises at least one period of time, and the another portion of the baseband signal that is unmatched to the baseband signals comprises another at least one period of time, wherein the plurality of mitigation weights are computed for the at least one period of time of the baseband signal that is matched and the plurality of mitigation weights are computed for the another at least one period of time of the baseband signal that is unmatched by extrapolation from the said matched baseband signal period of time computed plurality of mitigation weights.

In a further implementation of the first, second, and third aspects, another portion of the baseband signals is unmatched to at least the portion of the signature signal the plurality of mitigation weights are set to zero for the another portion.

In a further implementation of the first, second, and third aspects, the portion of the baseband signal that is matched to the at least portion of the signature signal and the another portion of the baseband signal that is unmatched to the baseband signals are occur periodically over respective time-intervals.

In a further implementation of the first, second, and third aspects, the plurality of mitigation weights are re-computed or adjusted by a certain factor for each periodic time-interval when the portion of the baseband signal is matched to the at least portion of the signature signal.

In a further implementation of the first, second, and third aspects, the matching of the at least one portion of the signature signal to the at least one frequency band of the baseband signal is determined by a pertinent complex weight for each respective frequency band that is below a threshold.

In a further implementation of the first, second, and third aspects, further comprising synthetically generating a signal according to the signature signal, wherein the plurality of mitigation weights are computed based on the synthetically generated signal.

In a further implementation of the first, second, and third aspects, further comprising storing in a memory a signal according to the signature signal, wherein the plurality of mitigation weights are computed based on the memory stored signal.

In a further implementation of the first, second, and third aspects, the signal synthetically generated according to the signature signal is aligned in time and/or in frequency with the obtained digital baseband signals.

In a further implementation of the first, second, and third aspects, the aligned is performed based on an acquisition of a carrier frequency offset and timing of the matched portion of the baseband signal denoting interference signals and recovering a carrier frequency and rate of symbol and frame clock of the matched portion of the baseband signal denoting interference signals.

In a further implementation of the first, second, and third aspects, the timing and carrier frequency recover is computed by a cross correlation of the digital baseband signals with the signature signal.

In a further implementation of the first, second, and third aspects, matching the at least the portion of the signature to the at least the portion of the baseband signals is computed by a frequency offset correction for compensating a frequency difference between a frequency of the signature signal and a frequency of the digital baseband signals.

In a further implementation of the first, second, and third aspects, the at least portion of the signature signal indicative of the presence of interference signals is computed by an analysis of the digital baseband signals, by identifying a common repetitive signal pattern in a plurality of sequential time intervals of the baseband signals.

In a further implementation of the first, second, and third aspects, further comprising computing a correlation between the plurality of mitigation weights for computing an estimate of an error of each respective mitigation weight, and performing the interference mitigation process when the correlation is above a threshold indicative of similarity of error for the plurality of mitigation weights, and not performing the mitigation process when the correlation is below the threshold.

In a further implementation of the first, second, and third aspects, the threshold is selected for no more than a target amount of performance segregation for the clean baseband signals due to the interference mitigation process using the plurality of mitigation weights.

In a further implementation of the first, second, and third aspects, the baseband signals including a plurality of interference signals each associated with a certain signature signal of a plurality of signature signals, iterating the matching, the calculating the plurality of mitigation weights, and the performing the interference mitigation process for another of the plurality of different signature signals.

In a further implementation of the first, second, and third aspects, the plurality of reception sources comprises a first and a second antenna, and the clean digital baseband signal is computed by subtracting from a direct baseband signal obtained from the first antenna, a weighted signal computed from the plurality of mitigation weights for the second antenna.

In a further implementation of the first, second, and third aspects, the at least one portion of a same signature signal is matched to each one of a plurality of digital baseband signals respective received from the plurality of reception sources, and a set of the plurality of mitigation weights is computed for each one of the plurality of reception sources.

In a further implementation of the first, second, and third aspects, the baseband signals include interference signals originating from a single source, diversity of the plurality of sources is preserved when a weighted frequency domain frequency bin of a respective baseband signal obtained from a certain reception source of the plurality of reception sources, and an output of a couple from a pair of reception sources the plurality of reception sources is a sum of outputs of the couple, where weighted outputs are arranged as couples where each weighted output participates in two pairs of reception sources.

In a further implementation of the first, second, and third aspects, the interference signals and corresponding signature signals indicative of presence of the respective interference signals are selected from the group consisting of: a certain WiFi Access Point (AP) and corresponding unique identification in a preamble, any WiFi Access Point (AP) and corresponding general preamble, a unique WCDMA/GSM base station and corresponding system ID (SID), WCDMA uplink signal and corresponding specific pilot symbol, LTE uplink signal and corresponding specific reference signals (RSs which are pilot sub-carriers), Analog TV and corresponding vertical sync signal, and any interfering source and corresponding time repetition or partial time known signature.

In a further implementation of the first, second, and third aspects, the digital baseband signals received by the plurality of reception sources are received by one or more Remote Radio Head (RRH).

In a further implementation of the first, second, and third aspects, the digital baseband signals received by the plurality of reception sources are received by a Remote Radio Head (RRH), wherein the mitigation module is within the RRH.

In a further implementation of the first, second, and third aspects, the mitigation module is located remotely from the RRH.

In a further implementation of the first, second, and third aspects, the mitigation module is within a baseband receiver that includes the plurality of reception sources.

In a further implementation of the first, second, and third aspects, the mitigation module is located remotely from a baseband receiver that includes the plurality of reception sources.

In a further implementation of the first, second, and third aspects, the plurality of reception sources are a plurality of antennas arranged in an antenna diversity scheme.

In a further implementation of the first, second, and third aspects, the plurality of reception sources are a plurality of antennas that are not co-located.

In a further implementation of the first, second, and third aspects, the number of reception source inputs into the mitigation module is higher than the number of signal outputs to the baseband receiver, wherein the number of interference signals is less than or equal to the number of reception source inputs into the mitigation module minus one, wherein there are sufficient degrees of freedom to perform the interference mitigation and to preserve inherent diversity gain.

In a further implementation of the first, second, and third aspects, the interference signals comprise foreign signals that are received by a certain receiver of the wireless network and are not transmitted by a wireless transmitter that is part of the wireless network.

Unless otherwise defined, all technical and/or scientific terms used herein have the same meaning as commonly understood by one of ordinary skill in the art to which the present invention pertains. Although methods and materials similar or equivalent to those described herein can be used in the practice or testing of embodiments of the present invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the present invention can involve performing or completing selected tasks manually, automatically, or a combination thereof. Moreover, according to actual instrumentation and equipment of embodiments of the method and/or system of the present invention, several selected tasks could be implemented by hardware, by software or by firmware or by a combination thereof using an operating system.

For example, hardware for performing selected tasks according to embodiments of the present invention could be implemented as a chip or a circuit. As software, selected tasks according to embodiments of the present invention could be implemented as a plurality of software instructions being executed by a computer using any suitable operating system. In an exemplary embodiment of the present invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the present invention are herein described, by way of example only, with reference to the accompanying drawings. With specific reference now to the drawings in detail, it is stressed that the particulars shown are by way of example and for purposes of illustrative discussion of embodiments of the present invention. In this regard, the description taken with the drawings makes apparent to those skilled in the art how embodiments of the present invention may be practiced.

In the drawings:

FIG. 25 is an equation for computing the preferred detector denoted the timing offset $m_M$, in accordance with some embodiments of the present invention;

Figure 29:
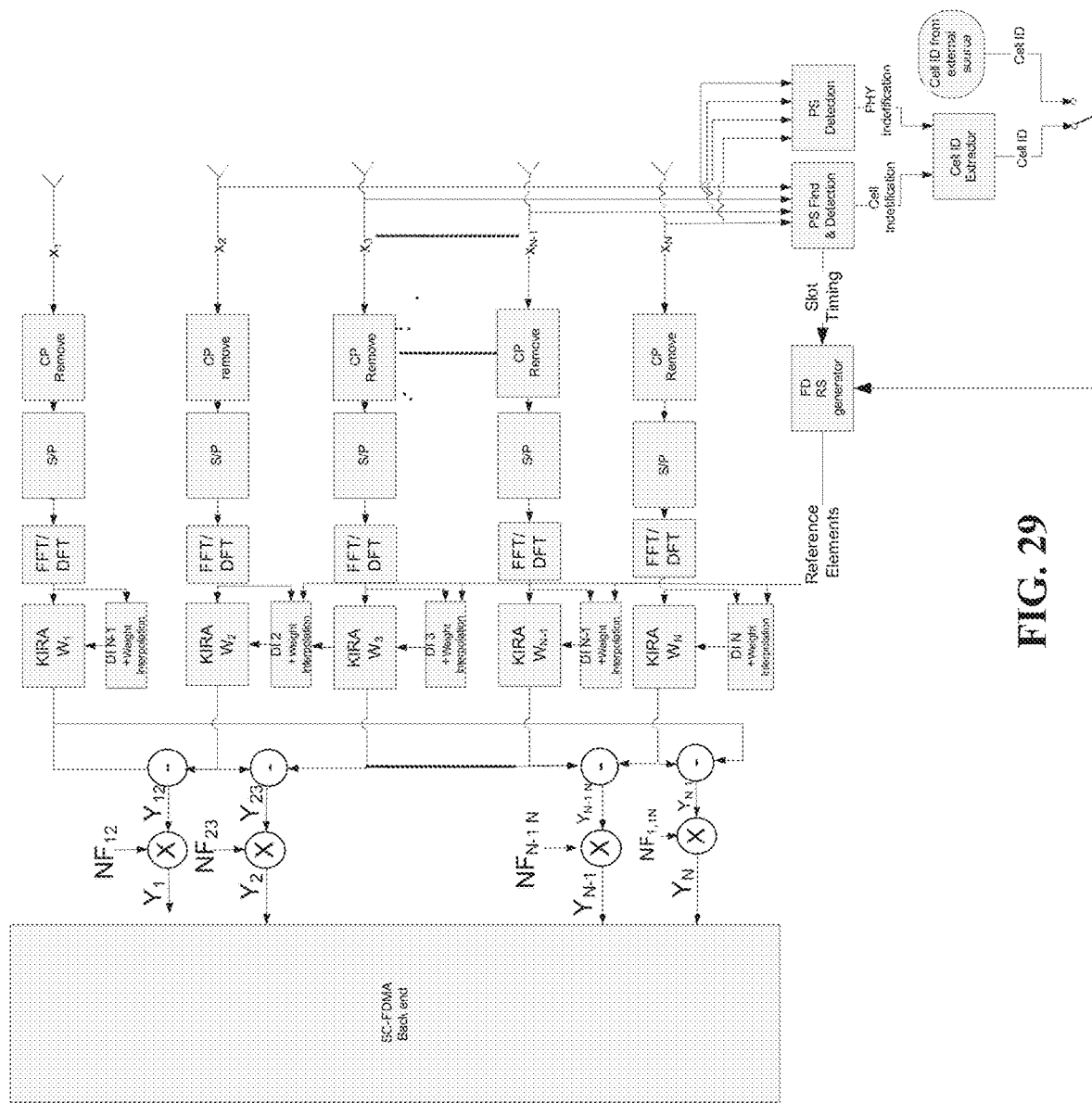
Figure 30:
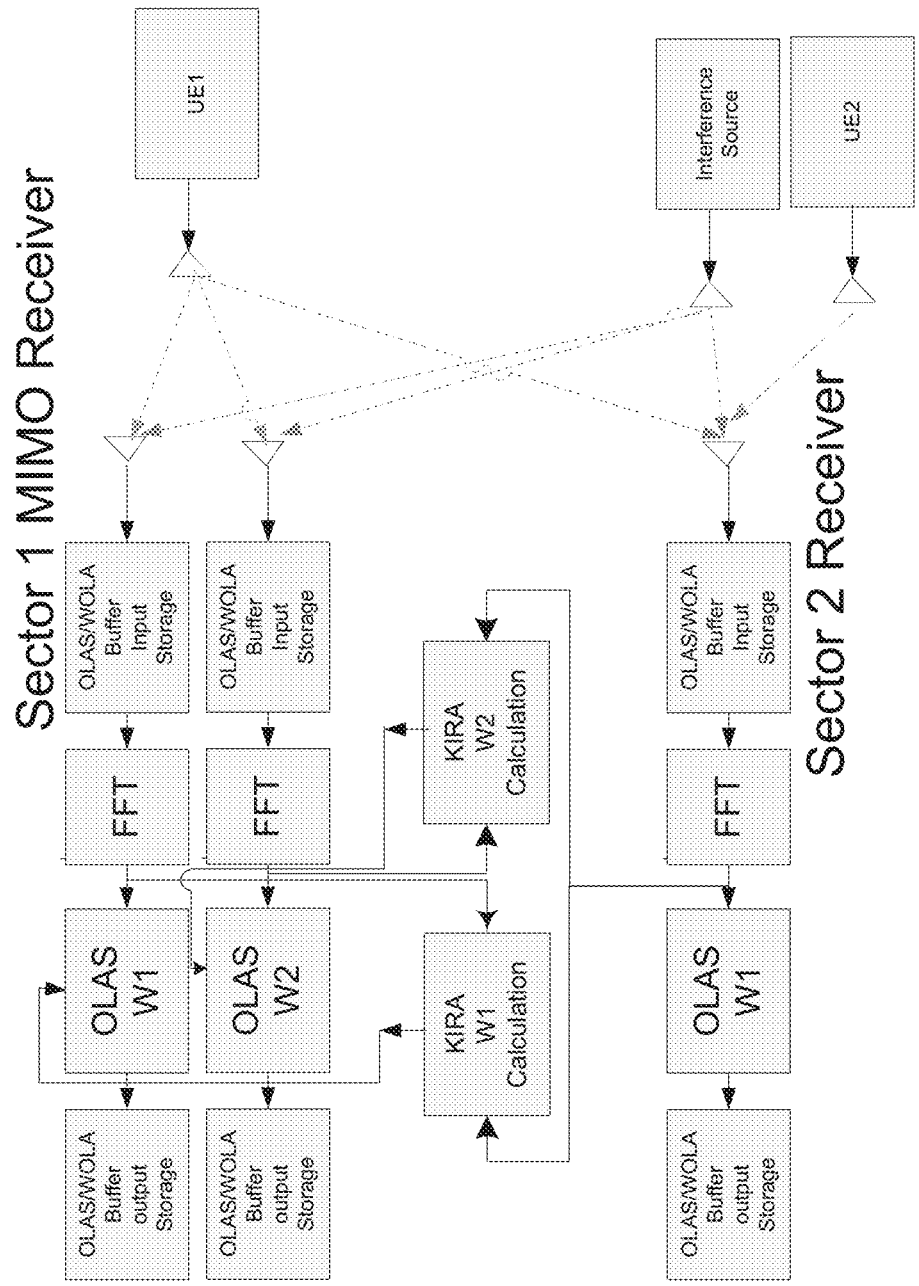

FIG. 29 is a schematic depicting a block diagram of a SC-FDMA front end receiver with interference mitigation module embedded therein, in accordance with some embodiments of the present invention; and FIG. 30 is a schematic depicting the interference mitigation module in multi-sector scenario for acquiring mitigation weight in the sector where the reception of the interference is dominant to cancel this same interference signal in other sectors, in accordance with some embodiments of the present invention.

DESCRIPTION OF SPECIFIC EMBODIMENTS OF THE PRESENT INVENTION

The present invention, in some embodiments thereof, relates to data communication networks and, more particularly, but not exclusively, to systems and methods for mitigation of interference signals transmitted by interference transmitters.

As used herein, term mitigating (e.g., interference mitigation) may be interchanged with the term cancellation (e.g., interference cancellation).

As used herein, the terms reference signal and signature signal may sometimes be interchanged.

As used herein, the term mitigation and cancellation may sometimes be interchanged. For example, the term interference cancellation and interference mitigation may sometimes be interchanged.

As used herein, the term module may sometimes be interchanged with the term component.

As used herein, the phrase interference mitigation may refer to removal and/or reduction of interference signals and/or other undesired signals from received signals. Desired signals may be isolated. Mitigation and/or removal may not be complete. Noise and/or the undesired signals may remain at a reduced level that allows for identification and/or detection of the desired signal. Sometimes as used herein, the presence of the interference signals means the presence of a dominant interference signal, and/or the absence of the interference signals means the absence of the dominant interference signal. The dominant interference signal may refer to a level of interference that requires mitigation, for example, the interference is not tolerable and/or reduces efficiency of the system. Dominant interference is sometimes used to refer to calculation of mitigation weights based on the dominant interference signal. The cancelation of the interference signal using the calculated weights may be optimal, even though the less dominant desired signal exists during the weight calculation. The interference mitigation may reduce the level of interference, for example, below a predefined receiver noise threshold level. A corrupted signal (composed from desired signals with interference from interference signals) may undergo interference mitigation to generate a clean signal (composed from desired signals).

As used herein, the term interference mitigation may refer to one or more (e.g., all) of the following: the interference mitigation module described herein, the method for performing interference mitigation as described herein, code stored in a memory that when executed by one or more hardware processors causes the hardware processor(s) to perform the interference mitigation process as described herein, an apparatus designed to perform interference mitigation as described herein, and/or a system designed to perform interference mitigation as described herein. The cited terms for referred to interference mitigation may sometimes be substituted for one another, and/or one term may serve as an example of one implementation while referring to other possible implementations.

As used herein, the term antenna sometimes means the port of the antenna.

As used herein, the term at least a portion may sometimes be interchanged with the term at least one or with the term a portion, for example, to clarify that the signature signal is matched to a portion (or at least one portion) of the baseband signal, and that the signature signal is unmatched to another portion (or at least one other portion) of the baseband signal.

An aspect of some embodiments of the present invention relates to a module and/or component and/or system, and/or apparatus, and/or method, and/or code instructions (i.e., stored in a memory for execution by hardware processor(s)) for mitigating interference complementing one or more receivers of a wireless network. Digital baseband signals received by multiple reception sources (e.g., antennas) of a wireless network are obtained. The reception sources may be arranged for antenna array as part of the MIMO/diversity scheme. The presence of interference signals in the baseband signals is determined by identifying the presence of a known to the receiver signature signal, or at least a portion of the known to the receiver signature signal, within the baseband signals. The signature signal is indicative of the presence of the interference signals, for example, the signature signal is a portion of the interference signal itself. The signature signal (or at least a portion thereof) is found in the received baseband signals by matching and/or correlating the signature signal (or at least a portion thereof) with at least a portion of the baseband signals, for example, matching and/or correlating above a requirement, for example, over a 50%, or over a 60%, or over 75%, or over 90% (or other values) match between the signature signal and the baseband signals. The signature signal (or at least a portion thereof) may be found in portions of the digital baseband signals and/or not found in other portions of the baseband signals. For example, in periodic time intervals of the baseband signals that alternate with the other time intervals when the signature signal is not found. In another example, in certain frequency band (e.g., bins) of the baseband signal and not found in the other frequency bands where the signature signal is not found. Mitigation weights are computed for the portion of the baseband signals where the signature signal is found. Mitigation weights are not necessarily computed and/or set to zero for the other portions of the baseband signals where the signature signal is not found. Alternatively, the mitigation weights are computed for the unmatched portions of the baseband signals (i.e., unmatched to the signature signals) based on the mitigation weights computed for the matched portions of the baseband signals, for example, by extrapolation of the mitigation weights and/or using the same computed mitigation weights. An interference mitigation process is performed on the digital baseband signals using the mitigation weights to generate clean digital baseband signals. The interference mitigation process may be computed for the entire baseband signal, including both the portions that are matched and unmatched to the signature signals, using the computed mitigation weights. The clean baseband signals are conveyed to a baseband receiver of the wireless network.

It is noted that the signature signals are used to find an indication of at least a part of the interference signal, but not necessarily of the whole signal. Other parts of the interference signal may be present in the received baseband signals, but not necessarily matched to the signature signals. As such, the mitigation weights computed for the matched portion of the baseband signal may be used (e.g., extracted from, copied from) for the unmatched portion of the baseband signal, to clean the unmatched portion of the baseband signal based on the assumption that the interference signal is still present in at least some parts of the unmatched portion of the baseband signal.

The signature signals may be, for example, predefined signature signals of a known property of the interference signals, dynamically computed for the received digital baseband signals (e.g., identifying periodically repeating patterns), and/or predicted.

The interference mitigation module may be an add-on and/or function device to the receiver that is aimed to cancel a known, acquired and/or predicted interference. The known, acquired and/or predicted interference source that transmits periodically preknown signature signal that is stored in the memory of the interference mitigation function device is cancelled and/or mitigated. Interference mitigation function device may use the actual existing antennas of the receiver or additional antennas if required.

The desired component of the baseband signals (i.e., the clean baseband signal) is not necessarily determined. Alternatively or additionally, the identification of the signature signal indicative of the interference signals is performed independently of any identification of the desired component of the baseband signals.

The interference signal is identified by matching the signal signature (or portion thereof) to at least a portion of the baseband signals indicative of the interference signal, independently of, and/or ignoring and/or without including portions of and/or without consideration of the desired and/or other non-interference signals. For example, in contrast to other approaches in which the desired signal is first detected and the interference signal is detected relative to the desired signal.

The mitigation weights may be computed for identified interference signal (i.e., at least the portion of the baseband signal corresponding to the matched signature signal (or portion thereof)) independently of, and/or ignoring and/or without including portions of a desired signal and/or non-interference signal.

The interference mitigation process may be performed using the mitigation weights to generate clean digital baseband signals independently of, and/or ignoring and/or without including portions of and/or without consideration of other mitigation weights otherwise computed for the desired and/or other non-interference signals.

At least some implementations of the mitigation component, systems, apparatus, methods, and/or code instructions described herein reject signals (optionally only the signals) that carry the known, acquired or predicted signature signal, that may be partial either in time, frequency and/or in code domain. Partial time domain signature may be periodic in a known interval every certain time duration. Partial frequency domain may refer to the interfering signal carrying pre-known frequency attribute signature, for example, pilots or reference signals together with unknown signal at other frequencies.

At least some implementations of the mitigation component, systems, apparatus, methods, and/or code instructions described herein improve the technology of processing digital baseband signals which include interference signals to provide clean digital baseband signals without (or with reduced) interference signals. By identifying an indication of the interference signal by matching to the signal signals (or portion thereof), the mitigation weights are computed for interference mitigation to compute clean baseband signals without any (or without significant, for example, according to a threshold) degradation to the desired signal, which may also have strong correlation among the receiving antenna(s).

At least some implementations of the mitigation component, systems, apparatus, methods, and/or code instructions described herein relate to the technical problem of improving quality of clean digital baseband signals computed from obtained digital baseband signals by mitigation of interference signals therefrom. Other methods are based on identification of the desired signal and extraction of the desired signal from the baseband signal (also referred to herein as the clean digital baseband signal), and/or determining the presence of the interference signal that is mixed with the detected desired signals. However, such process may reduce the quality of the extracted desired signal. For example, the desired signal to be extracted may still be mixed with some interference signals, and/or the ability to correctly identify the desired signal may be limited, resulting in errors and/or inadequate extraction of the desired signals. For example, quality of desired signals may be reduced when interference mitigation is performed but no interference signal is present. By detecting the interference signal rather than the desired signal, a portion of the interference signal may be matched to the signature signal rather than the to the entire signature signal, enabling removal of partial interference signals. The interference signal may be removed based on a partial match to the signature signal. By computing the cancellation weights based on the detected interference signal alone, independently of any desired signals, even with low or non existing interference the desired signal is not necessarily attenuated by the process of interference mitigation that uses the mitigation weights computed for the interference signal, for example, when there is no or low interference signal detected the mitigation weights are set to bypass the input to the output without any weighting.

At least some implementations of the mitigation component, systems, apparatus, methods, and/or code instructions described herein improve the technology and/or address the technical problem by identifying a signature signal indicative of the interference signal itself within the digital baseband signals, and computing mitigation weights for performing and interference mitigation process on the digital baseband signals to obtain the clean digital baseband signals (i.e., the desired signals). Since the focus is on the finding the interference signal, errors in computation of the mitigation weights do not necessarily affect the quality of the desired signal. Moreover, the potential is for full removal of the interference signal to obtain a clean digital baseband signal at a higher quality in comparison to other approaches that focus on extracting the desired signal.

The interference mitigation module is designed to cancel an interference signal by exploiting some known, acquired and/or predicted signature of the interference that may appears periodically (and/or at known intervals) at limited time duration instance and/or in part of the frequency band continuously in time domain.

At least some implementations of the mitigation component, systems, apparatus, methods, and/or code instructions described exhibit the maximum rejection of the interfering signal independently to the level of the desired signal existence at the antenna ports.

At least some implementations of the mitigation component, systems, apparatus, methods, and/or code instructions described herein may be implemented in general topology for all kind of interfering signals with different signatures shape and cycle/duration appearance. The variables that indicate this specific parameter of the signature may be soft-stored as discussed herein.

At least some implementations of the mitigation component, systems, apparatus, methods, and/or code instructions described herein provide interference mitigation that is less sensitive to error in weights of each branch, which refers to the extent of matching between the stored signature signals and the actual appearance in the antenna port of the pertinent branch. The interference mitigation cancelation performance depends on the tracking (similarity of errors among the several branches) of the error among the branches as follows:

Assuming in branch 1 the calculated weights are $w1+w1err$ and in branch 2 the weights are $w2+W2err$.

When $w1err$ and $w2err$ are not correlated with zero bias averaging there will be no interference mitigation performance degradation.

When $w1err/w1=w2err/w2$ the interference mitigation cancellation will not be degraded.

When there is source of error due to imperfection in timing and/or frequency recovery in each branch and the resulted weight error in each branch tracks the weight error of the other branches the performance of interference mitigation will not necessarily require accuracy in the frequency and timing recovery function.

The component may be, for example, a self contained add-on device, a card to be plugged into the base station, a software component, or other hardware and/or software structures. Optionally, the component complements a receiver of a wireless network.

Optionally, the component is designed for coupling to an existing base station receiver of a wireless communication network, for example, as a standalone device that is plugged in between the existing antennas and the existing receiver.

Optionally, the receiver component operates externally to the receiver of the wireless network and the plurality of antennas. Optionally, the receiver component operates independently of the wireless network, receiver, end clients, antennas and/or other components. Optionally, the component operates blindly on the received signals. Optionally, the component determines the presence of the interference signal based on the received signals without additional information from the wireless network. The component may operate without having additional knowledge of the state of the signals and/or without the ability to control signals within the network. The component may operate only based on the received signals.

Optionally, the component has functionality to identify the presence of the interference signals within the received signals. Optionally, the detection is performed independently of the receiver. The add-on device may be installed with relatively little configuration, as signal identification may be performed within the add-on device without requiring special configuration and/or specific details from the receiver or the network. In some cases, limited information may be provided from the receiver and/or network to help with the identification. Identification of the interference signals may be performed by one or methods described herein in more detail.

Optionally, mitigation of desired signals (rather than mitigation of interference signals) is reduced and/or avoided. Optionally, interference mitigation is applied during the presence of the interference signals. Mitigation of the desired signal may be prevented or reduced in this manner.

Optionally, the component switches between interference mitigation mode and antenna diversity mode (e.g., transparent mode, bypass mode) according to when the interference signal is detected as being present based on identification of the signature signal (or portion thereof). Optionally, desired signals in frequency sub-bands (or the entire spectrum) are substantially preserved for the receiver to perform the antenna diversity scheme operation, where the interference signal is absent.

Optionally, the model is implemented with existing receiving devices, for example, receiving devices that are operating to provide communication services. The existing devices may have been designed and/or optimized according to their network environment. Optionally, performance of the existing devices and/or overall system performed is improved, as the existing devices with multiple antennas are used in the most effective way, and may improve available bandwidth, capacity, utilization of network resources, quality of data transfers, and/or other system parameters. Network equipment may be protected from interference, in addition to utilizing the existing diversity architecture. When interference is present, the multiple antennas may be used to cancel the interference. When interference is absent, the multiple antennas may be used with the existing antennas diversity to improve the quality and/or reliability of the wireless links.

Interference may be cancelled from narrowband and/or broadband interferers. Interference from multiple interferers (time and/or frequency) across the protected receive spectrum may be cancelled.

The existing receiving devices may be operating within an existing network to provide data communication services. The component and/or method is applied to provide interference mitigation functionality to the existing network using the existing antenna structural arrangement.

Optionally, the component and/or method described herein is implemented within an existing receiving device of a wireless data communication network. Optionally, the implemented component and/or method is transparent to the existing receiving device. For example, software is loaded to network processors and/or an external device is connected to existing equipment. Optionally, clean signals obtained from corrupted signals by the interference mitigation module are injected into a component of the receiving device for forwarding within the data communication network. Optionally, the existing receiving device includes multiple antennas arranged for existing antenna diversity, for example, designed according to existing network conditions.

Optionally, corrupted radiofrequency (RF) signals received from the antennas are converted into corrupted baseband signals for interference mitigation. Optionally, the clean baseband signals are converted back into RF signals at the same frequency as the received corrupted signals. The clean RF signals are optionally injected into the existing receiving device for further processing and/or forwarding within the data communication network. In this manner, the interference mitigation may be transparent to the existing receiving device. Alternatively, the received corrupted signals are already in baseband form.

Before explaining at least one embodiment of the present invention in detail, it is to be understood that the present invention is not necessarily limited in its application to the details of construction and the arrangement of the components and/or methods set forth in the following description and/or illustrated in the drawings and/or the Examples. The present invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
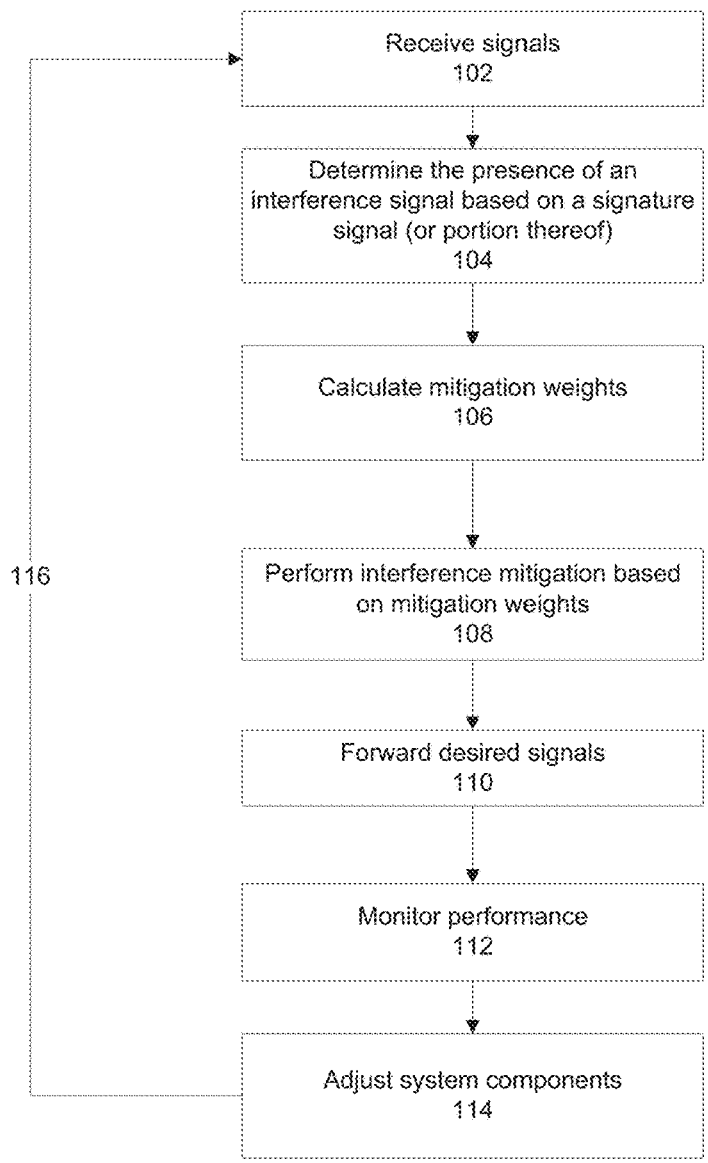
FIG. 1 is a flowchart of a method for mitigating interference based on identifying at least a portion of a signature signal indicative of interference signals within the obtained baseband signals, in accordance with some embodiments of the present invention.
Figure 2:
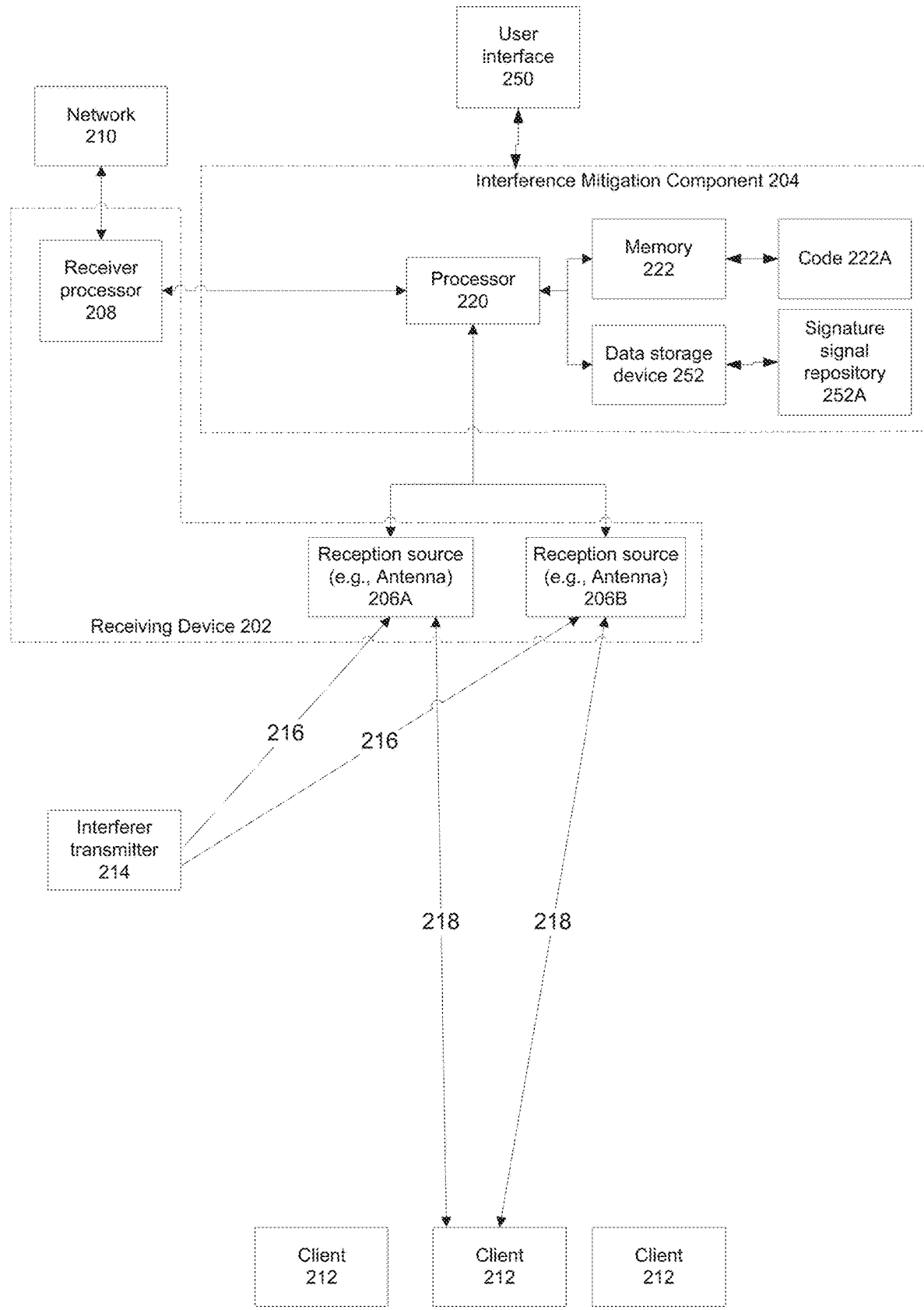
FIG. 2 is a schematic block diagram of an exemplary receiving device communicating with an interference mitigation device for mitigating interference based on identifying at least a portion of a signature signal indicative of interference signals within the obtained baseband signals, in accordance with some embodiments of the present invention.

Referring now to the drawings, FIG. 1 is a flow chart of a method for mitigating interference based on identifying at least a portion of a signature signal indicative of interference signals within the obtained baseband signals, in accordance with some embodiments of the present invention, in accordance with some embodiments of the present invention. Reference is also made to FIG. 2, which is a block diagram of a (baseband) receiving device 202 for receiving digital baseband signals (e.g., wireless signals), coupled to an interference mitigation device 204 for mitigating interference signals based on identifying at least a portion of a signature signal indicative of interference signals within the obtained baseband signals, in accordance with some embodiments of the present invention.

The mitigation component may be located within the (baseband) receiving device 202. Alternatively or additionally, the mitigation component is located remotely from (baseband) receiving device 202.

Optionally, interference mitigation device 204 has a first interface for electrically coupling (e.g., by plugging of a cable) to reception sources (e.g., antennas) 206A-B (or greater than two). Optionally, desired signals and/or interference signals are received on the first interface. Optionally, device 204 has a second interface for electrically coupling (e.g., by plugging in a cable) to a receiver device 202 of a wireless communication network, which may connect to a network 210. Optionally, signals processed by device 204 are provided to the receiver by the second interface. Optionally, device 204 is an add-on device arranged as a self-contained structure for coupling to both the wireless network and the antennas.

It is noted that FIG. 2 is a simplified high level conceptual diagram. Additional implementation designs and/or details are described herein, for example, with reference to other FIGs.

Installation of interference mitigation device 204 may improve performance of receiving device 202 by adding additional interference mitigation functionality in addition to the existing antenna receiver diversity functionality.

Optionally, receiving devices 202 are base-stations, access point receivers, or other components within a data communication network, for example, a wireless data communication network. Receiving devices 202 may be part of any suitable wireless network, for example, WCDMA, LTE, WiFi, WiMax, or other technologies. Receiving devices 202 have antennas 206A-B to receive wireless transmissions transmitted from one or more clients 212, for example, mobile phones, Smartphones, laptops, tablets, mobile devices, other receiving devices, and/or other transceivers. The received signals are processed by a receiver processor 208, which is optionally connected to a data communication network 210. The processed received signals may be forwarded over network 210.

Receiving devices 202 may operate within licensed frequency bands, and/or may operate within unlicensed spectrums.

It is noted that only two reception sources (e.g., antennas) 206A-B are shown as an example. It is understood that more than two antennas may be used, for example, 3, 4, 5, 6, 7, 8, or greater.

Optionally, receiving devices 202 have multiple antennas 206A-B (or more) arranged for antenna diversity. The receiving diversity may be designed for link robustness and/or quality. Alternatively or additionally, one or more additional antennas may be added to existing antennas, for example, to provide diversity functionality, to provide mitigation functionality, and/or to increase the number of interfering channels that may be cancelled.

A foreign interferer transmitter 214 may transmit undesired interference signals 216 that interfere with desired signals 218 transmitted by clients 212. There may be multiple interferer transmitters 214 that may transmit on multiple interfering channels.

Examples of interferer transmitters 214 include: jamming equipment (for intentional jamming of communication networks), remote broadcasting equipment (e.g., television, radio) that have harmonic components transmitting on overlapping or adjacent frequencies, other sites of the same network (e.g., TDD network), other sides of different networks (e.g., TDD networks using different technologies), unauthorized usage of transmitting equipment on the overlapping or adjacent frequencies, and/or other transmitters transmitting on overlapping and/or adjacent frequencies.

Interferer transmitter 214 may be narrowband or wideband.

Interferer transmitter 214 may transmit continuously and/or periodically.

Interference mitigation device 204 is in electrical communication with receiving device 202, via an interface, for example, cables, wireless connectors, cards that plug into slots, local busses and/or integrated therein.

Different installations may be performed, for example, depending on the implementation of receiving device 202 (e.g., base-station, access point). Installation mitigation device 204 may be a standalone device (e.g., connected by cables), embedded into receiving device 202 (e.g., card inserted into slot of receiver processor 208), and/or software (e.g., loaded onto a memory).

The structure of interference mitigation device 204 may be based on the desired installation configuration. For example, the standalone device may contain one or more hardware processors 220, and a non-transitory memory 222 storing code 222A for execution by hardware processor(s) 220. The standalone device may be encased in a housing. The embedded configuration may not have the housing, with the processor 220 and memory 222 on a card. The software version may comprise of a computer program product having instructions for execution by a processor of the network, for example, the receiving processor. Alternatively or additionally, interference mitigation device 204 is implemented (entirely or in part) based on firmware of programmable hardware devices, for example, field-programmable gate array (FPGA), application-specific integrated circuit (ASIC), or other hardware.

Optionally, interference mitigation device 204 is connected along the received signal path from antennas 206A-B to receiver processor 208 (e.g., baseband receiver), between antennas 206A-B and processor 208 (e.g., baseband receiver). For example, interference mitigation device 204 is connected in front of a RF receiving section of a base station, or in front of digital receiver baseband ports. In another example, interference mitigation device 204 is embedded into a baseband component.

Optionally, one or more filtering and/or amplification elements (e.g., hardware and/or software) are positioned in electrical communication between antennas 206A-B and interference mitigation device 204. Alternatively or additionally, one or more filtering and/or amplification elements are positioned in electrical communication between interference mitigation device 204 and receiver processor 208. Examples of filters include duplexers. Examples of amplifiers include tower mounted amplifiers.

Hardware processor(s) 220 of interference mitigation module 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 220 may include a single processor, or multiple processors (homogenous or heterogeneous) arranged for parallel processing, as clusters and/or as one or more multi core processing devices.

Memory 222 stores code instructions executable by hardware processor(s) 220, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 222 stores code 222A that implements one or more features and/or acts of the method described with reference to FIG. 1 when executed by hardware processor(s) 220. Alternatively or additionally, one or more instructions may be implemented in hardware, in processor(s) 220 and/or other hardware components, in addition to, and/or alternatively to code 222A.

Interference mitigation module 204 may include data storage device(s) 252 for storing data, for example, signature signal repository 252A that stores indications of the signature signals denoting interference signals, as described herein. Data storage device(s) 252 may be implemented as, for example, a memory, a local hard-drive, virtual storage, a removable storage unit, an optical disk, a storage device, and/or as a remote server and/or computing cloud (e.g., accessed using a network connection).

Receiving device 202 may communicate with network 210, for example, the internet, a broadcast network, a local area network, a virtual network, a wireless network, a cellular network, a local bus, a point to point link (e.g., wired), and/or combinations of the aforementioned.

Interference mitigation module 204 may include and/or be in communication with one or more physical user interfaces 250 that include a mechanism for user interaction, for example, to enter data (e.g., define new signature signals) and/or view data (e.g., view performance of the interference mitigation process). Exemplary physical user interfaces 250 include, for example, one or more of, a touchscreen, a display, gesture activation devices, a keyboard, a mouse, and voice activated software using speakers and microphone.

Referring now back to FIG. 1, at 102, signals, optionally digital baseband signals, are obtained by multiple reception sources, optionally by two or more antennas. Optionally, signals are corrupted signals, composed of desired signals with interference signals. The signals are received by multiple existing antennas, which may be are arranged for diversity. Optionally, the applied interference mitigation is based on the existing antenna diversity arrangement.

Optionally, the interference signals include foreign signals that are received by a certain receiver of the wireless network and are not transmitted by a wireless transmitter that is part of the wireless network.

The reception sources (e.g., antennas) may be arranged for diversity, optionally in an antenna diversity scheme, for example, spatial, polar, directional or other diversity arrangements. Separation between the interference and desired signals may be based on the diversity arrangement.

Optionally, the reception sources are antennas that are not co-located.

Optionally, the number of reception source inputs into the mitigation component is higher than the number of signal outputs to the baseband receiver device. The number of interference signals is less than or equal to the number of reception source inputs into the mitigation component minus one. There are sufficient degrees of freedom to perform the interference mitigation and to preserve inherent diversity gain.

Optionally, signals are received from one or more remote radio heads (RRH). The RRH may be located remotely from the base station. The RRH may perform the conversion of received RF signals to the digital baseband waveform format. The digital baseband signals may be transmitted to the base station, for example, over fiber links. In this case, the interference mitigation may be applied on the digital baseband signals directly to generate clean digital baseband signals. The clean digital baseband signals may be passed over the fiber to the base station equipment. The interference mitigation unit may be implemented between the basestation and the RRH, for example, within the base station, within the RRH, and/or at another in-between location. Alternatively, the mitigation component is located remotely from the RRH.

Optionally, at 104, the presence of one or more interference signal each originating from a respective external transmitting source in the received baseband signals is determined by identifying a signature signal (or portion thereof) indicative of the interference signal within the baseband signal.

Optionally, the interference signal is determined independently of the presence of any non-interfering and/or desired signals.

Optionally, the signature signal is unrelated and/or uncorrelated with non-interfering and/or desired signals.

Optionally, the signals signal is indicative only of interfering signals.

Optionally, at least a portion of a signature signal is matched to at least a portion of the baseband signals. The signature signal is indicative of the presence of interference signals. The interference signals may originate from one or more external interference sources. The interference signals are received from the reception sources, which also receive desired signals.

The matching may be performed, for example, by correlation.

It is noted that the entire signature signal does not necessarily need to be matched to the received signals to identify the interference signals. Matching a portion of the signature signal may be sufficient to identify the interference signals with a target accuracy. The matching and/or correlation may be according to a requirement and/or threshold, for example, matching at least 30%, or 50%, or 70%, or other smaller, intermediate, or larger values of the signature signal.

Optionally, another portion of the baseband signals is unmatched to the portion of the signature signal. The non-matched portion may denote desired signals and/or non-interference signals.

Optionally, the matching at least the portion of the signature to at least the portion of the baseband signals is computed by a frequency offset correction for compensating a frequency difference between a frequency of the signature signal and a frequency of the digital baseband signals. Optionally, the frequency of the signature signal may be adjusted to the frequency of the digital baseband signals.

Alternatively, the frequency of the digital baseband signals is adjusted to the frequency of the signature signal. Alternatively, the frequency of both the digital baseband signals and the frequency of the signature signal are adjusted to a common defined frequency, which may be different than the frequency of both the digital baseband signals and the frequency of the signature signal.

Optionally, the signature signal is defined, for example, stored in a memory, for example, in the signature signal repository. Alternatively, the signature signal is initially unknown and/or undefined. The signature signal may be found by analyzing the received digital baseband signals, optionally by identifying a common repetitive signal pattern in multiple sequential time intervals of the baseband signals. For example, using a process of averaging as described herein, that magnifies the signature signal which is repetitive and minimizes other signals which are non-repetitive.

Optionally, a same signature signal (or portion thereof) is matched to each one of multiple digital baseband signals respective received from each one of the multiple reception sources. A set of mitigation weights is computed for each one of the reception sources, as described herein.

There may be a single interference signal from a single source, or multiple interference signals originating from multiple external interfering sources.

Optionally the number of antenna inputs into to the mitigation device is higher than the number of inputs from the mitigation device into to the base station receiver. When the number of interference signals (e.g., from different sources) is less than the number of antennas minus one, and there are sufficient degrees of freedom to perform the interference mitigation and to preserve the inherent diversity gain, the mitigation device may provide to the base station receiver inputs signals with reduced cross correlation among each antenna input couple. The diversity may be achieved by providing to each base station receiver input different composite antenna array patterns through certain settings of the beam former weights (e.g., beam former component). Each base station receiver may be connected to certain composite antenna array patterns with common nulls toward the interference signals direction and/or polarization, and beam steered toward (e.g., maximally steered) different direction and/or polarization of the base station cell geometry.

The interference mitigation module is based on the assumption that the interfering signal carries in a certain time interval with a certain period a known, acquired and/or predicted signature and/or known frequency attribute signature like pilots in part of the frequency band. As discussed herein, these known-expected samples of the known signature may be stored in dedicated interference reference memory and/or are generated synthetically in order to calculate the rejection weights that cancel the actual interference. The signature may be stored, for example, according to knowledge of the signature from literature or from standard documentation. In other implementations of the component, the signature may be acquired from the received signal itself by sampling the repetitive signature for large amount of repetition that will average eliminate the desired response due to high amount of averaging. In that case the frequency offset correction of the signature is not necessarily needed.

Optionally, the signature is not pre-known but the interference signal includes certain portions (or all of it) that is periodic with some certain cycle. The periodic part of the interference signal may be acquired on line and/or offline in order to form the signature of the interfering signal that is required for cancellation.

The generation of the signature signal (e.g., to compute the mitigation weights and/or to compute the signature signal and/or to perform interference mitigation) may be aligned in time with the appearance of the signature in the received signal. The signature signal may be aligned in frequency with the incoming signal. The component may employ acquisition of the interferer signal that may include carrier (frequency offset) and/or timing which may include recovering the frequency and/or the rate of the symbol and frame clock. Carrier recovery may refer to recovery of the frequency offset of the received interfered signal compared to the frequency of the stored interference signature. In case of partial time signature, the timing recovery may produce a strobe like effect that is positive during the time interval of the signature appearance at the received signal from the antennas. The carrier recovery may be used to compensate the frequency difference between the reference signatures to the actual received signature.

The timing and/or carrier recovery may be estimated, for example, by conducting cross correlation of the received signal with the reference signature that is stored in the interference mitigation module memory and/or by using certain pilot signals in the interference signal when existing.

In a case of the signature signal that is partial in frequency band and continuous in time, the timing (in symbol, frame etc) and/or the carrier frequency of the interferer may be matched (e.g., by the signature generator).

Interference mitigation may be done in the frequency domain and/or time domain. The frequency bin in the frequency domain weights may be calculated by several (in case of dual antennas it is two) different least mean square (LMS) or DI (direct inversion) calculators. In case of partial time signature, the weights may be calculated (e.g., only) during the signature appearance duration while the signature strobe that is recovered by the timing recovery process (e.g., circuit) is in active state (e.g., ON state).

In case of partial frequency band signature, the weights may be calculated (e.g., only) on the frequency bins that there is signature power present (e.g., above a threshold). The weights in the other weights and/or bins that do not carry signature power (e.g., above the threshold) may be calculated by performing extrapolation over the frequency axis.

In partial time domain signature, the weights may be calculated during a single strobe, for example, when the time interval of the strobe is sufficiently long and/or over several numbers of strobes. During the LMS process the weight may be adjusted every strobe appearance with certain multiplying factor. The DI block duration, which is used for the weights calculation, may be also a single strobe duration or accumulation of several strobe durations.

In partial frequency band signature, the DI and/or LMS may operate continuously to process the signals.

Figure 13:
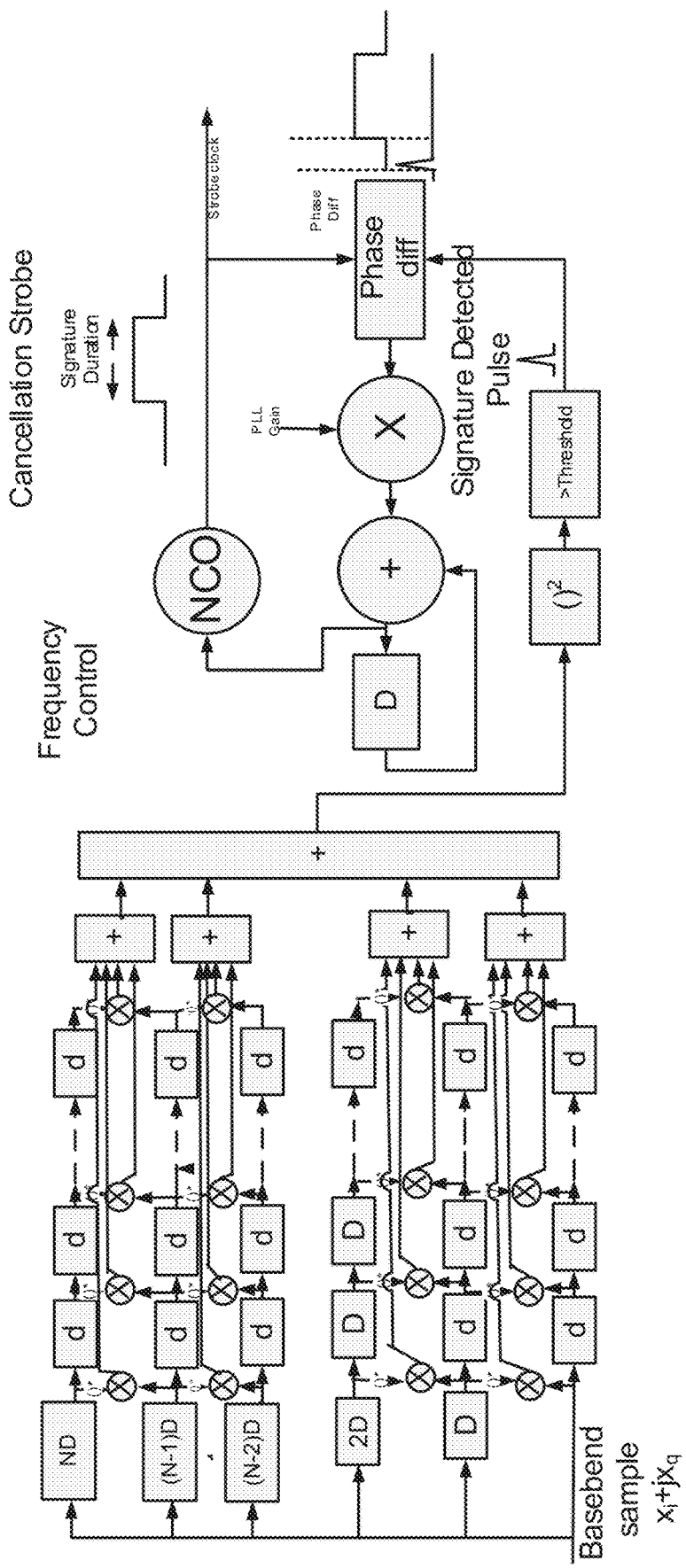
FIG. 13 is a schematic depicting an implementation where the actual signature is acquired from the antenna in case it is known that the signature appears periodically in the incoming interfering signal, in accordance with some embodiments of the present invention.
Figure 14:
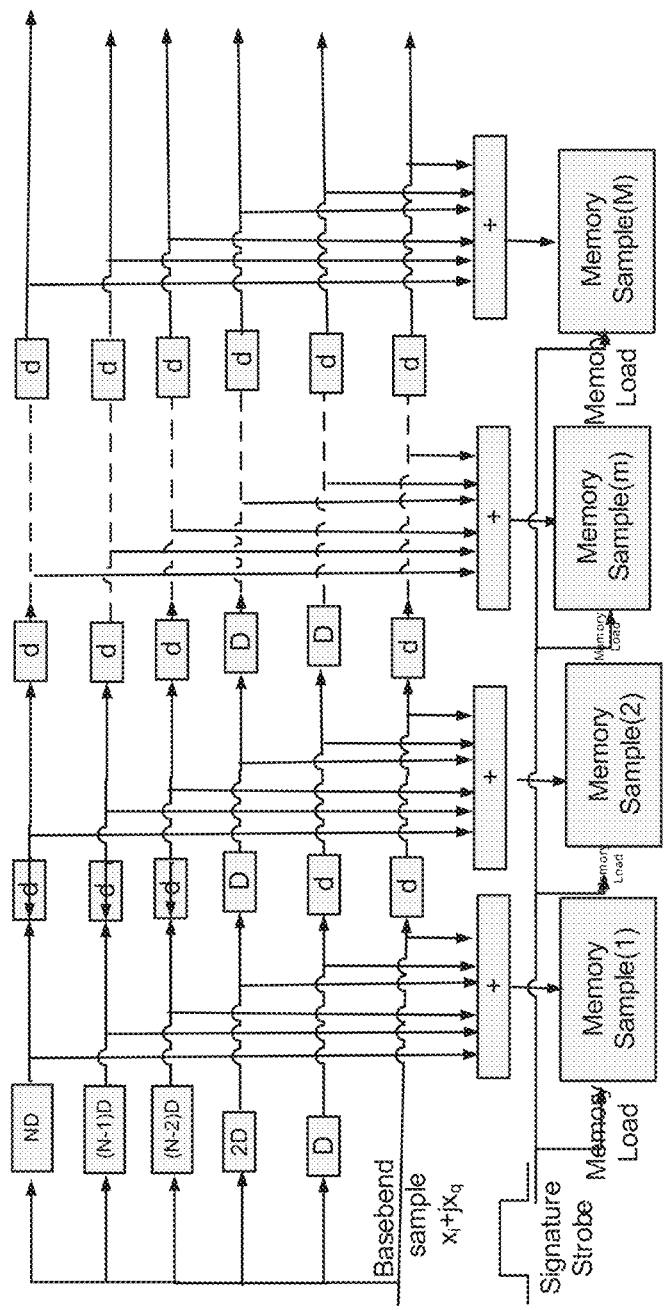
FIG. 14 is a schematic depicting the recovery of the signature samples from the interfering signal knowing that the signature is periodic in the implementation that handles unknown signature, in accordance with some embodiments of the present invention.

Reference is now made to FIG. 14, which is a schematic depicting the recovery of the signature samples in the implementation that handles unknown signature, in accordance with some embodiments of the present invention. FIG. 14 depicts the process of signature recovery of unknown signature of period interference. The delay taps denoted d and D are the same ones as described with reference to FIG. 13. The N samples of the interference signal signature are averaged (e.g., by summing) of related samples of the previous M−1 signatures. The signature strobe that is recovered as described herein is used for defining the time for loading the signature samples memory. The averaging is done in running window fashion that every new signature interval the Mth old sample is omitted from the averaging. The signature samples that are currently in the memory are used as the reference for the interference mitigation process.

Exemplary interference signals and corresponding signature signals indicative of presence of the respective interference signals include: a certain WiFi Access Point (AP) and corresponding unique identification in the preamble, any WiFi Access Point (AP) and corresponding general preamble, a unique WCDMA/GSM base station and corresponding system ID (SID), WCDMA uplink signal and corresponding specific pilot symbol, LTE uplink signal and corresponding cell specific reference signals (RSs which are pilot sub-carriers), Analog TV and corresponding vertical sync signal, and any interfering source and corresponding time repetition or partial time known signature.

At 106, mitigation weights are calculated for at least the portion of the baseband signal corresponding to the matched portion of the signature signal. Since the portion of the baseband signal corresponding to the matched portion of the signature signal denotes the interference signal, the mitigation weights are calculated for the interference signal.

Optionally, mitigation weights corresponding to non-matched portions of the signal (i.e., indicative of non-interference signals and/or desired signals) are set to value that will connect each input to the output transparently, and/or obtained (e.g., extrapolated and/or copied) from the mitigation weights computed or the matched portions of the baseband signal.

Optionally, the mitigation weights are calculated only for the interference signal. Optionally, the mitigation weights exclude non-interference signals and/or desired signals. Optionally, the mitigation weights are not computed for non-interference signals and/or desired signals.

Optionally, the portion of the baseband signal that is matched to at least the portion of the signature signal and/or the non-matched portion of the baseband signal occur periodically over respective time-intervals. The mitigation weights and/or the interference mitigation process (as described herein) are performed during the periodic time-intervals when the portion of the baseband signal is matched and the mitigation weights and/or the interference mitigation process are not performed during other periodic time-intervals when the portion of the baseband signal is unmatched.

The mitigation weights may be re-computed and/or adjusted by a certain factor for each periodic time-interval when the portion of the baseband signal is matched at least the portion of the signature signal.

Alternatively or additionally, the portion of the baseband signal that is matched to at least the portion of the signature signal includes at least one frequency band, and/or the unmatched portion(s) of the baseband signals includes at least one other frequency band. The mitigation weights are computed for the at least one frequency band of matched portion of the baseband signal. The mitigation weights for the unmatched frequency band(s) of the baseband signal may be computed by extrapolation from the matched frequency band(s) to the unmatched portion of the baseband signal.

The matching of the portion of the signature signal to the frequency band(s) of the baseband signal may be determined by a pertinent complex weight for each respective frequency band that is below a threshold.

Optionally, a signal is synthetically generated according to the signature signal. The mitigation weights are computed based on the synthetically generated signal. The signal synthetically generated according to the signature signal is aligned in time and/or in frequency with the obtained digital baseband signals. The aligned may be performed based on an acquisition of the carrier frequency offset and/or timing of the matched portion of the baseband signal denoting interference signals and/or recovering the carrier frequency and/or rate of symbol and frame clock of the matched portion of the baseband signal denoting interference signals. The timing and/or carrier frequency recover may be computed by a cross correlation of the digital baseband signals with the signature signal.

As discussed herein, the actual interference mitigation and/or weight vectors calculation may be done in the frequency domain through utilizing overlap and save (OLAS) and/or window overlap and add (WOLA) filters.

The interference mitigation module may be categorized as processing a single interference or multiple interference sources.

For single interference source there is a single signature reference and the cancelation may be done with a single set of mitigation weights that cancel the interference source.

With multiple interference sources the cancelation may be done in cascade. Each stage in cascade is targeted to cancel a single respective interference source. It is noted that in order to cancel multiple concurrent interference sources a sufficient degrees of freedom is required, e.g., sufficient antenna(s) at the receiver. Each interferer cancelation in specific frequency bin that suffers from the interference is expected to consume degree of freedom which may means less diversity and (multiple-input and multiple-output) MIMO preservation from the original condition at the receiver.

Two exemplary methods for mitigation weight calculation are described. A first implementation is based on LMS. A second implementation is based on DI.

Figure 3:
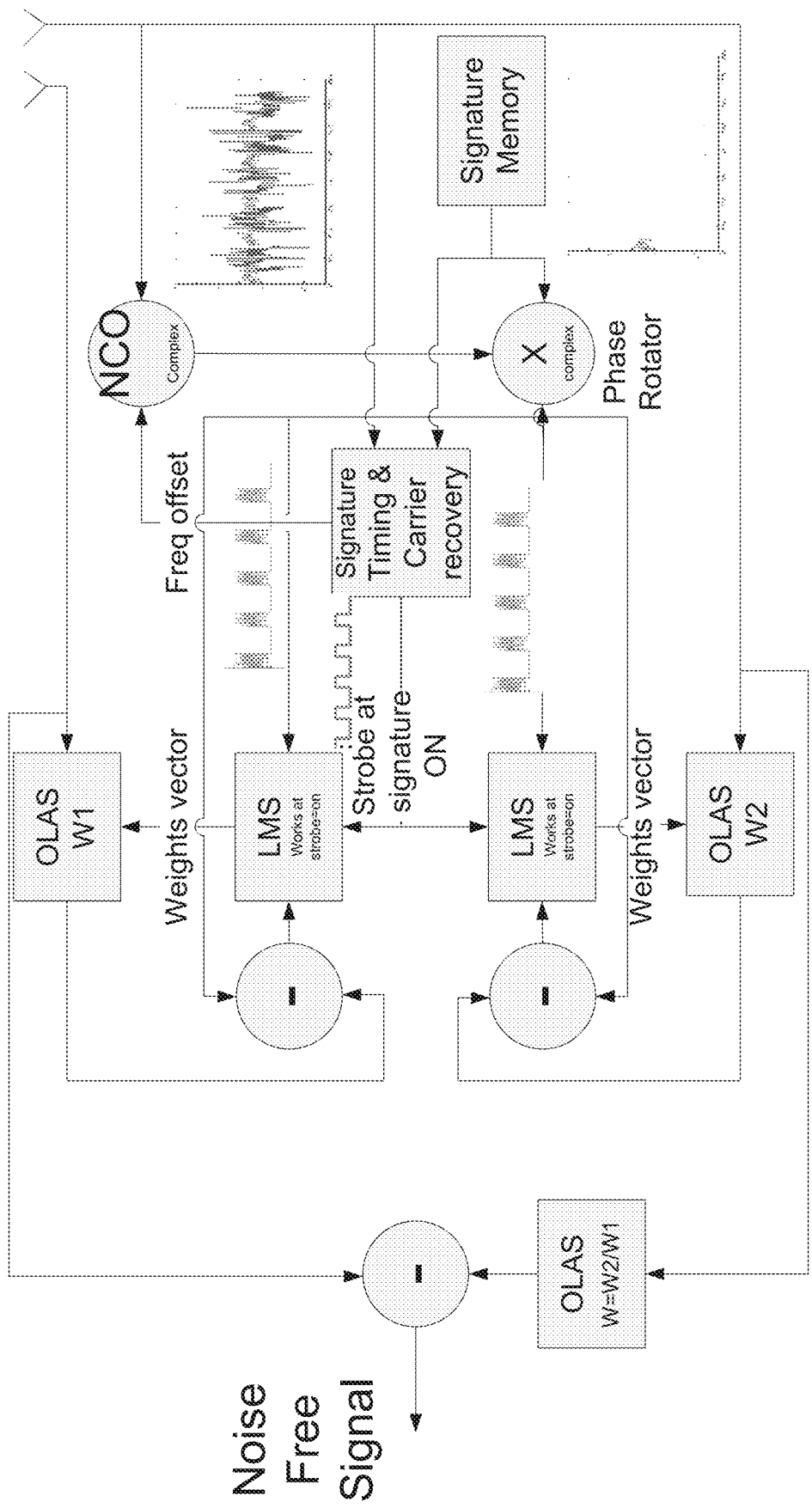
FIG. 3 is a schematic depicting interference mitigation with LMS implementation with partial time signature for the dual antenna case, in accordance with some embodiments of the present invention.

Reference is now made to FIG. 3, which is a schematic depicting interference mitigation with LMS implementation with partial time signature for the dual antenna case, in accordance with some embodiments of the present invention. In case of two antennas, two OLAS filters may be used for the two weight vectors calculation and the other OLAS that is used for normalization tracks these latter both weight vectors and derives from them a single new weight vector. The third OLAS may be connected to the antenna with the higher RSSI, for example, in order to guarantee that the total weight vector will always attenuate the input signal in order to avoid noise enhancement. The interference free signal is derived from subtracting from the direct signal from one antenna the weighted signal from the other antenna.

The first OLAS weight vectors create two identical received signals. The third OLAS weight vector are used for normalization in order that guarantee that even with low or non existing interference the desired signal will not be attenuated in the cancelation circuit output.

The interfering cancelation process may be done only when the signature is received in the interfering signal. Since the described implementation is of frequency domain type, the cancelation may be done in single or integer number of OLAS windows. This may require that the OLAS windowing is synchronized to the appearance of the signature at the received interfering signal. Optionally, a process is implemented for interferer signal detection that activates both the OLAS filters and the LMS. When there is no interfering signal there may be an option for bypassing the cancelation by setting the weight vector of W2 with all zeros.

With partial time signature the LMS may be active during the signature appearance in the signal at the antenna ports. With partial frequency band signature, the LMS may be active continuously on the frequency bins that carry signature power. The weights in the bins that do not carry signature power may be calculated according interpolation.

Figure 4:
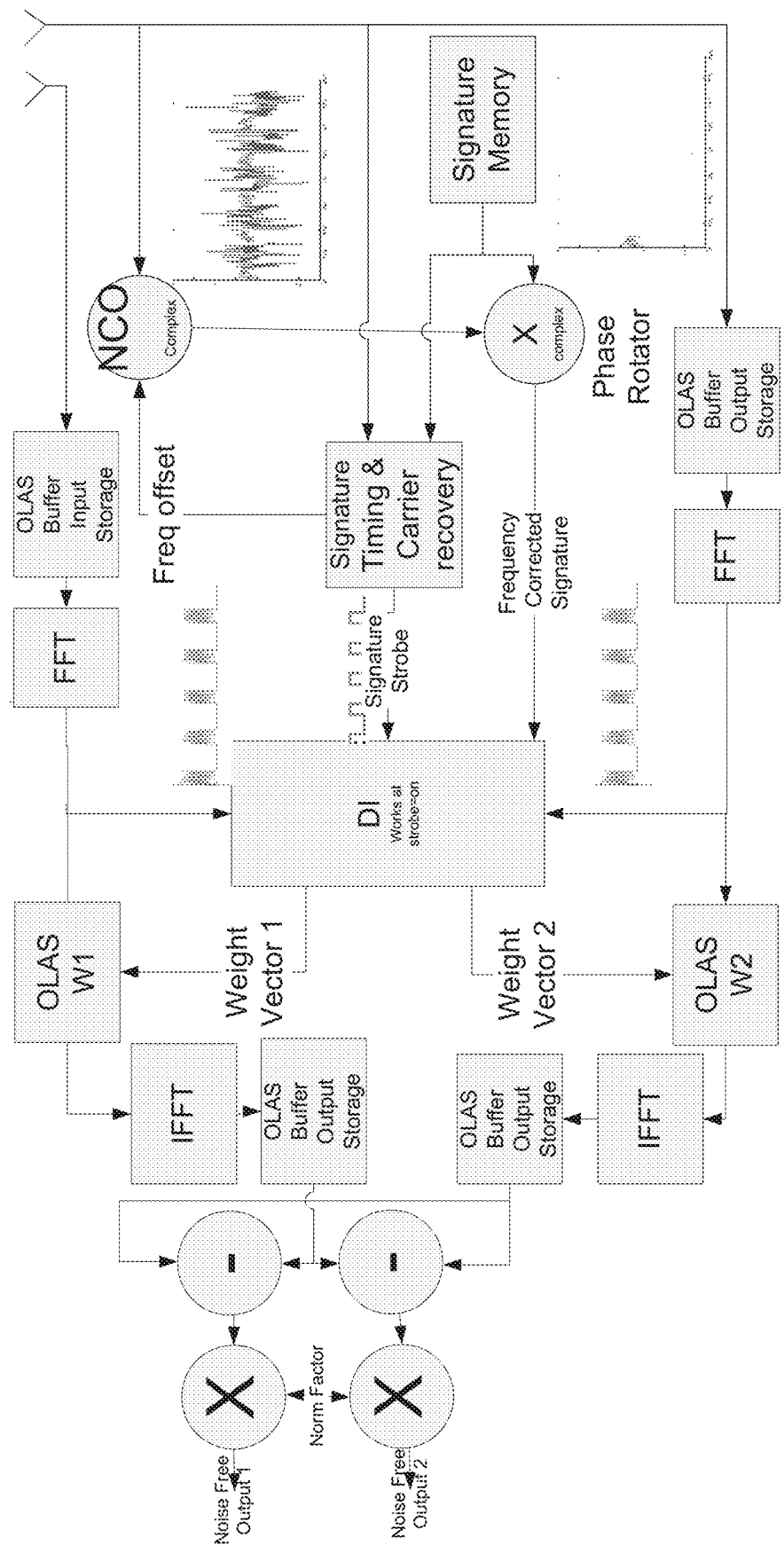
FIG. 4 is a schematic depicting implementation of (direct inversion) DI calculator in 2 antenna case (one output brunch and prior output normalization) with partial time signature, in accordance with some embodiments of the present invention.

The second DI implementation is now discussed. Reference is now made to FIG. 4, which is a schematic depicting implementation of DI for a single interference signal source in a 2 antenna implementation (i.e., one output branch and prior output normalization) with partial time signature, in accordance with some embodiments of the present invention. The blue signal denotes the interfered input signal out of the signature duration where the red signal is during the signature duration. As may be seen in FIG. 4, for the 2 antenna case the outputs are derived from the signal of the first antenna minus the signal of the second antenna and vice versa.

The inputs from the antennas are received by RF receiver down converted and sampled by ADC converters (not shown in the figure, it is assumed digital samples from the antennas). The OLAS buffer input storage stores buffers of time samples of certain length in overlap manner of old-new fashion. There are 2 options of buffering: OLAS and WOLA.

In OLAS implementation it is assumed that the stream of samples is packed to sequential buffers as follows:
Buffe1, Buffer2, Buffer3 . . . BufferI The OLAS buffers input storage is packed as follows (OLAS Buffer size is double of Buffer size):
OLAS buffer input 2: Buffer1, Buffer2
OLAS buffer input 3: Buffer2, Buffer3
OLAS buffer input I+1: BufferN, BufferI+1

It is assumed that each buffer is Nfft/2 samples in length and each OLAS buffer is Nfft samples in length (also the size of the FFT which is part of the OLAS/WOLA).

In the OLAS Output Storage there may be an option either to implement OLAS or WOLA.

In the OLAS option only the newest half time samples in the buffer may be transferred as output to the next process where the old half is dumped. Also in OLAS option there is no window (apodization window) that is applied prior the FFT.

With WOLA the buffers are multiplied with window in the Input OLAS storage prior the FFT. The selection of specific window is done with window which has the feature of w(i)+w(Nfft−1−i)~=1, where i=1 to Nfft/2, Nfft which is the OLAS buffer (fft) length, w(i)−value of window of index i.

The WOLA buffers input storage is packed as follows:
WOLA buffer input(:, i)=OLAS Buffer(:,i).*window (* refers to multiplying each term of both vector with the same length (:,i) vector index i). buffer input(:, i) means the vector (i) of matrix buffer input.

The FFT block is performing FFT and stores the output in the FFT buffer.

The OLAS W block is performing the cancelation weighting. Each FFT output complex term (also referred as bin) is multiplied by the corresponding cancelation weight vector terms. Each antenna brunch has its own weight vector.

After multiplying the FFT output with the cancelation weights in the OLAS W block an IFFT is performed on each result buffer.

In OLAS implementation the OLAS output storage takes the last half of the buffer—the last Nfft/2 samples to the output buffer.

The OLAS buffer output index I result:
OLAS Buffer Output i=IFFT Out i (Nfft/2+1:Nfft)
In WOLA implementation the OLAS output storage is a result of the following sum:
The OLAS buffer output index I result:

OLAS Buffer Output(:, i)=IFFT Out(1+1:Nfft/2,i)+IFFT Out(Nfft/2+1:Nfft,i−1)

The output of both OLAS output storage is the noise free output of the cancelation unit.

The signature memory holds L samples of the known signature. These samples may be in frequency domain or in time domain depending if the frequency offset correction is done in time domain or frequency domain. If the frequency correction is done in frequency domain, the corrected output buffer is issued to the DI box.

If it is in time domain than the DI block will perform FFT on these samples.

Figure 5:
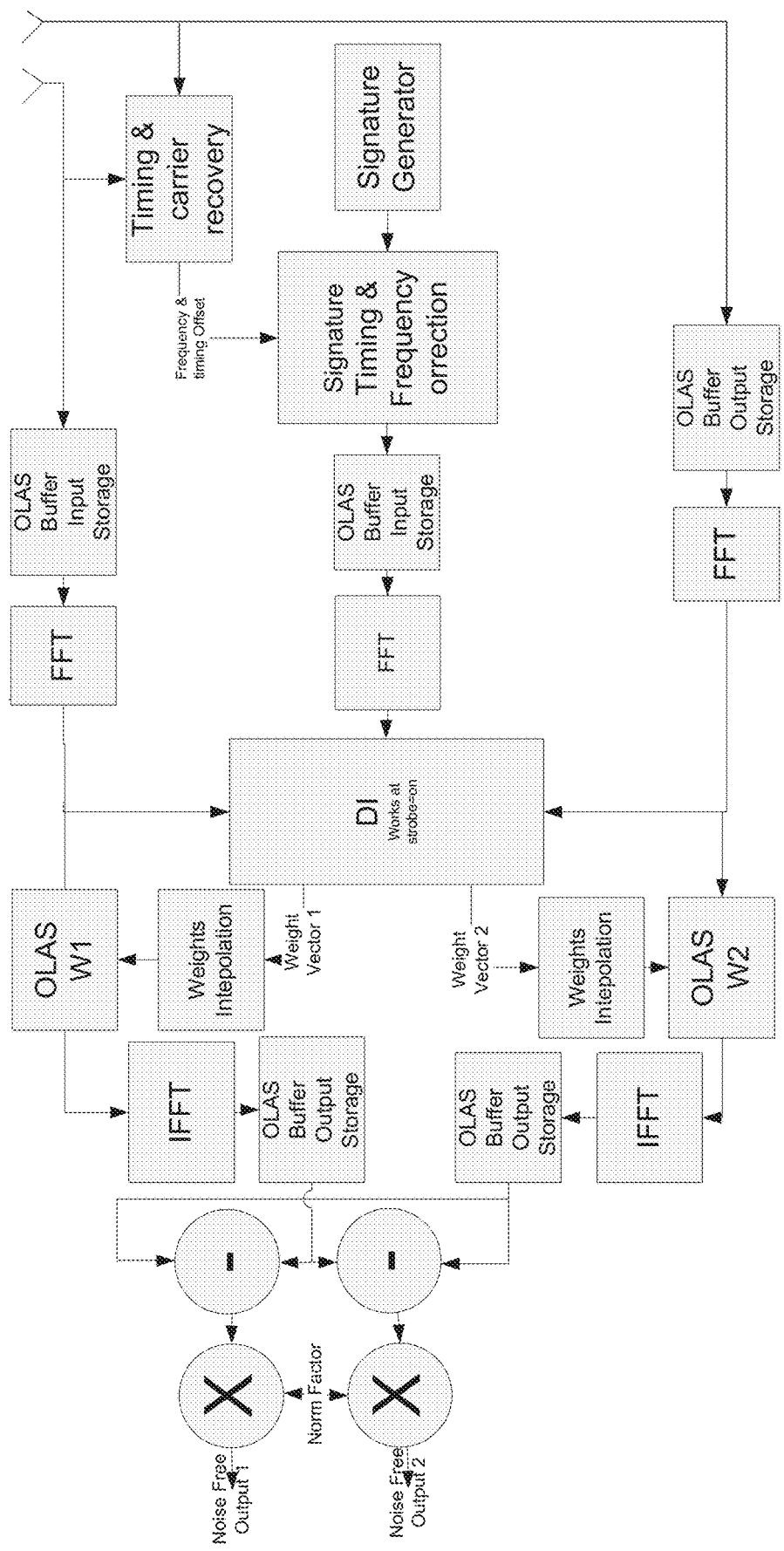
FIG. 5 is a schematic depicting an implementation of DI in 2 antenna case (one output brunch and prior output normalization) with partial frequency signature in accordance with some embodiments of the present invention.

Reference is now made to FIG. 5, which is a schematic depicting an implementation of DI in 2 antenna case (one output brunch and prior output normalization) with partial frequency signature in accordance with some embodiments of the present invention. The signature generator is produced in time domain and after timing and frequency correction it undergoes OLAS buffering input. In WOLA implementation the buffer is multiplied with window (the same window that was applied at the antenna branches).

Figure 6:
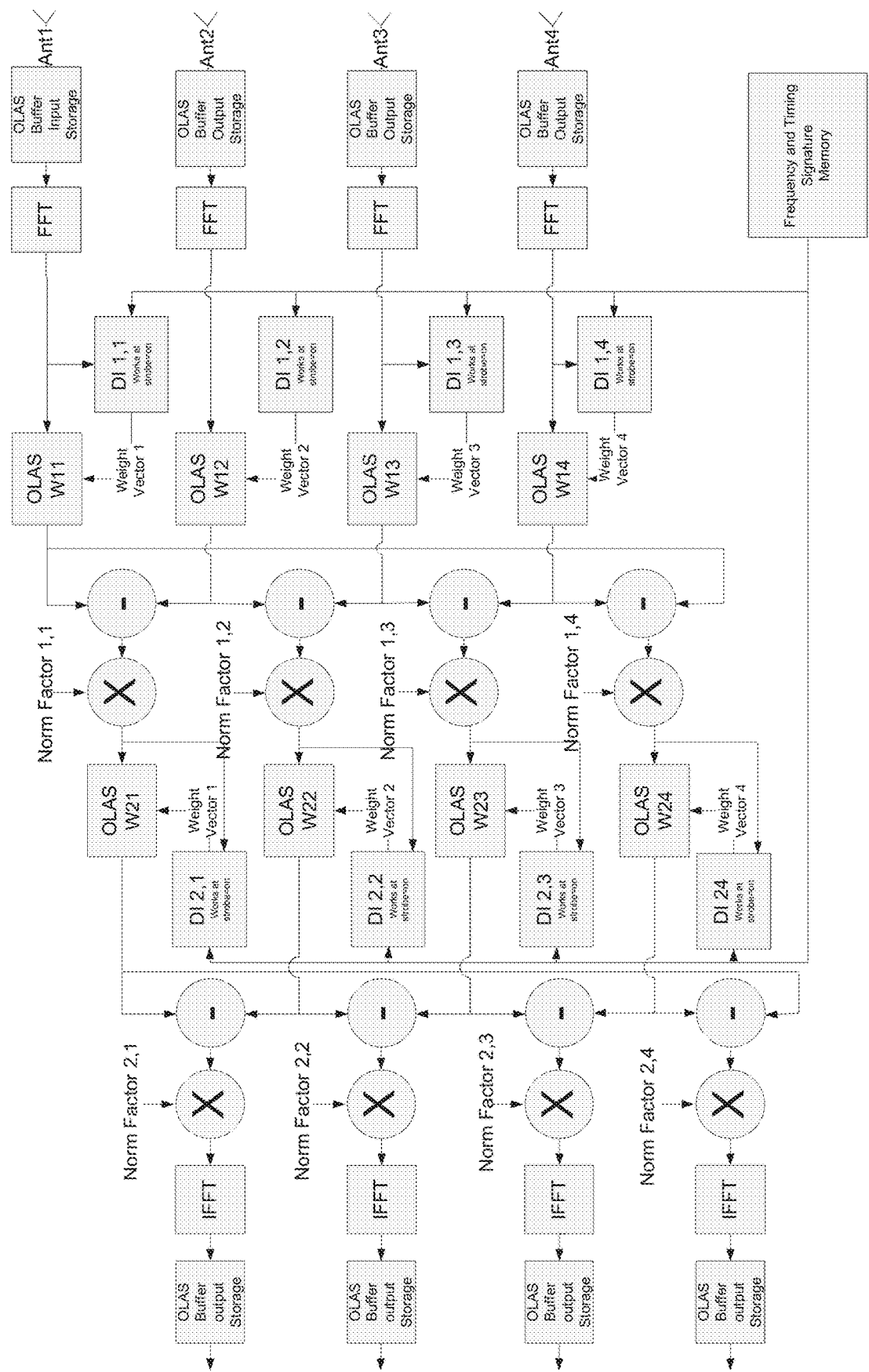
FIG. 6 is a schematic depicting two interfere case with 4 antennas system, in accordance with some embodiments of the present invention.

Reference is now made to FIG. 6, which is a schematic depicting two interfere case with 4 antennas, in accordance with some embodiments of the present invention. As may be seen the cancelation is done in frequency domain cascade for the first interference and the second one.

Referring now back to 106, the DI process may perform calculation of the cancelation weights. For the N antenna case, the inputs are the complex FFT output samples of signal from the N antennas and the frequency domain samples of the signature memory after frequency offset correction.

The DI process may calculate a vector of Nfft cancelation weights for Nfft bins where Nfft denotes the FFT size and/or the number of bins in the frequency side of the OLAS buffer.

With partial time signature the DI process may be active only during the appearance of the signature signal in received signal obtained from the antennas. As discussed herein, the signature time recovery may produce a signature strobe during the signature duration and the DI process is active only during the strobe=ON state (or other implementation).

The time interval when the strobe=ON may deliberately be set as an integer number of half OLAS buffer (Nfft/2 time samples). The DI process may calculate the weights after accumulation of the cross correlation and auto correlation complex terms in M half OLAS buffers—for each OLAS there is one complex cross correlation and one real auto correlation term that is calculated per bin. After M cross and auto correlation terms are accumulated the weights are calculated through division between the cross-correlation accumulations to the auto correlation accumulation. Thus if there is, for example a single half OLAS buffer in the signature duration and the signature appears every P half OLAS frames the weights will be calculated every MP OLAS half frame.

The box has input buffers X1 and X2 each of Nfft length. The input buffers are gathered while the strobe is in ON state—i.e. during reception of signature signal.

When the strobe length is not originally an integer number of half OLAS buffer length (Nfft/2) it may be truncated to an integer number of half OLAS length.

The signature reference may be stored either in frequency or in time domain samples.

When the signature signal is stored in the time domain, it may be of integer times of half OLAS buffer (Nfft/2 samples). In case it is shorter than an integer, no half OLAS buffer length zero are necessarily appended.

When the signature signal is stored in frequency domain it may be of integer times of frequency domain OLAS buffers (Nfft samples each).

As such the TD signature vector(s) length may be at least of Nfft/2 sample length. When it is less than Nfft length, zeros may be appended.

The input to the DI process may be the FFT of the frequency corrected samples of the stored signature.

When the signature buffer is less than Nfft the input in every strobe interval the same FFT of the TD frequency offset corrected signature samples is applied to the DI every strobe=ON. In case of WOLA implementation the input samples are multiplied by the same window that was used in the antenna data path brunches.

In case the signature buffer is of higher than Nfft, OLAS or WOLA is applied to the corrected frequency offset signature samples similar to the method that is done in the antenna data path branches.

In partial frequency band signature implementation, the DI process may be active continuously. The DI accumulation is done for selected OLAS frames. The OLAS framing is similar with the antenna branches and the signature generator signal.

In partial frequency band signature, the DI may be implemented either as running window fashion where for each OLAS frame new set of weights may be calculated according the last NDI OLAS frames. Alternatively, calculation of the weights set is performed every NDI OLAS frames where the weights may be loaded at the end of the NDI OLAS frames accumulation.

For the implementation of frequency domain of signature calculation, the following exemplary parameters may be used:
OLAS buffer length (fft length)—Nfft (Half OLAS buffer length Nfft/2)
Number of signature strobes in DI buffer is denoted as K
Number of OLAS in signature strobe—L (no of half OLAS buffers in DI buffer KL)
s(i)—Time samples of frequency offset corrected signature of length which is of L half OLAS buffers length (total length LNfft/2). i—index of signature time sample
$X_1(i,k)$—FFT output i bin out of Nfft FD bins of antenna 1 during strobe of index k out of DI buffer length of K strobes is ON i bin (out of Nfft freq bins).
$X_2(i,k)$—FFT output i bin out of Nfft FD bins of antenna 2 during strobe of index k out of DI buffer length of K strobes is ON i bin (out of Nfft freq bins).
$X_n(i,k)$—FFT output i bin out of Nfft FD bins of antenna n during strobe of index k out of DI buffer length of K strobes is ON i bin (out of Nfft freq bins).
When the length of the signature is more than 2 half OLAS buffers overlap and save may be done.
In case of signature is of K half OLAS buffer length:
In case of OLAS implementation window=rectangular, all ones.
In case of WOLA implementation the window is the one that was selected for the WOLA (in the antennas data path) as described herein.

$$S(:,1) = \mathit{fft}(\text{window}(1:N\!f\!f\!t).^*s(1:N\!f\!f\!t)$$

$$S(:,2) = \mathit{fft}(\text{window}(1:N\!f\!f\!t).^*s(N/2+1:N\!f\!f\!t+N\!f\!f\!t/2)$$

-continued $$S(:,l) = \mathit{fft}(\text{window}(1:N\!f\!f\!t).^*s((k-1)N\!f\!f\!t/2+1:N+s((k-1)N\!f\!f\!t/2)$$

$$S(:,L) = \mathit{fft}(\text{window}(1:N\!f\!f\!t).^*s((K-1)N\!f\!f\!t/2+1:N\!f\!f\!t+1((K-1)N\!f\!f\!t/2)$$

Each DI process calculates weight a vector that is related to one antenna. The weights may be calculated through accumulation of correlation terms, for example, as follows:

$$w_1(i) = \frac{\sum_{k=1}^{K}\sum_{1}^{L} S(i,l)X_1^*(i,(k-1)l)}{\sum_{k=1}^{K}\sum_{1}^{L} X_1(i,(k-1)l)X_1^*(i,(k-1)l)}$$

$$w_2(i) = \frac{\sum_{k=1}^{K}\sum_{1}^{L} S(i,l)X_2^*(i,(k-1)l)}{\sum_{k=1}^{K}\sum_{1}^{L} X_2(i,(k-1)l)X_2^*(i,(k-1)l)}$$

$$w_n(i) = \frac{\sum_{k=1}^{K}\sum_{1}^{L} S(i,l)X_n^*(i,(k-1)l)}{\sum_{k=1}^{K}\sum_{1}^{L} X_n(i,(k-1)l)X_n^*(i,(k-1)l)}$$

Figure 7:
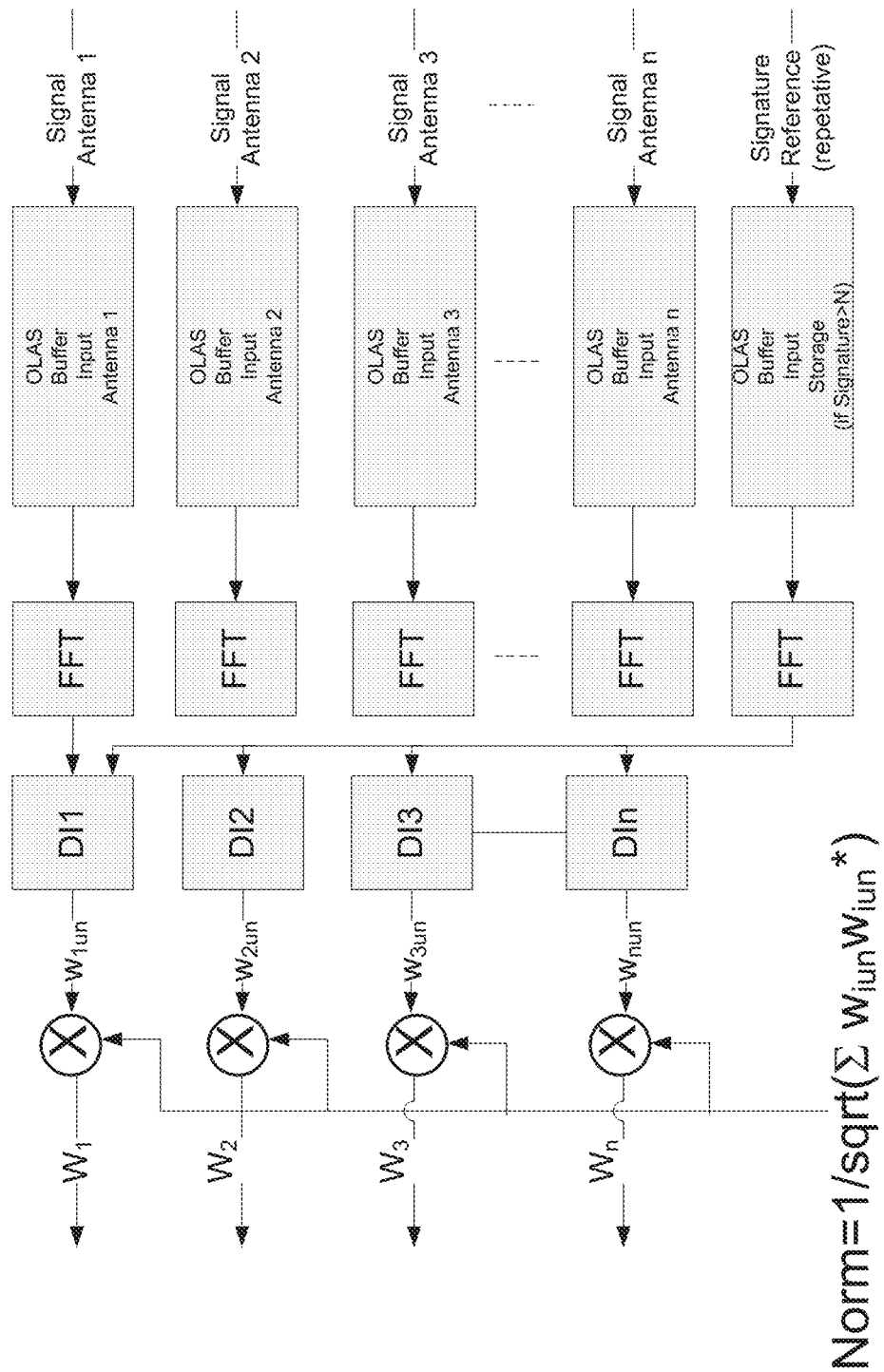
FIG. 7 is a schematic depicting the DI module of N antennas, in accordance with some embodiments of the present invention.

Reference is now made to FIG. 7, which is a schematic depicting the DI component of N antennas, in accordance with some embodiments of the present invention. Each antenna underwent a separate weight calculation. Each weight calculation is done by separate DI component. The input of each DI component is the pertinent FD samples of the received signal from the antenna and the FD samples of the frequency offset corrected signature reference. The signature signal is a common input to all the DI components that are related to all the antennas.

Referring now back to 106, since the weights in every bin are built of the pertinent FD bins of the reference signature and of the signal that was acquired during the reception this signature interval, there may be a case when either the reception of interference in the specific bin is significantly low (e.g., relative to a requirement such as a threshold) and/or the signature reference does not have originally significant power at this specific bin (e.g., relative to a requirement such as a threshold). In such a case the DI process may accommodate a bypass mode which practically turns interference mitigation into a transparent mode and/or may issue a 'shortcut' from the antenna input to the output for the certain bin, which eventually does not necessarily suffer from significant interference.

The way to decide whether there is interference in a certain bin may be to monitor the pertinent complex weight for the certain bin (e.g., each respective bin may be monitored). Since, discussed herein, each output is formed from selected antenna input couple, when the weights for the less interfered bins are lower than some certain threshold value, these weight are forced to be the first antenna input and 0 for the second antenna input. In this way, the subtraction value (e.g., see discussed below) is equal to the original antenna input signal (e.g., bypass implementation). As for each weight bin the nominator represents the cross correlation of the signal with the signature it practically reflects the amount of interference power in the respective bin. When it is low it may be either due to low received interference power in the antenna or low power in the signature of the respective bin (the interference has not theoretically existence in the respective bin). In the case of 2 antennas the threshold check may be performed at both antennas. In case of more than 2 antennas the threshold checking may be done for each couple subtraction separately.

For each subtraction couple with antenna input $X_n(i)$ $X_m(i)$ where n and m denote antenna indices and i denotes the bin index.

Originally with cancellation=ON (in partial time interference) the output bin is a result of signal subtraction—antenna n minus antenna m $Y_{n,m}(i)=w_n(i)X_n(i)-w_m(i)X_m(i)$. When for this specific bin i abs($w_m(i)$)<Threshold or abs ($w_n(i)$)<Threshold then $Y_{n,m}(i)=X_n(I)$.

In the case discussed the cancelation state for the certain bin is regarded as OFF and practically the cancellation block of interference mitigation becomes transparent.

To enable the mitigation of the interference signals, the timing and/or the frequency of the received interfering signal signature may be estimated in order to match the received signature to the stored known, acquired and/or predicted reference samples. Two exemplary implementations are now discussed, a first implementation that is related to known, acquired and/or predicted interference samples signature and a second implementation where the actual interference signature samples are not known. In the second implementation it may be known (e.g., only) that the interference signature has certain periodic interval that shows up in certain period(s) that are known. In order to execute the estimation of the signature signal two exemplary estimation processes are described (e.g., implemented as circuit), based on timing and frequency.

The first implementation relates to timing recovery of known, acquired, and/or predicted interference signature signals. The timing recovery matches the antenna samples timing to the signature samples. The correction may be either in the antennas samples and/or in the signature samples.

Figure 10:
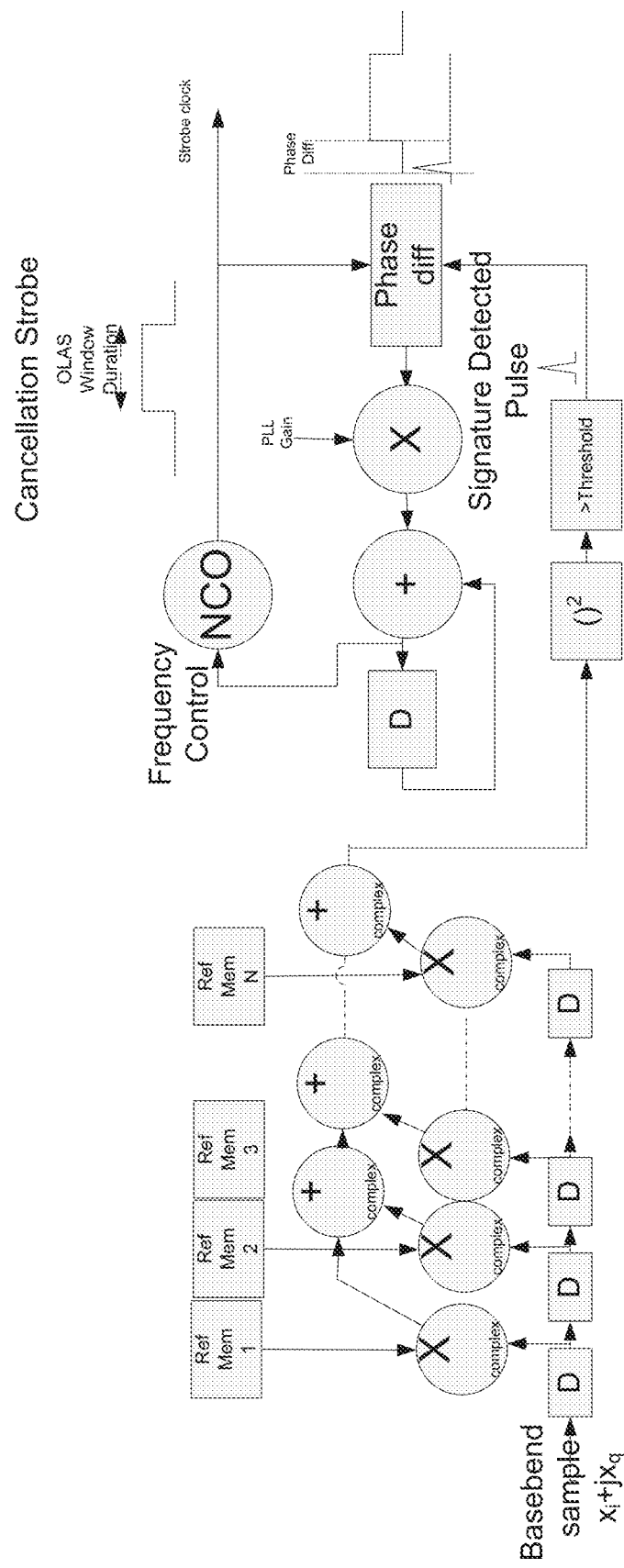
FIG. 10 is a schematic depicting first order PLL to acquire the timing of the signature appearance in order to perform timing recovery and to create timing clock for acquiring interference signal that synchronized with the stored signature, in accordance with some embodiments of the present invention.

Reference is now made to FIG. 10, which is a schematic depicting first order phase locked loop (PLL) to acquire the timing of the signature appearance, in accordance with some embodiments of the present invention. FIG. 10 describes the timing recovery estimator for the partial time signature. It is based on digital PLL that tracks the signature appearances. The phase difference may be computed with high frequency clock and/or counter that measure the delay between a numerically controlled oscillator (NCO) rising strobe pulse and the signature detected pulse that is created by issuing continues cross correlation with the stored signature. The signature detection pulse is produced by correlation finite impulse response (FIR) having coefficients set according the time samples of the signature reference. The NCO frequency is adjusted to be synchronized to the signature detected pulse.

The timing recovery process (e.g., circuit) performs a cross correlation with the known jammer signature samples that are stored in the reference signature memory. An output strobe that is produced by the process may be implemented by the NCO. The NCO initial frequency may be set according to the known signature repetition frequency in the jammer signal. The NCO produces cancelation strobe in ON state, in the partial time signature system, during the duration of the received signature. During the strobe ON state the LMS or DI cancellation process is activated. The ON duration may be equal to single OLAS duration or multiple of OLAS durations. The DI or LMS and the OLAS filtering may be synchronized to the cancelation strobe in order to enable the cancelation process.

Optionally, the interference reference signature signal is not necessarily stored in memory but sampled with deep averaging from the received signal. Such implementation may require that the interference reference be identical (e.g., within a tolerance) and/or periodic with known period. In such implementation the interference is received with the desired signal, however the deep averaging emphasizes the interference reference samples above the desired signal.

In partial frequency band signature, the signature may match the phase and/or the frequency of the frame and/or symbol timing of the signature. The received signature acquisition may synchronize the signature generator.

Figure 11:
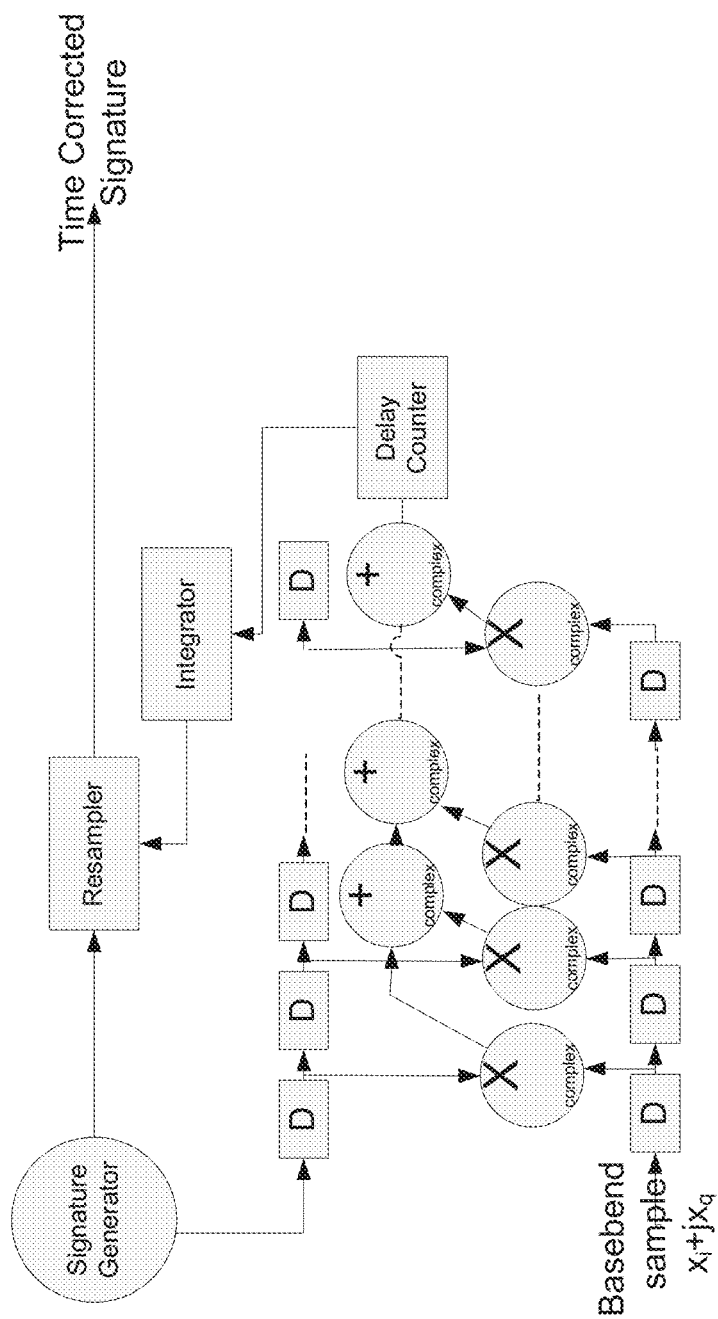
FIG. 11 is a schematic depicting the timing recovery for partial frequency band signature by resampling the stored signature to match and synchronize with the incoming interference, in accordance with some embodiments of the present invention.

Reference is now made to FIG. 11, which is a schematic depicting another embodiment of timing recovery for partial frequency band signature timing recovery, in accordance with some embodiments of the present invention. The process depicted in FIG. 11 uses a variable resampler that corrects the samples out of the signature generator. There may be another component that correct the XTAL oscillator of the interference mitigation block in to match the timing of the signature oscillator to the incoming signal from the antennas.

The delay between the reference signature and incoming signature signal from the antennas (i.e., for partial time and/or frequency signature) may be measured in the frequency domain as a part of the DI process. The DI nominator is a result of cross correlation between the signature reference and the baseband signal from the antennas in frequency domain. As such there the delay may be extracted from the frequency domain of the nominator of the weights or the actual weight vector (the denominator is always real). The delay may be calculated according the phase slope of the bins across the frequency. The phase of each weight bin may be calculated, for example, through CORDIC and/or ARCTAN approaches.

Referring now back to 104, the main target of the frequency recovery process (e.g., circuit) may be to shift the frequency of the incoming received signal to match the stored signature(s) in the memory (e.g., stored in the signature dataset). The shift may be of the incoming signal from the antennas and/or the reference signature samples. The process (e.g., circuit) may employ complex multiplier that act as a phase rotator of the incoming received signal and/or the signature reference output by employing a complex NCO (with SIN and COS components) which may be a part of digital PLL that correct the current phase difference between the received signature and/or the stored reference signature. Through the phase correction the frequency is also corrected. In the time partial signature the phase difference may be measured during the active time of the cancelation strobe that is the output of the timing circuit.

The ARCTAN component may be implemented, for example, through CORDIC based approach and/or by using Tailor series expansion of the ATAN function.

Figure 12:
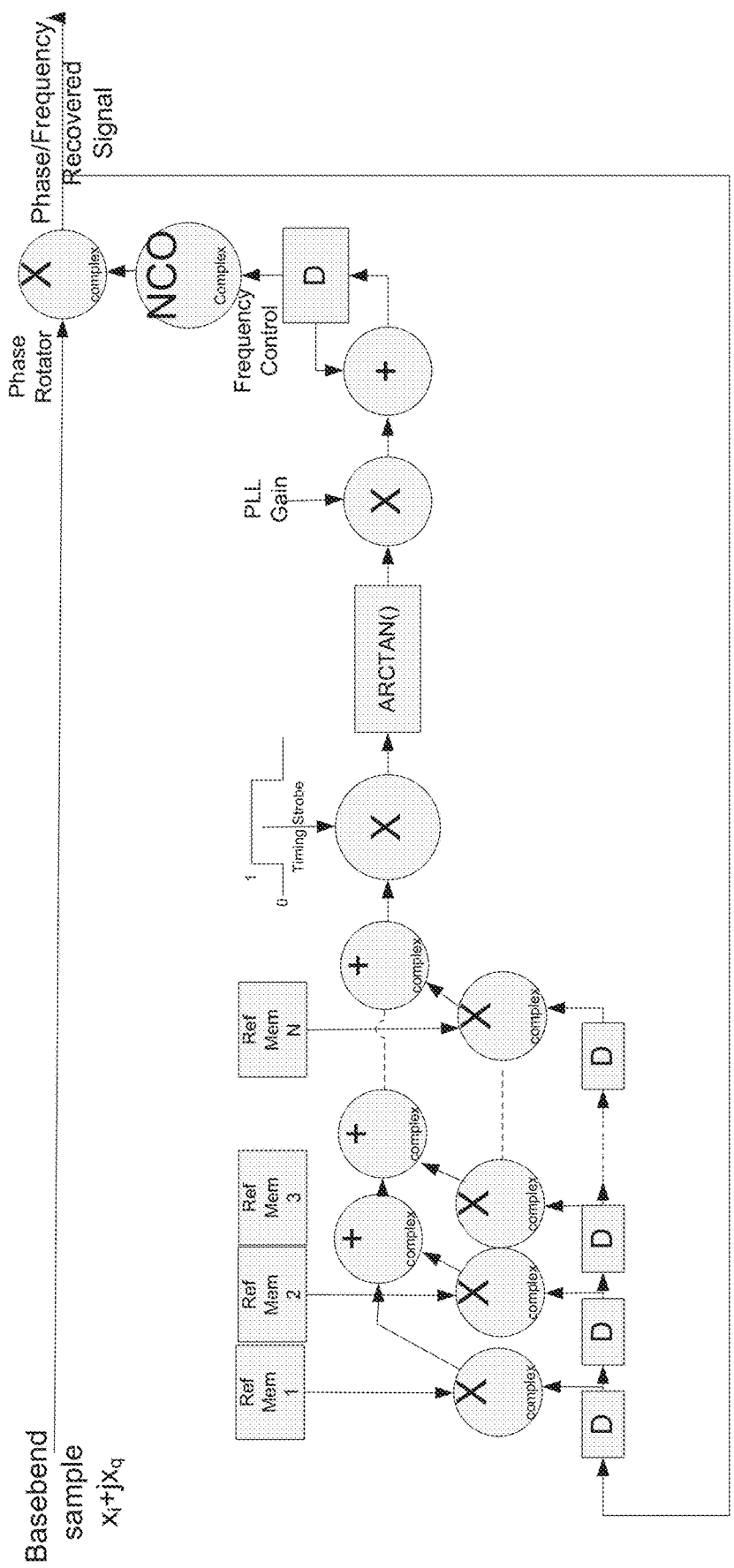
FIG. 12 is a schematic depicting an implementation incorporate first order PLL (integration feedback only) second order PLL can be implemented using integration and proportional feedback in order to match the incoming signal frequency with the frequency of the stored signature, in accordance with some embodiments of the present invention.

Reference is now made to FIG. 12, which is a schematic depicting an implementation incorporating first order PLL (integration feedback only), where second order PLL may be implemented using integration and/or proportional feedback, in accordance with some embodiments of the present invention. FIG. 12 depicts the partial time signature interference mitigation with frequency shift on the samples that come from the antennas, in accordance with some embodiments of the present invention. The implementation in partial frequency band may be similar. The cross correlation is taken with the signature generator output.

Optionally, the interference signal is synchronized to GPS or other geographical location data. The frequency offset may be compensated by synchronizing interference mitigation module also to GPS. Alternatively or additionally, the interference signal uses pilot signals to aid the carrier recovery of its own receiver. These pilots may be exploited also by interference mitigation for carrier recovery/frequency offset estimation.

An implementation for timing and/or signature recovery of unknown signature of periodic interference of known interval duration and repetition rate is now described. The signature of the signal is not known. The only thing that may be known it that the signal has certain periodic interval with known duration and/or repetition rate. The actual signature may be retrieved by timing recovery of the periodic interval in order to acquire the actual samples of the periodic signature of the interference signal.

After the timing (e.g., exact timing) of the signature appearance of the interference signal is estimated as described herein, consecutive interference signature samples are processed and/or after deep averaging of certain intervals the signature of the interference signal may be recovered. The recovered signature samples may be used as the interference mitigation reference signature signals as described herein.

Reference is now made to FIG. 13, which is a schematic depicting an implementation of timing Recovery of unknown signature of periodic interference interval samples, where the actual signature is acquired from the antenna, in accordance with some embodiments of the present invention. In order to acquire the signature that may have often lower power than the desired signal the antenna branch with the maximum received interference power may be selected. After the selection of the antenna branch very deep averaging may be executed by taking advantage of the signature repetition to extract the signature samples while lowering the impact of other signals (such the desired signal). In order to be able to extract the signature samples the timing of the signature interval appearance. The timing recovery of the unknown periodic signature of the interference may be based on auto correlation of current samples with the post samples of the previous signature samples. FIG. 13 depicts PLL that is designed to recover the timing of the repeating signature received interval of interferer appearance.

D denotes a delay between two adjacent signature appearances where d denotes a delay of one sample. Each received signature interval is complex auto correlated with the previous signature appearance, d denotes the sample delay. The number of d taps may be set according to expected signature duration in samples.

The auto correlation may be done on N consecutive repeating signatures, where N is defined by the stationarity of the wireless channel between the interference source and the receiver antennas. The detection of rising peaks of the autocorrelation may be used as reference ticks of digital PLL that produces strobe that is in its 'ON' state when the signature appearance is expected. The autocorrelation may be done on the last M signatures signal in running window fashion where every new signature samples the old M signature samples are omitted. M may also be defined according the stationarity mentioned above.

The strobe may be used for extracting the received signature and performing the averaging. It may be used also for enabling the interference mitigation cancellation process.

At 108, an interference mitigation process is performed on the digital baseband signals (i.e., received from the reception sources) using the mitigation weights to generate clean digital baseband signals.

Optionally, the interference mitigation process is performed only using the mitigation weights computed for the part of the received signal matched to the portion(s) of the signature signal, indicative of the interference signal. Optionally, interference mitigation is not performed for the desired signals and/or non-interference signals. Optionally, interference mitigation is performed independently of other processing of the desired signals and/or non-interference signals.

Optionally, a correlation between the mitigation weights (or sets of mitigation weights) is computed for obtaining an estimate of an error of each respective mitigation weight. Each set of mitigation weights may be computed for a respective reception source (e.g., antenna). The interference mitigation process may be performed when the correlation is above a threshold indicative of similarity of error for the mitigation weights, and/or the mitigation process is not performed when the correlation is below the threshold. The threshold may be selected for no more than a target amount of performance segregation for the clean baseband signals due to the interference mitigation process using the mitigation weights.

Optionally, for the case where the digital baseband signal is received by two antennas, the clean digital baseband signal is computed by subtracting from a direct baseband signal obtained from the first antenna, a weighted signal computed from the mitigation weights computed for the second antenna. The process may be extended to three or more antennas.

Optionally, when the baseband signals include multiple interference signals each associated with a certain signature signal (e.g., of multiple candidate signature signals), the process of performing the matching, the calculating the mitigation weights, and the interference mitigation process is iterated for each one of the different signature signals. The iterative process is sometimes referred to herein as cascade.

In the general case with interference mitigation, any interfering signal with pre-known partial signature in the time domain and/or frequency domain and/or both may be mitigated as described herein.

As discussed herein, interference mitigation may cancel single or multiple interference sources. The interference mitigation module may be located between the receiver and the antenna array that originally was targeted to provide diversity or MIMO gain to the receiver. The main objective of the diversity preservation is to maintain low cross-correlation among the antenna inputs of the receiver. It is understood that the diversity consumes degrees of freedom from the cancelation process. If interference mitigation is aimed to cancel a single interference source and there are only two antennas there is no way to necessarily preserve diversity with active cancelation in the bins that suffer from significant interference power. In contrast, bins that are interference free (or carry significantly low interference power) the diversity and MIMO gain may be fully preserved. In case of a single interference source if there are more than two antenna the diversity and MIMO gain at those bins which suffer from interference signal and undergoes interference mitigation process may be preserved with one less degree of freedom which mean that if the diversity/MIMO was originally of order N (the number of the antennas) it will be reduced to N−1.

In case of multiple interference source which may be common, for example, with interferers that employ MIMO transmitter, additional degrees of freedom may be consumed by each cancelation effort of each transmitter.

For the single interference source case, in order to preserve the diversity of the multiple receiver sources (e.g., antennas), the following rule for combination of the weighted output may be maintained: for a weighted frequency domain frequency bin of a respective baseband signal obtained from a certain reception source (e.g., antenna), and an output of a couple from a pair of reception sources (e.g., pair of antennas), the reception sources is a sum of outputs of the couple, where weighted outputs are arranged as couples where each weighted output participates in two pairs of reception sources. In terms of mathematical representation, the rule for combination is denoted as:

When $X_{nw}(i)$ denotes the weighted frequency domain bin of the signal that came from antenna n (Weighted means the input signal that is multiplied by the weight w(i) for the pertinent bin):

$$X_{nw}(i)=X_n(i)w_n(i).$$

The output $Y_n(i)$ is defined as the output of the couple from antenna n and antenna m.

The output $Y_n(i)$ is the sum of outputs of the couples (the first input antenna index set the output antenna index).

The rule is that all the weighted output are arranged as couples where each weighted output is participating in two couples as follows with the antenna indices: 1-2, 2-3, 3-4 . . . n-1-n, . . . N-1-N, N-1.

The DI weighting processing cause that the interference signal component in each weighted output are close to identical for all weighted output, such that simple subtraction of each arbitrary couple out of the weighted outputs is expected to rejected the interference component from the couple combined output (for any selected couple).

After subtraction each output bin undergoes normalization to guarantee unity gain weighting in order to preserve the same AWGN thermal noise in the combined output to be the same as in the sum of all antenna input.

The following equations are an example for the two antenna case:

$$Y_1(i) = NF_{12}(i)(X_{1w}(i) - X_{2w}(i)) = NF_{12}(X_1(i)w_1(i) - X_2(i)w_2(i))$$

$$Y_2(i) = NF_{12}(i)(X_{2w}(i) - X_{1w}(i)) = NF_{12}(X_2(i)w_2(i) - X_1(i)w_1(i))$$

$$NF_{12}(i) = \sqrt{\frac{1}{w_1(i)w_1(i)^* + w_2(i)w_2(i)^*}}$$

In bins that do not suffer from interference:
When abs($w_1(i)$) or abs ($w_2(i)$)<Threshold:

$$Y_1(i)=X_1(i) \to w_1(i)=1 w_2(i)=0$$

$$Y_2(i)=X_2(i) \to w_2(i)=1 w_1(i)=0$$

The following equations are an example for the three antenna case:

$$Y_1(i) = NF_{12}(i)(X_{1w}(i) - X_{2w}(i)) = NF_{12}(i)(X_1(i)w_1(i) - X_2(i)w_2(i))$$

$$Y_2(i) = NF_{23}(i)(X_{2w}(i) - X_{3w}(i)) = NF_{23}(i)(X_2(i)w_2(i) - X_3(i)w_3(i))$$

$$Y_3(i) = NF_{13}(i)(X_{3w}(i) - X_{1w}(i)) = NF_{13}(i)(X_3(i)w_3(i) - X_1(i)w_1(i))$$

$$NF_{12}(i) = \sqrt{\frac{1}{w_1(i)w_1(i)^* + w_2(i)w_2(i)^*}}$$

$$NF_{23}(i) = \sqrt{\frac{1}{w_2(i)w_2(i)^* + w_3(i)w_3(i)^*}}$$

$$NF_{13}(i) = \sqrt{\frac{1}{w_1(i)w_1(i)^* + w_3(i)w_3(i)^*}}$$

In bins that do not suffer from interference:
When abs($w_1(i)$) or abs ($w_2(i)$)<Threshold:

$$Y_1(i)=X_1(i) \to w_1(i)=1 w_2(i)=0$$

When abs($w_2(i)$) or abs ($w_3(i)$)<Threshold:

$$Y_2(i)=X_2(i) \to w_2(i)=1 w_3(i)=0$$

When abs($w_3(i)$) or abs ($w_1(i)$)<Threshold:

$$Y_3(i)=X_3(i) \to w_3(i)=1 w_1(i)=0$$

The following equations are an example for the general N antenna case:

$$Y_1(i)=NF_{12}(X_{1w}(i)-X_{2w}(i))=NF_{12}(X_1(i)w_1(i)-X_2(i)w_2(i))$$

$$Y_2(i)=NF_{23}(X_{2w}(i)-X_{3w}(i))=NF_{23}(X_2(i)w_2(i)-X_3(i)w_3(i))$$

$$Y_3(i)=NF_{34}(X_{3w}(i)-X_{4w}(i))=NF_{34}(X_3(i)w_3(i)-X_4(i)w_4(i))$$

$$Y_{N-1}(i)=NF_{N-1\,N}(X_{N-1w}(i)-X_{Nw}(i))=NF_{N-1\,N}(X_{N-1}(i)w_{N-1}(i)-X_N(i)w_N(i))$$

$$Y_N(i)=NF_{1\,N}(X_{Nw}(i)-X_{1w}(i))=NF_{1\,N}(X_N(i)w_N(i)-X_1(i)w_1(i))$$

In bins that does not suffer from interference:
When abs($w_1(i)$) or abs ($w_2(i)$)<Threshold:

$$Y_1(i)=X_1(i) \to w_1(i)=1 w_2(i)=0$$

When abs($w_2(i)$) or abs ($w_3(i)$)<Threshold:

$$Y_2(i)=X_2(i) \to w_2(i)=1 w_3(i)=0$$

When abs($w_3(i)$) or abs ($w_4(i)$)<Threshold:

$$Y_3(i)=X_3(i) \to w_3(i)=1 w_1(i)=0$$

When abs($w_{N-1}(i)$) or abs ($w_N(i)$)<Threshold:

$$Y_{N-1}(i)=X_{N-1}(i) \to w_{N-1}(i)=1 w_N(i)=0$$

When abs($w_N(i)$) or abs ($w_1(i)$)<Threshold:

$$Y_N(i) = X_N(i) \to w_N(i) = 1 w_1(i) = 0$$

$$NF_{12}(i) = \sqrt{\frac{1}{w_1(i)w_1(i)^* + w_2(i)w_2(i)^*}}$$

$$NF_{23}(i) = \sqrt{\frac{1}{w_2(i)w_2(i)^* + w_3(i)w_3(i)^*}}$$

$$NF_{34}(i) = \sqrt{\frac{1}{w_3(i)w_3(i)^* + w_4(i)w_4(i)^*}}$$

$$NF_{N-1N}(i) = \sqrt{\frac{1}{w_{N-1}(i)w_{N-1}(i)^* + w_N(i)w_N(i)^*}}$$

$$NF_{1N}(i) = \sqrt{\frac{1}{w_1(i)w_1(i)^* + w_N(i)w_N(i)^*}}$$

Figure 8:
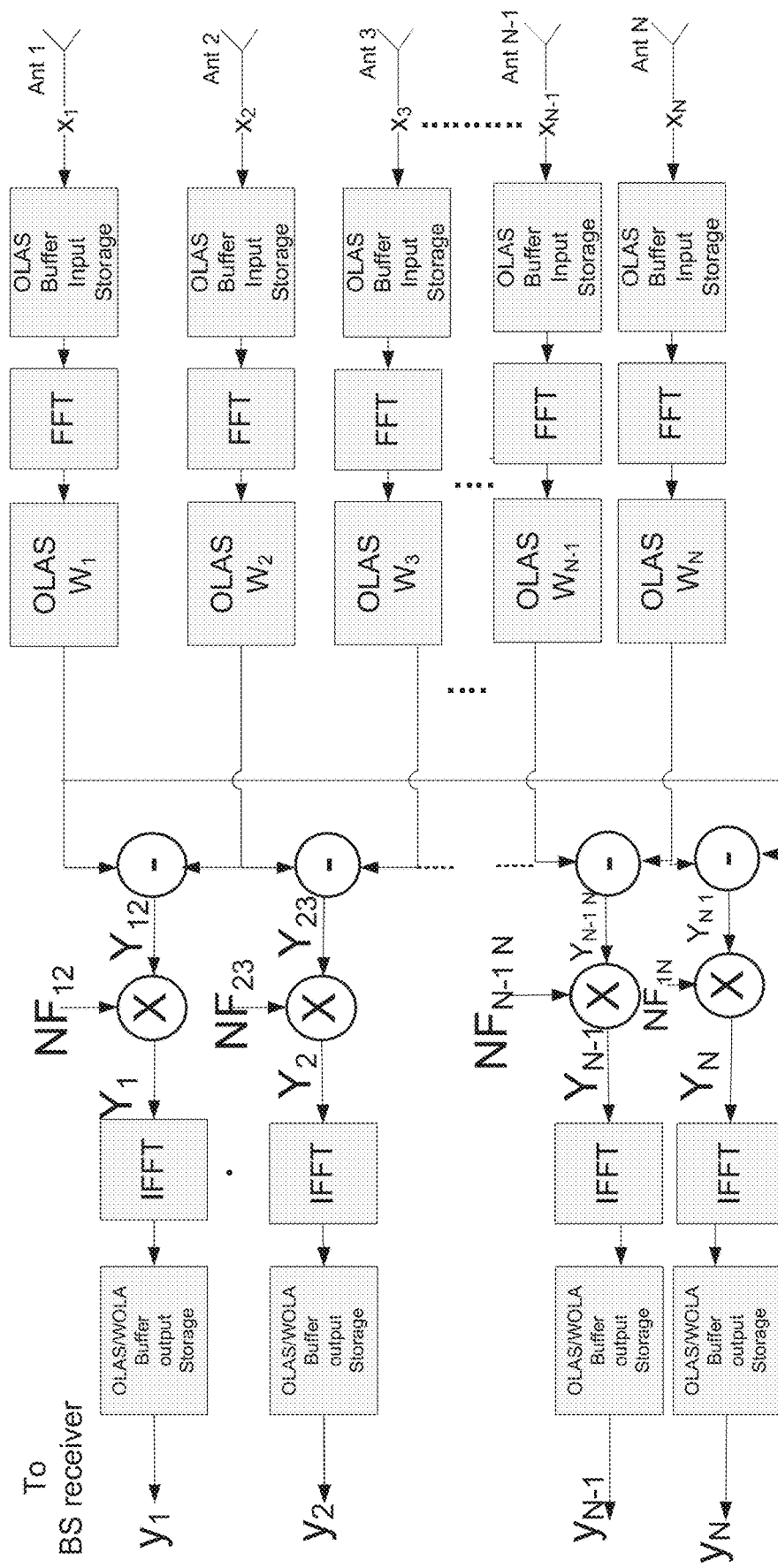
FIG. 8 is a schematic depicting the signal path combination for the N antenna case, in accordance with some embodiments of the present invention.

Reference is now made to FIG. 8, which is a schematic depicting the signal path combination for the N antenna case, in accordance with some embodiments of the present invention.

Figure 9:
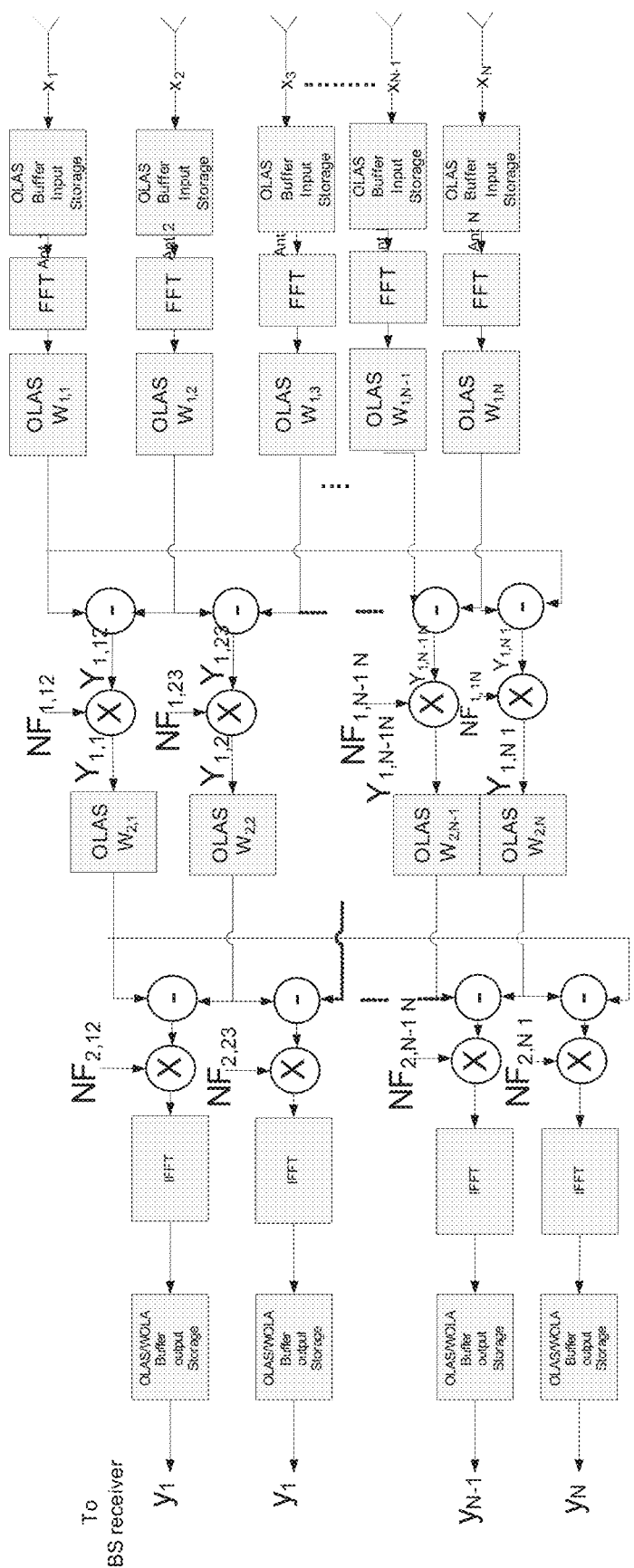
FIG. 9 is a schematic depicting data path combination for two interference sources, in accordance with some embodiments of the present invention.

As discussed herein, for the multiple interference source case, each interference source is canceled through using cascade fashion as depicted in the following figure. Reference is now made to FIG. 9, which is a schematic depicting data path combination for two interference sources, in accordance with some embodiments of the present invention. Each weight is calculated with separate DI with other input of the signature reference. In the first stage the weights are calculated from the first interference signature and in the second stage the weights are calculated from the second interference signature.

The case of interference mitigation when the known, acquired and/or predicted interference is a continuous wave (CW) and/or a very narrow band signal is now described.

Figure 15:
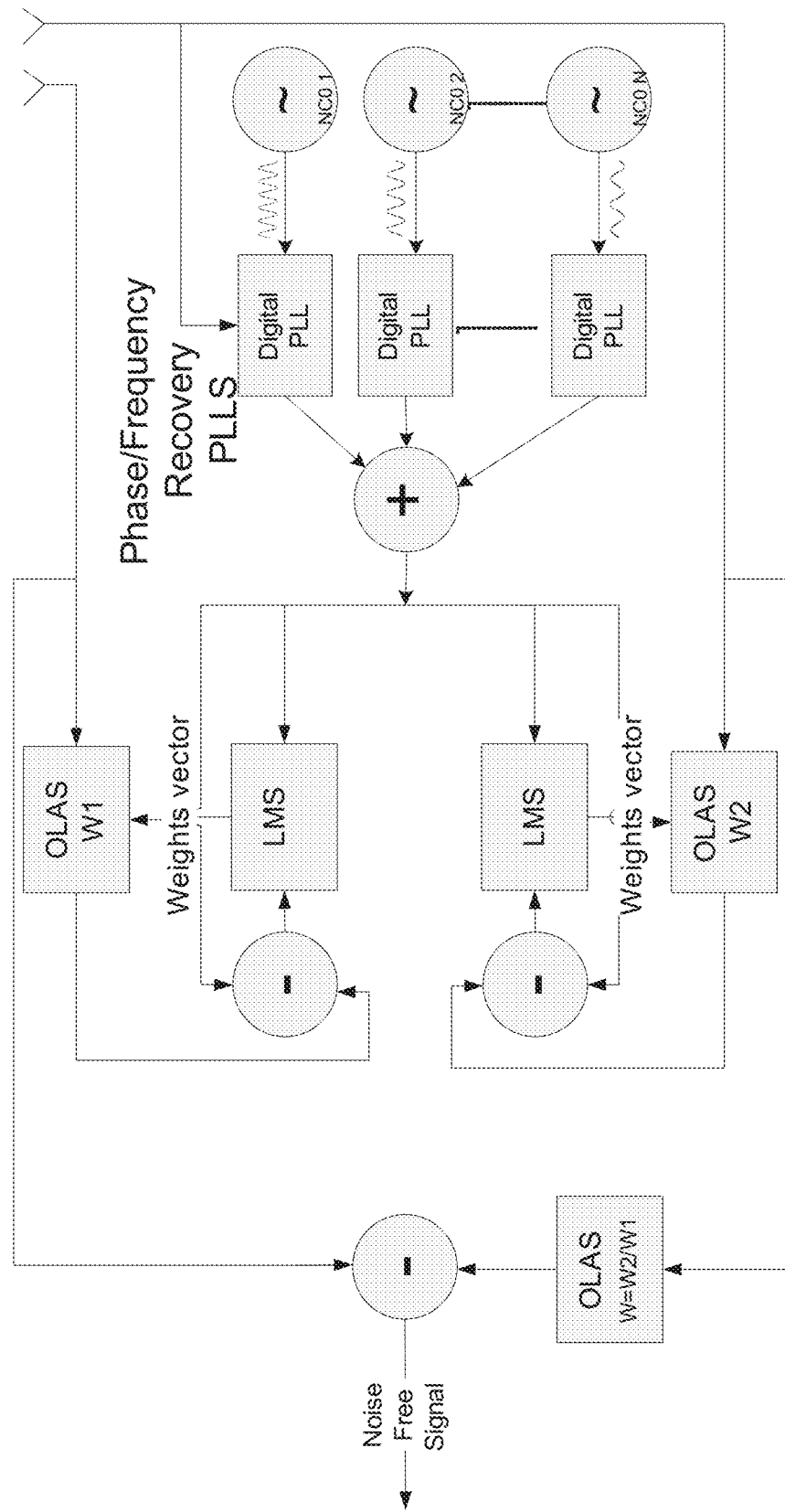
FIG. 15 is a schematic depicting LMS implementation of interference mitigation-CW or narrow band interference, in accordance with some embodiments of the present invention.

Reference is now made to FIG. 15, which is a schematic depicting LMS implementation of interference mitigation-CW, in accordance with some embodiments of the present invention. FIG. 15 depicts the process for interference mitigation for rejecting known CW and/or narrow band interfering signals. The topology and the basic idea of the CW-interference mitigation is similar to the described process (e.g., circuit) for broadband jammers. In FIG. 15, the cancellation is done against reference signal that is implemented trough NCO with the pre-known frequency of the interfering signal.

The interferer CW frequency is known a priory and generated by an internal complex NCOs. There may be several CW interference rejections when the interference signals are in different frequency. CW-interference mitigation works continuously and not during bounded signature time.

The reference signal may be created from several CW signals. The reference signal may be produced by NCOs with frequency that match(es) the frequency of the CW interfering signals. A dedicated digital PLL for each reference may be employed in order to accommodate the frequency difference of the received CW signals and its corresponding stored reference signals.

The weights may be calculated (e.g., only) on the bins that the interferer signal occupies. The WOLA may implement a prior FFT window to avoid leakage from the weights that correspond to the weights of the other jammers. The other weight vector coefficients that correspond to frequency bins which the jammer does not occupy may be set to 1 for one antenna (from the coefficient of W1) and 0 in the other (from the coefficient of W2).

When the jammer is far more stationary than the desired UL signal the μ of the LMS may be very low in order to average more of the jammer weights.

Figure 16:
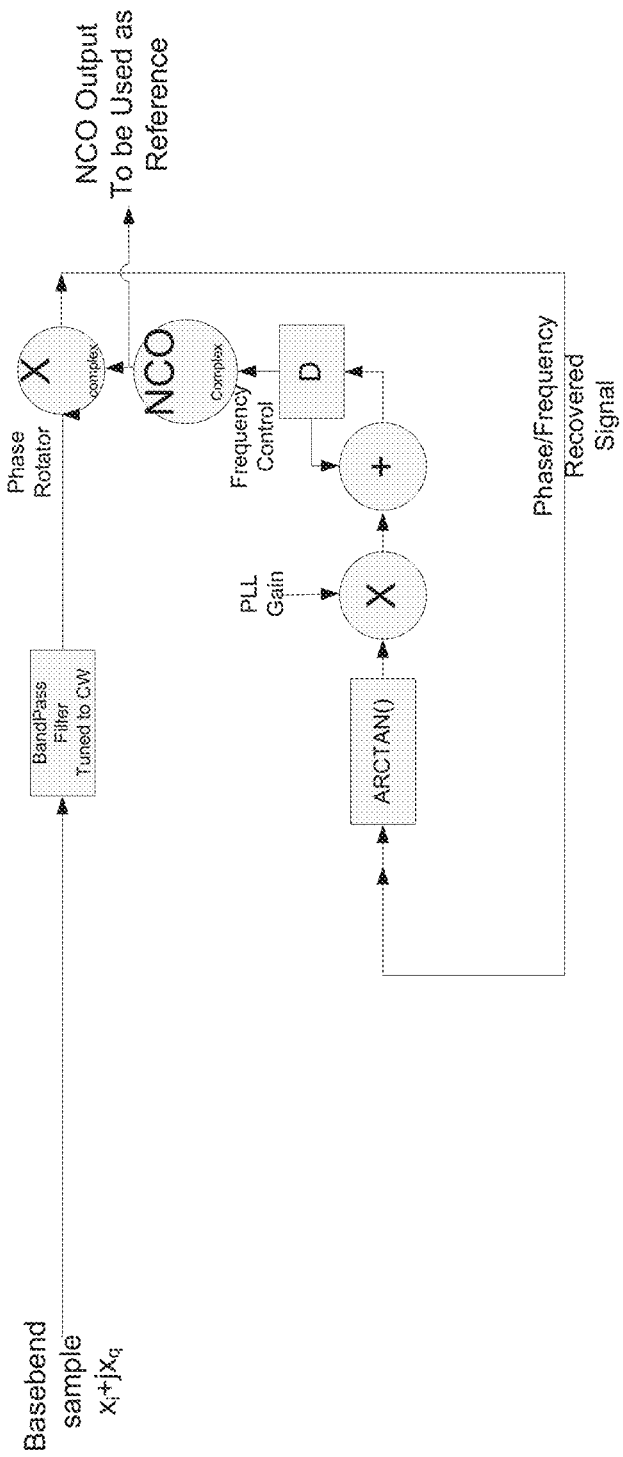
FIG. 16 is a schematic depicting a process for phase/frequency recovery PLL that will use the reference signal for CW interference, in accordance with some embodiments of the present invention.

Reference is now made to FIG. 16, which is a schematic depicting a process for phase/frequency recovery PLL, in accordance with some embodiments of the present invention. The target of the phase/frequency recovery is to set the output of the complex NCO to be used as reference for each existing CW interfering signal in order to enable the cancelation in the LMS circuit. Each jamming tone may be tracked by PLL in order to set the reference NCO frequency. The incoming signal is filtered with narrowband bandpass filter in order to acquire the interfering tone with sufficient SNR. The center frequency of this filter and the initial frequency of the NCO will set according a prior knowledge of the jamming tone that will be stored in the jammer parameter of the system.

Multi-sector cancellation is now described. Cellular sites with base station and/or EnodebB include multiple sectors. When there is an interference related to the site in most cases the interference is more dominant in one sector and less dominant in the other sectors.

Reference is now made to FIG. 30, which is a schematic depicting the interference mitigation module for acquiring cancelation weight in the sector where the reception of the interference is dominant to cancel this same interference signal in other sectors, in accordance with some embodiments of the present invention. The interference signal in the sector where its reception is dominant may be used as a continuous signature signal for interference mitigation cancellation in the other sectors. It may be assumed that the desired UEs signals will be different in each sector so there will not be a risk of canceling desired signal. The (e.g., only) desired signal cancellation risk may be available in UEs that are in two sector coverage boundaries where these UEs may be received at both sectors. In that case cancellation desired UE signals in one sector will not cause any harm since this pertinent UE will be served in the other sector where interference mitigation cancellation is not being applied. It may be indicated that cancellation UE reception in one sector of UE that is received by both sectors is even an enhancement since it may reduce inter sector frequency reuse one interference.

FIG. 30 depicts the multi-sector cancellation implementation. The interference signal is received strongly in sector 2. Since sector 2 may include multiple MIMO receivers, the receiver that receives the strongest interference signal power is selected. Alternatively, the interference may be acquired with receiving beam former of all the MIMO antennas in sector 2 toward the interference source. The interference signal in sector 2 is used as the reference signature for interference mitigation weight calculation with each of one of the MIMO antennas of sector 1 (in the drawing there are 2 antennas, but greater number of antennas may be used). FIG. 30 includes 2 UEs that represent the desired signal and it is assumed that they will not affect the mitigation weight calculation since each UE is received dominantly in a respective single separate sector.

Referring now back to FIG. 1, optionally, at 110, the clean digital baseband signals are conveyed to a baseband receiver of the wireless network. The clean digital baseband signals include the desired signals and/or the non-interference signals.

Optionally, at 112, performance of the receiving device and/or interference mitigation module 204 may be monitored.

Optionally, the level of interference is monitored. The level of interference may be monitored without the application of interference mitigation, and/or after application of interference mitigation.

Optionally, at 114, system components are adjusted. Optionally, the adjustment is based on the monitoring. The adjustment may be performed to improve interference mitigation.

Optionally, the amount of matching of the signature signal to the received signals is adjusted, to improve accuracy of detecting the interference signals and/or reduce risk of incorrectly labeling desired signals as interference signals. For example, the correlation threshold that separates between a match and a non-match may be adjusted.

Optionally, antennas are added to the receiving device. Additional (e.g., auxiliary) antennas may be added in the case of a single pre-existing antenna, to provide multiple antennas to allow interference mitigation. Alternatively, additional antennas may be added in the case of multiple pre-existing antennas. Optionally, the number of additional antennas is selected based on the number of simultaneous interferers (in time and/or frequency). The number of additional antennas may be equal to or greater than the number of simultaneous interferes, to allow the interference mitigation to be performed to cancel interference from all the simultaneous interferes.

Optionally, the presence of additional interference signals is determined. When the total number of determined interference signals is equal to the number of existing antennas, additional directional antennas may be deployed. The additional antennas may be installed with a direction towards the additional interference signal, so that the additional interference signal is cancelled based on the additional directional antenna. Optionally, the pre-existing antennas are arranged for spatial and/or polar diversity.

Alternatively, additional antennas are not required, for example, the number of pre-existing antennas or previously added antennas is sufficient. Optionally, the number of concurrent interferers (in time and/or frequency) may be lower than the number of receive antennas. Optionally, sufficient degree of freedom is present for successful interference mitigation, for example, in the case of spatial and/or directional antenna diversity arrangements.

Optionally, at 116, one or more features described with reference to 102-114 are iterated, for example, for continuous interference mitigation for continuously received baseband signals.

Some usage examples of the interference mitigation process described herein with reference to FIG. 1 and/or implemented by components of system 200 described with reference to FIG. 2 and/or other implementations described herein, for example, with dereference to other FIGs. are now described.

Practically any interference which either has known signature and/or pattern in at least a part of the time and/or part of frequency band may be a candidate for mitigation by component such as the interference mitigation module described herein and/or by the systems, apparatus, methods, and/or code instructions described herein. Transmission signals generally employs either a periodic preamble in order to let the potential receivers to train to these preambles and/or continues pre-known pilots within the frequency band at known frequencies in order to enable the receiver to execute continuous channel estimation in order to enable data detection. The training may be required for timing synchronization, carrier recovery and/or channel estimation. In order to improve the timing resolution and/or to enable channel estimation with wide coherent bandwidth (scattering channel with significant delay spread) the preamble and/or the pilots may have wideband signal that may occupy the whole bandwidth.

Two exemplary cases of known interference that may be mitigated by the interference mitigation module described herein and/or by the systems, apparatus, methods, and/or code instructions described herein are now described.

The first case relates to Digital TV (DTV) interference to long-term evolution (LTE) uplink channel. In North America there are new allocations for LTE bands in 700 megahertz (MHz). The new allocation has created problem of interference due to adjacency between the DTV and the LTE bands. One known example is the adjacency of channel 51 of DTV and block A of band 12 of LTE. The LTE block A of band 12-uplink is from 699 MHz to 704 MHz and Channel 51 of DTV operates from 693.25 to 697.75 MHz (Center freq 695.5 MHz). Assuming the regulation mask attenuation of the DTV carrier is the only safeguard against interference to the adjacent LTE band it is worthwhile to analyze it. The DTV mask requires −32 dBC leakage in 3.5 MHz offset—at 699 MHz which the left band edge of the LTE band is. The mask defines slope in dBC that brings the leakage of the DTV in the right LTE band edge to −89 dBC. The regulation allows the DTV transmitter to transmit with ERP of up to 90 dBm. Simple calculation may show that LTE receiver that is located 50 KM from the DTV transmitter may suffer from degradation of the noise floor of about 5 dB.

The common standard of the north America DTV is advanced television systems committee (ATSC). With respect to the ATSC frame and preamble, ATSC uses 8-VSB (8-level vestigial sideband) modulation which is a kind of single side band 8-ASK (amplitude shift keying) modulation.

The ATSC symbol clock is derived from the reference of 10 MHz clock as follows:

$F_{CLK}=433998/223795 \times 10^7$ Hz $F_{CLK}=2 \times 3^5 \times 19 \times 47/5 \times 11 \times 13 \times 313 \times 10^7$ Hz $F_{SYM}=313/564 \times F_{CLK}$ $F_{SYM}=10.762$ MHz. Symbol duration: 92.9nsec.

The baseband sample clock of the ATSC is 19.393 MHz.

Since the symbol clock is derived from reference of 10 MHz, when the DTV 10 MHz reference is derived from GPS and the clock of interference mitigation module is derived also from GPS than the interference mitigation module is expected to be fully synchronized with the DTV transmitter and as such there will not be any requirement for frequency offset and frame/symbol clock corrections. Another process for gaining time synchronization may be implemented by choosing 10 MHz reference voltage-controlled crystal oscillator (VCXO) that may be aligned through a recovery scheme to the 10 MHz of the ATSC by dedicated timing recovery circuit. Such alignment may guarantee symbol clock and/or carrier clock synchronization.

The data of the ATSC is organized with segments. Each segment is 832 symbols long. In every 313 segments—24.2 msec there is a special segment that is comprised mainly from several pseudo random 8-VSB sequences in a repetitive in nature. This segment is known as Field Sync to the DTV people.

Figure 17:
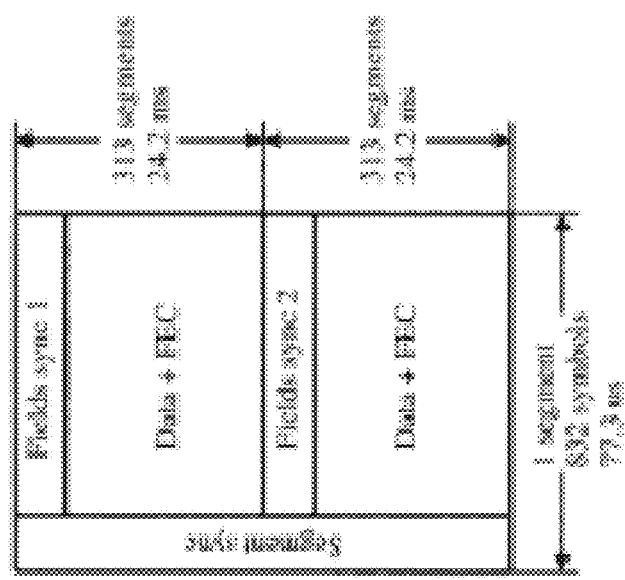
FIG. 17 is a schematic depicting the 8-VSB data frame of ATSC signal interference with the field sync segments, in accordance with some embodiments of the present invention.

Reference is now made to FIG. 17, which is a schematic depicting the 8-VSB data frame with the field sync segments, in accordance with some embodiments of the present invention. The signature of the ATSC signal that interference mitigation may use is optionally the described Field Sync segment which is added by the ATSC modulator that includes mode indicators and/or training signals for the ATSC receiver adaptive equalizers (e.g., as such it may be full wide band). As may be seen in FIG. 17 the signature lasts 73 μsecs and happens every 24.2 msec.

Figure 18:
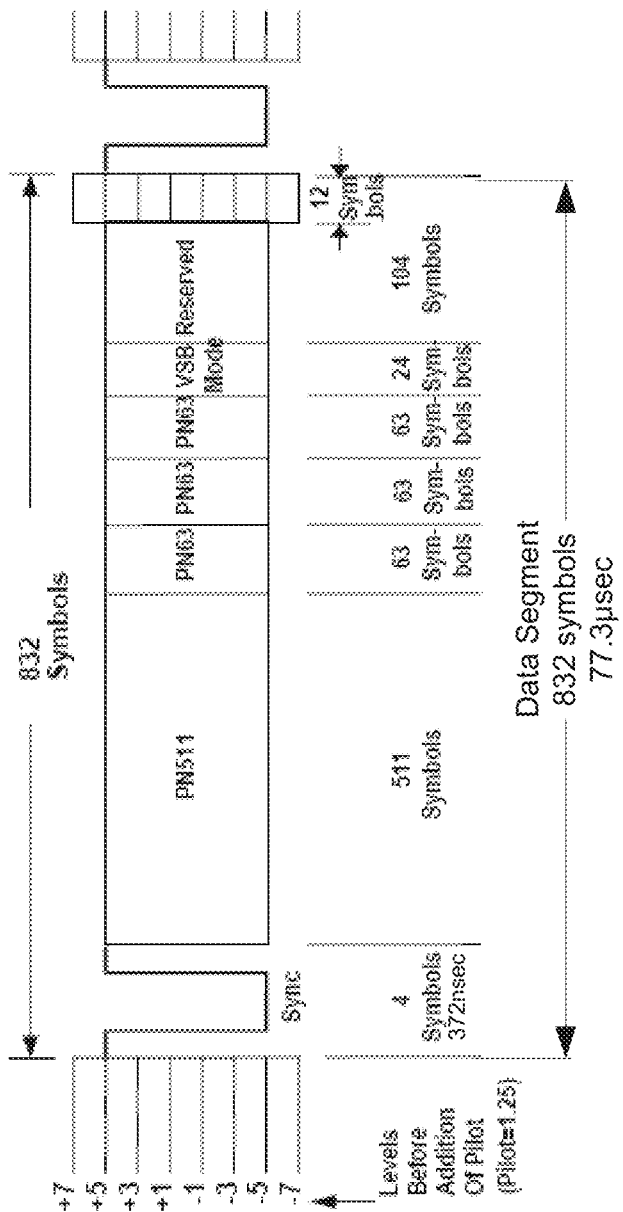
FIG. 18 is a schematic depicting the field sync structure of ATSC signal interference, in accordance with some embodiments of the present invention.

Reference is now made to FIG. 18, which is a schematic depicting the field sync structure, in accordance with some embodiments of the present invention. At the start of each segment there is segment sync. The segment sync is 4 symbols long that all of them are the same VSB symbol—ASK 5 level. The original task of the segment sync is carrier recovery for the TV receivers since it is actually transmitting the CW carrier for duration of 373 nsec. Using the mitigation module and/or systems, methods, apparatus, and/or code instructions described herein, the CW transmission interval may be exploited to recover the carrier in order to compensate the frequency offset. In the data portion of the segment there are 4 pseudo random sequences one of 511 symbols and the other 3 of 63 symbols.

The DTV may be considered an interference signal and mitigated using a matching signature signal, by the mitigation module and/or systems, methods, apparatus, and/or code instructions described herein.

There are two exemplary approaches to compute the signature indicative of the DTV. One approach is to predict the content according the content of the field sync and/or by assuming that the spectrum spillage of the DTV transmitter in the LTE band is due to power of 3 non-linearity of the PA. The second approach is to generate the signature by repetitive acquisition and/or sampling of the signature-field sync at the frequency band of the of the LTE.

The signature prediction approach is based on the observation that since LTE block A of band 12 is adjacent to DTV channel 51 the signature may be drawn from the expected spectrum spillover due to transmitter non-linearity.

Since the spectrum spillover in the adjacent band is produced from the cubic power of the transmitter the signature may be extracted, for example, by applying cubic power on the baseband wave form samples of the 8-VSB field sync that then are applied offline to band pass filtering that match the band of LTE. The baseband signal prior filtering may cover the bandwidth of the main DTV signal plus the adjacent bandwidth in the left of the LTE band 12 block A. band together which is computed as 4.5+5=9.5 MHz.

Figure 19:
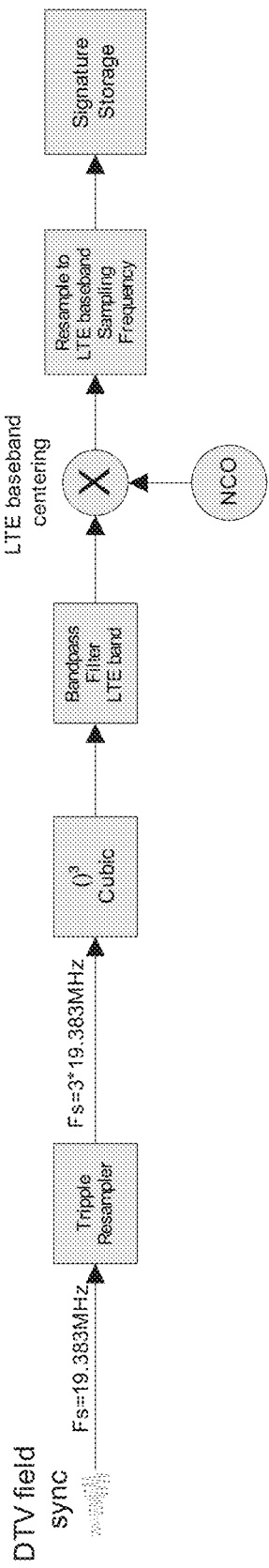
FIG. 19 is a schematic depicting offline processing for computing the signature of the DTV band 51 signal example as it will appear in LTE block A band 12 spectrum, in accordance with some embodiments of the present invention.

Reference is now made to FIG. 19, which is a schematic depicting offline processing for computing the signature of the DTV signal example, in accordance with some embodiments of the present invention.

Figure 20:
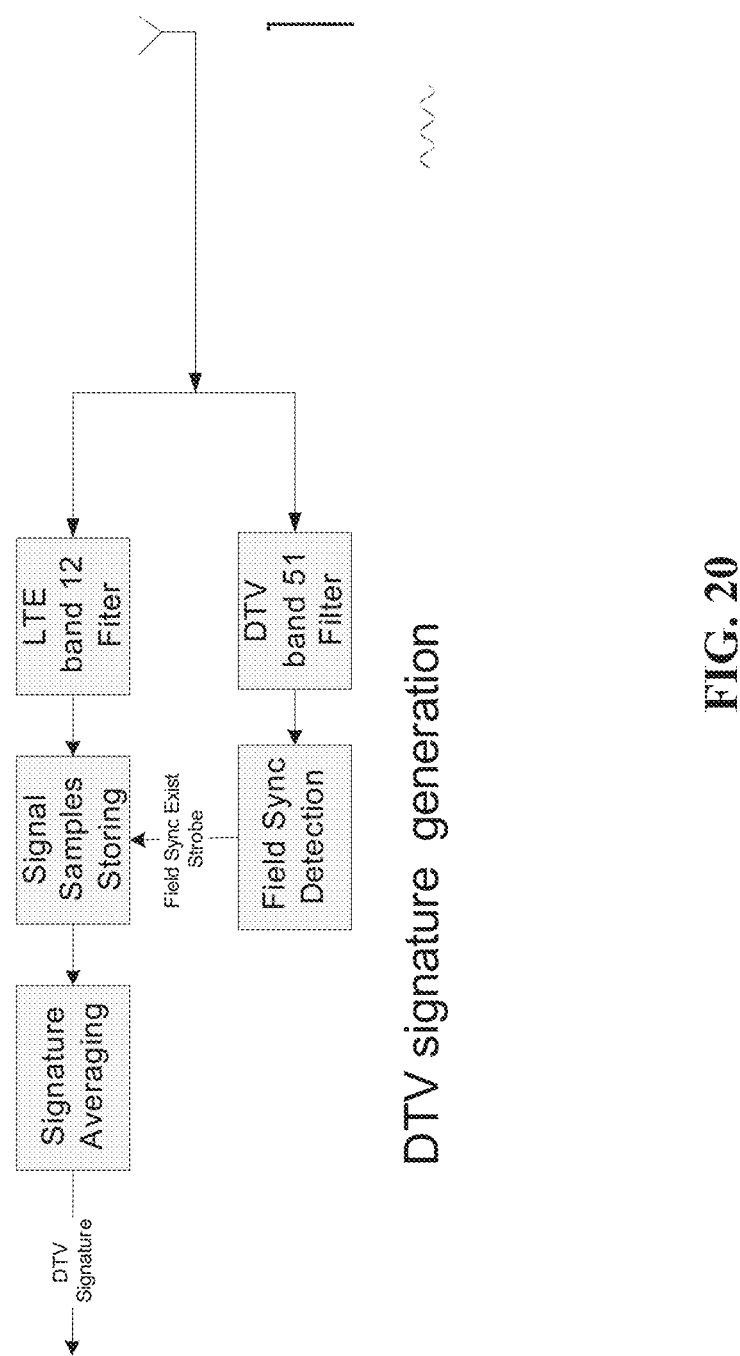
FIG. 20 is a schematic depicting a process for extracting the signature for DTV band51 from the actual received interference signal, in accordance with some embodiments of the present invention.

Reference is now made to FIG. 20, which is a schematic depicting a process for generating the signature for DTV, in accordance with some embodiments of the present invention. The process may include creating the synthetic spill over $3^{rd}$ intermod of the field sync frame as interference mitigation signature for the DTV example.

With the signature generation after acquisition the signature of interference signal is sampled continuously and at the LTE band. The signature sampling may be done (optionally only) while the signature signal is received. The signature existence strobe may be extracted by sampling the DTV signal in its own band and looking for the signature appearance after performing cross correlation in the DTV band. The interference mitigation module may be sufficiently broadband to include the DTV and the LTE band. The signature signal may be extracted after sufficiently averaging the DTV signature in the LTE band to get a reading of the LTE desired signal ingredients.

Since in the LTE band the signature is the actually the third harmonic residuals of the ATSC PA, an exemplary implementation of the mitigation component acquires both the LTE and ATSC band. The acquisition of the DTV band is for timing and frequency synchronization (e.g., in case of signature prediction). The LTE receiver may employ RF duplexing filter that reject the ATSC signal, however since the ATSC signal power reception is usually high it may acquire with sufficient power even if RF duplexing filter attenuates it significantly.

A second exemplary implementation of the interference component and/or systems and/or methods and/or apparatus and/or code instructions described herein relates to LTE downlink interference to LTE uplink channel. LTE downlink interference to LTE uplink channel is another potential of major cross-country interference with the spectrum allocation in 700 MHz in the US and Mexico cross the US-Mexico border. The interference is expected due to the different frequency plans of LTE 700 MHz worldwide. Specifically, there is an overlap in the two frequency plans of band 12-700ac and band 13-700c which were adopted by the USA with band 28-700APT which was adopted by Mexico. The potential interference is from DL to UL of both direction: Band 28-DL from 758 MHz to 803 MHz has potential to interfere partially Band 13 UL from 777 MHz to 787 MHz and band 12-DL from 728 MHz to 746 MHz has potential to interfere band 28-UL from 703 MHz to 748 MHz.

It is noted that the LTE DL interferer may transmit from more than one antenna. Furthermore, the interferer may transmit from dual cross-pol antenna. In case the receiver antenna (that is attached to interference mitigation) has also two dual cross antenna than the receiver will be interfered by two signals in the polarization space but single signal in the spatial space (assuming the spatial null is common to both polarized transmission). The following cases may be predicted: The interference DL-LTE has 2 transmitting antennas in cross-pol. The UL-LTE has 2 receiving antenna in cross-pol. There is no sufficient degrees of freedom to cancel both incoming polarization interferer.

Figure 21:
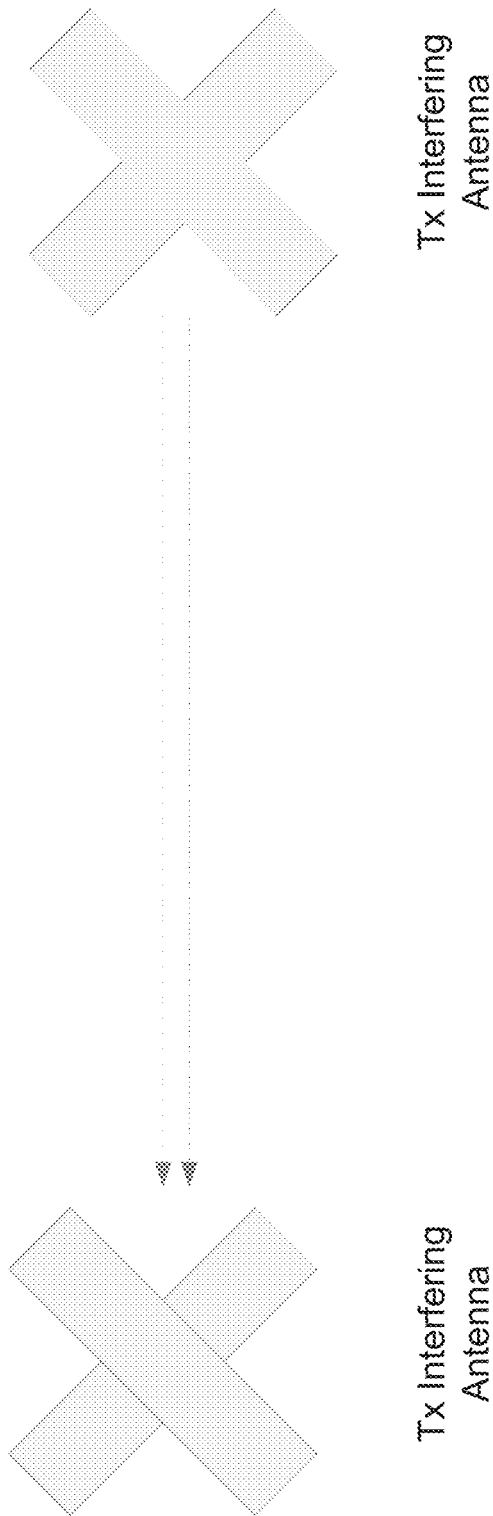
FIG. 21 is a schematic depicting a Dual Antenna of LTE receiver that is interfered by dual antenna interfering DL LTE transmitter, in accordance with some embodiments of the present invention.

Reference is now made to FIG. 21, which is a schematic depicting a Dual Antenna interference mitigation and dual antenna interfering DL, in accordance with some embodiments of the present invention. The interference DL-LTE has 2 transmitting antennas in cross-pol. The UL-LTE has 4 receiving antennas: two cross-pol two spatial configuration.

Interference mitigation may be performed in two stages. In a first stage: Polar cancelation on each cross-pol antenna couple. Each mitigating process may use two sets of mitigation weights calculation separately for each signal transmission. In a second stage: Spatial cancelation of each transmission signal is performed. Mitigation weights may be set according to different signatures at each transmission. In case of LTE-DL the cell specific reference signal (CRS) may be used as the signature. The cell specific CRS may be different for each antenna port.

Figure 22:
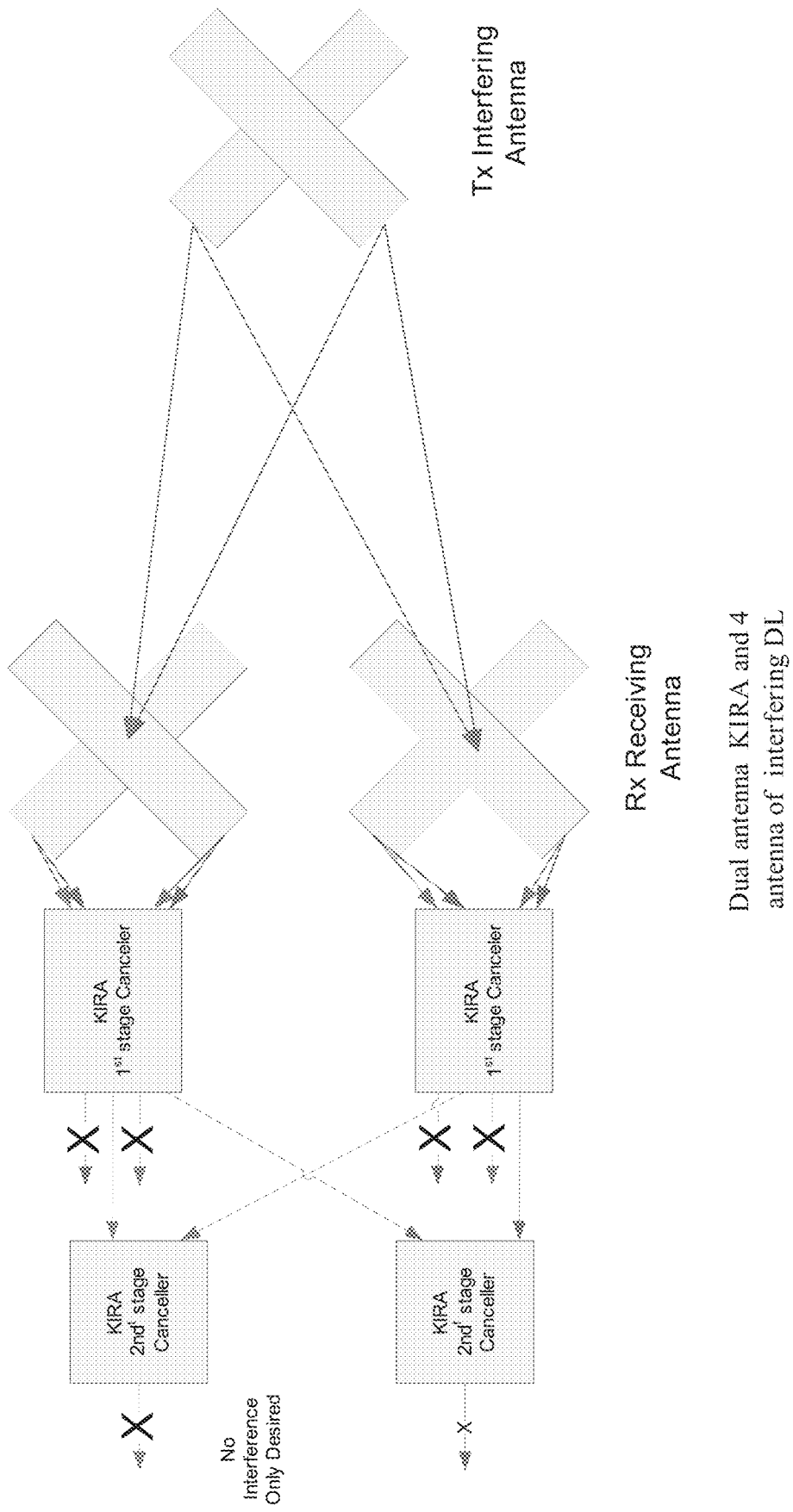
FIG. 22 is a schematic depicting a 4 Antenna of LTE receiver that is interfered by dual antenna interfering DL LTE transmitter, in accordance with some embodiments of the present invention.

Reference is now made to FIG. 22, which is a schematic depicting a mitigation process consuming 2 degrees of freedom in the receiver diversity 2 instead of the original 4, in accordance with some embodiments of the present invention. The interference DL-LTE has 4 transmitting antennas two cross-pol two spatial. The UL-LTE has 4 receiving antennas: two cross-pol two spatial. Mitigation may be done in three stages. In a first stage, four spatial mitigations (all possible antenna selection) on each antenna from the two spatial couples. Each mitigating process may use two sets of weights calculation separate for each cross polar signal transmission. In a second stage, four polar mitigations of the first stage mitigation outputs. In a third state, four polar mitigations of the second stage mitigation output. Mitigation weights may be set according to different signature(s) at each transmission or CRS cell specific for the pertinent port. In case of LTE-DL the cell specific CRS may be used as signature. The cell specific RS are different for each antenna port.

Figure 23:
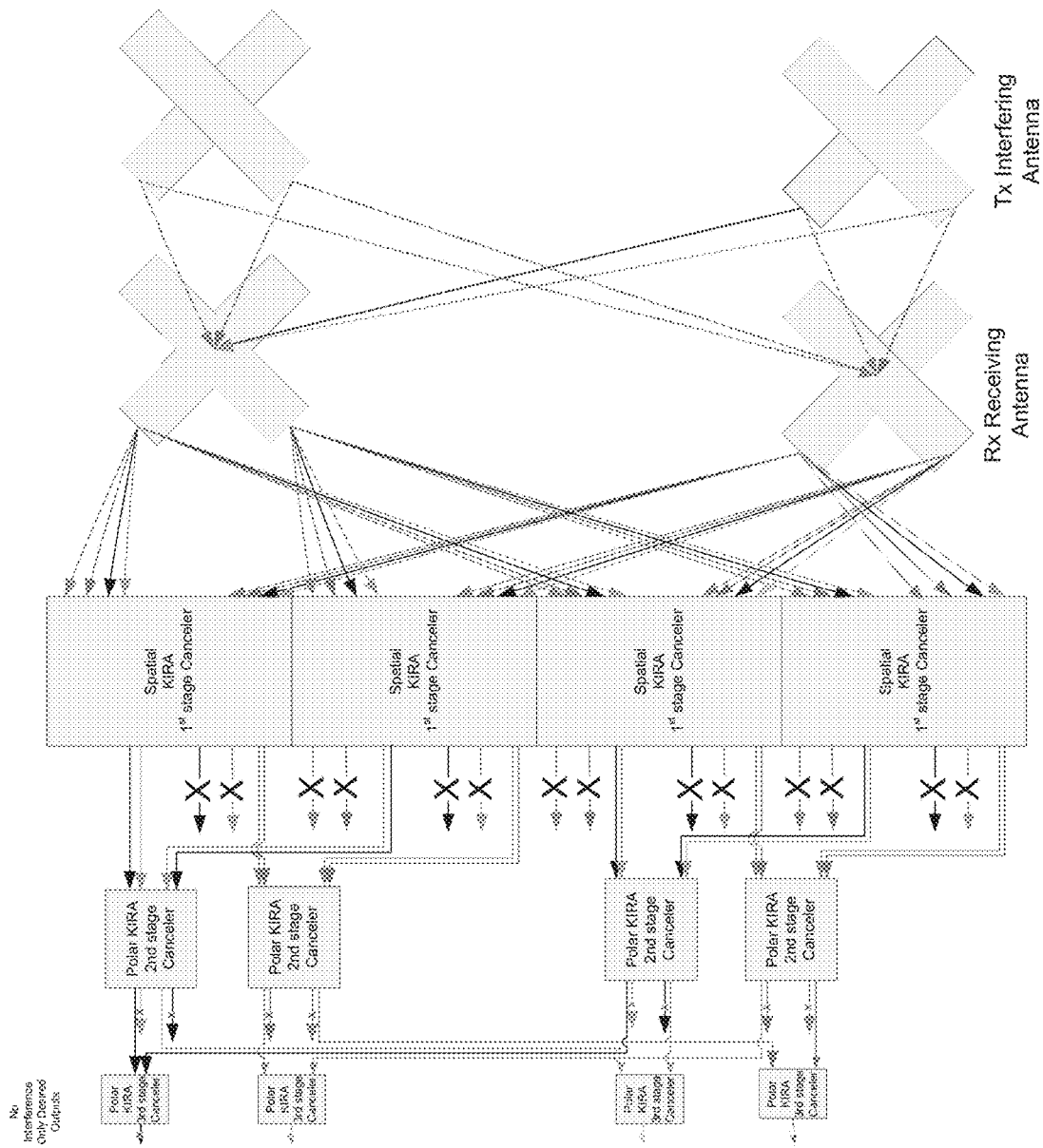
FIG. 23 is a schematic depicting a 4 Antenna of LTE receiver that is interfered by 4 antenna interfering DL LTE transmitter, in accordance with some embodiments of the present invention.

Reference is now made to FIG. 23, which is a schematic depicting a four antenna interference mitigation and four antennas interfering DL, in accordance with some embodiments of the present invention.

Figure 24:
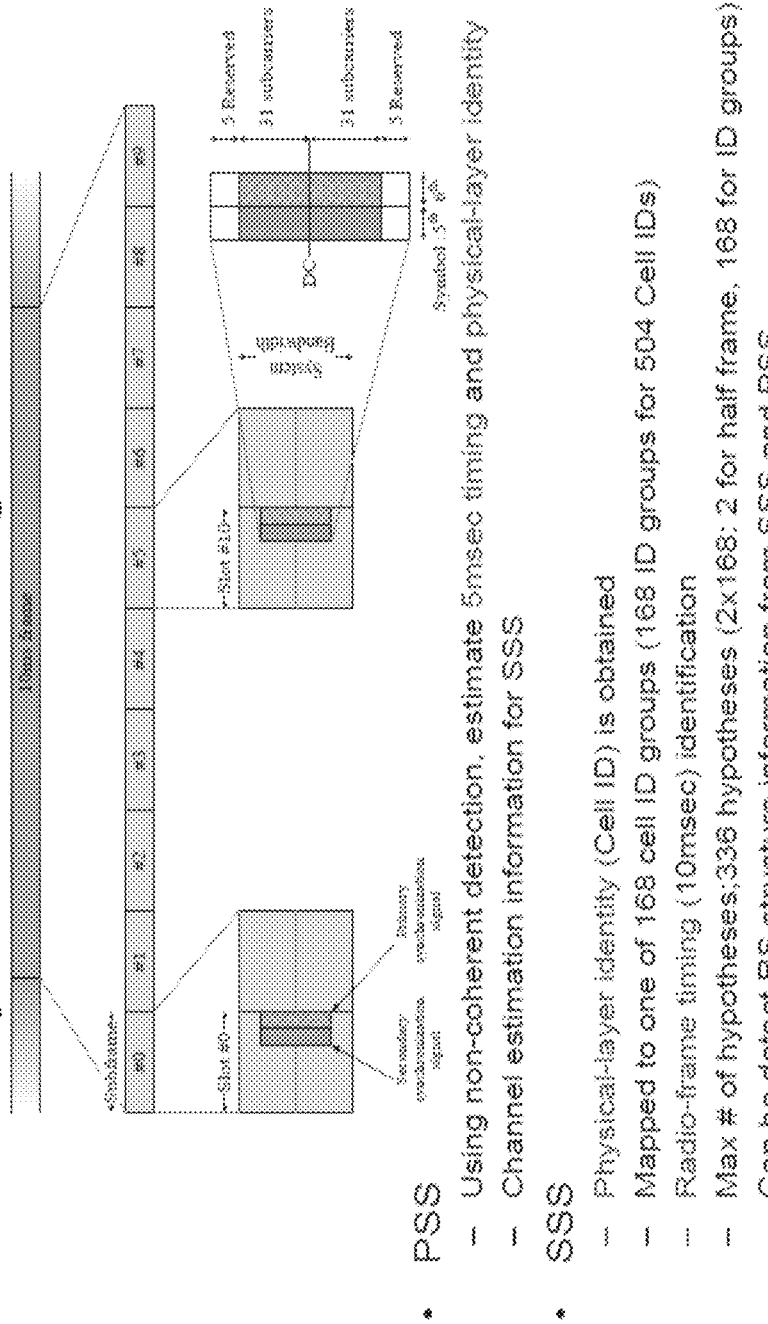
FIG. 24 is a schematic depicting the synchronization signals of the LTE, in accordance with some embodiments of the present invention.

Reference is now made to FIG. 24, which is a schematic depicting the synchronization signals of the LTE, in accordance with some embodiments of the present invention.

An exemplary process for acquisition of the LTE DL interference is now described. The process for acquisition of the LTE DL interference may be to acquire timing and/or to correct the frequency of the stored signature, which may be similar to LTE-DL acquisition of conventional UE. The frequency correction may be implemented, for example, in the same way as it is done in conventional UE with the LTE-DL acquisition and/or cell search process. When the interference mitigation module clock commensurate to the GPS acquired clock and is already known, the LTE-DL interference clock is (e.g., always) commensurate to the GPS acquired clock than the frequency correction is not required—the acquired signature and the stored signature will be always at the same frequency.

Exemplary LTE-DL acquisition stages are:

Searching for PSS (Primary Synchronization Signal) preamble. The search may be done against 3 (or other number of) stored SSS option that are stored in interference mitigation memory. The PSS is depicted in FIG. 24 and has a repetition rate of every 5 mse.

Searching for SSS (Secondary Synchronization Signal) preamble. The search may be done against 168 (or other number of) stored SSS option that are stored in the interference mitigation memory (e.g., signature dataset). The SSS is depicted in FIG. 24 and has a repetition rate of every 5 mse.

From PSS and SSS detection the interference mitigation module may be able to extract the cell ID—one of 504 options (or other number).

The PSS and SSS are transmitted in the central LTE bandwidth (central 62 OFDMA sub-carriers approximately 1 MHz bandwidth). The PSS and SSS is of length of one symbol, approximately 70 μsec.

An exemplary process for PSS detection is now described. The PSS is constructed from a frequency domain Zadoff-Chu (ZC) Sequence of length 63.

There are three PSS sequences in LTE corresponding to the three physical layer identities within each group of cells. The selected roots for the three ZC PSS sequences are M=29,34 and 25 when the frequency domain length-63 sequence for root M is given by:

$$ZC_M^{63}(n) = \exp\left[-j\frac{\pi M n(n+1)}{63}\right] n = 0, 1, \ldots, 62$$

Since detecting the PSS is without any a prior knowledge of the channel, non-coherent detection may be the only choice.

Reference is now made to FIG. 25, which is an equation for computing the preferred detector denoted mM, in accordance with some embodiments of the present invention.

An exemplary process for detecting the SSS is now described. SSS detection may be performed to extract the cell ID–$N_{ID}^{CELL}$. The cell ID may be used to compute the interference mitigation signature. $N_{ID}^{CELL}$ denotes an identifying number of the cell (e.g., out of 504 options) that set the random sequence value of the cell specific reference symbols of the LTE-DL. Alternatively, the self-extraction of the cell ID is not necessarily needed and the $N_{ID}^{CELL}$ value is provided, for example, by the managing software of the interference mitigation module (i.e., pre known in advance).

The SSS sequences may be based on maximum length sequences known as M-sequences which may be created by cycling through every possible state of shift register of length n. This results in sequence of length $2^n+1$.

Each SSS sequence may be constructed by interleaving in frequency domain two length 31 BPSK-modulated secondary synchronization codes.

These two codes may be two different cyclic shifts of a single length 31M-sequence. The cyclic shift indices of the M-sequence may be derived from a function of the Physical Cell Identity (PCI) one out of 168 within 3 groups that were identified by the PSS detection.

The cell ID may be derived from the physical layer identity (after PSS detection) and/or PCI (after SSS detection).

For SSS detection:

The SSS sequences may be based on maximum length sequences, known as M-sequences, which may be created by cycling through every possible state of shift register of length n.

Each SSS sequence may be constructed by interleaving, in frequency domain (FD), row length 31 BPSK-modulated secondary synchronization codes—SSC1 and SSC2.

These 2 codes may be 2 different cyclic shifts of a single length-31 M-sequence.

The cyclic shift indices of the M-sequences may be derived from a function of the PCI group.

The 2 codes may be alternated between the $1^{st}$ and the $2^{nd}$ SSS in each frame. This may enable single shot extracting of frame timing.

For each transmission, SSC2 is scrambled by a sequence that depends on the index of SSC1.

The sequence is than scrambled by a code that depends on the PSS. The scrambling code is one-to-one mapped to PHY layer.

The sequence is reinitialized at the start of each symbol with a value that depends on cell identity which is one of 504 available.

The SSS detection is done after PSS detection.

Channel is estimated from PSS and is used for coherent detection of the SSS.=as follows: The performance of the coherent detector may be degraded when an interfering eNodeB employs the same PSS as target cell, there may be phase distortion in the channel estimation, for low coherent BW of the channel, non coherent detection may be considered.

As the signature of the LTE DL-interference the cell specific reference signal (CRS) may be targeted to be used. As oppose to the DTV case the cell specific RS appear in part of the frequency axis but continue in the time axis. A generator process that produces the signature for the interference cancelation of the current embodiment component continuously or with limited intervals may be used. Optionally, only during the activity of the signature generator, the interference mitigation weights may be calculated.

Each RS pattern may be transmitted from antenna port of the eNodeB in case of MIMO transmission.

An antenna port may be a single physical antenna or as a combination of multiple antenna.

The signal transmitted from each antenna port may be designed not to be interfered from other signals of other antennas.

The UE may derive a channel estimate from all data transmitted at antenna port whether it represent a single radio channel from single antenna or composite channel from multiplicity of physical antenna elements that together comprising antenna port.

The cell-specific RS s enable the UE to estimate the channel for demodulating control channels and/or data in most transmission modes (1 to 6) of the PDSCH.

It may be used for by the UE to generate Channel State Information (CSI) feedback The cell-specific RS s enable the UE to estimate the channel for demodulating control channels and data in most transmission modes (1 to 6) of the PDSCH. It is also used for by the UE the generate Channel State Information (CSI) feedback.

The time domain period is 2 RS symbols in each DL slot (0.5 msec) of 7 symbols (6 in case of extended Cyclic Prefix mode). The frequency domain spacing of the RS is one Reference Element every 6 subcarriers. The reference symbols are staggered in time such that within each RB (resource block) there is one reference element every 3 subcarriers.

Figure 26:
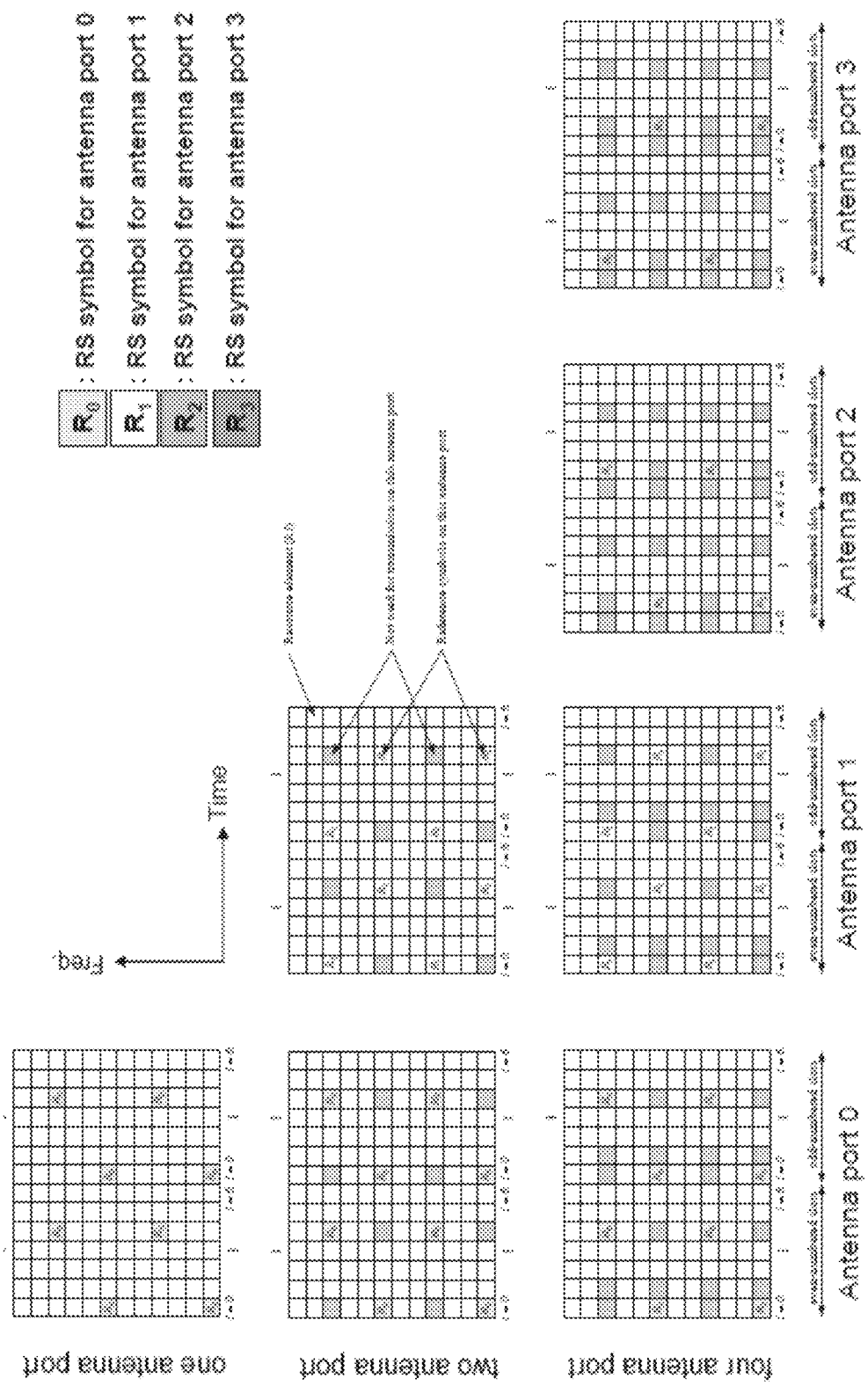
FIG. 26 is a schematic depicting Reference Symbols—RS arrangement in one Resource Block—RB for single antenna, 2 antenna and 4 antenna case, in accordance with some embodiments of the present invention.
Figure 27:
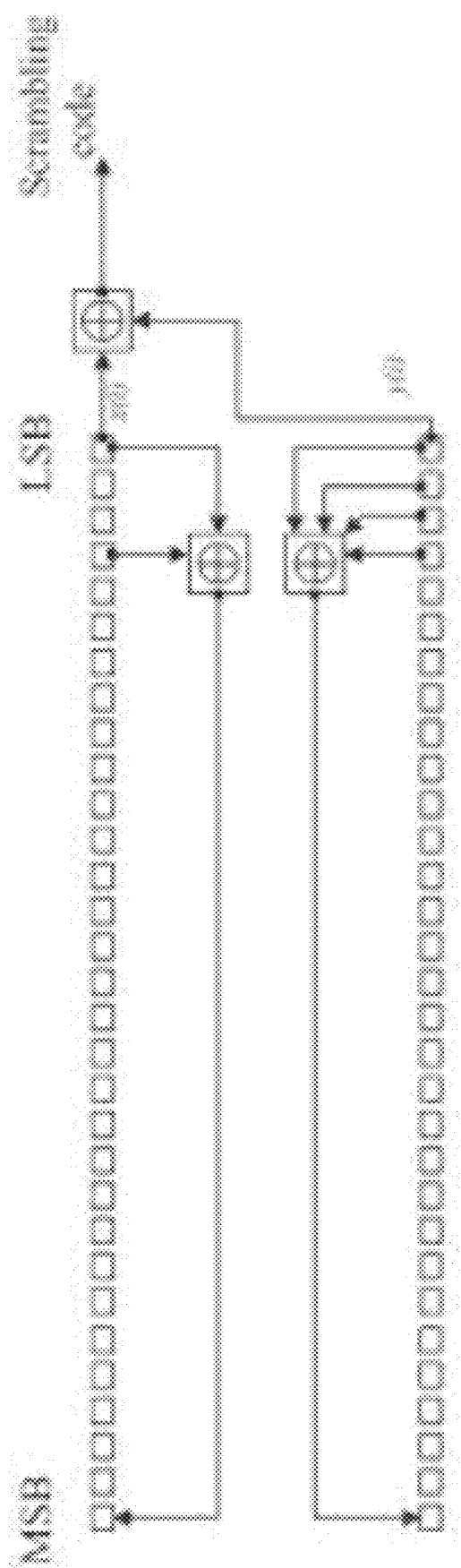
FIG. 27 is a schematic depicting a shift register for producing the random process the modulation of the RS symbols of the cell 31 Gold sequence, in accordance with some embodiments of the present invention.

Reference is now made to FIG. 26, which is a schematic depicting RS arrangement in one RB for single antenna, 2 antenna and 4 antenna case, in accordance with some embodiments of the present invention. All the RSs are QPSK modulated. The signal may be written as:

$$r_{l,n_s}(m) = \frac{1}{\sqrt{2}}[1 - 2c(2m)] + j\frac{1}{\sqrt{2}}[1 - 2c(2m+1)]$$

m—index of RS
$n_s$—slot numberwithin the radio frame
l—symbol no within the time slot
c(i)—pseudu random sequence that is comprised of length—31 Gold sequence Reference is now made to FIG. 27, which is a schematic depicting a shift register for producing the random process of the cell 31 Gold sequence, in accordance with some embodiments of the present invention. The scrambling sequence generator may be reinitialized at the start of each OFDM symbol with the value that depends on cell identity $N_{ID}^{CELL}$. The cell specific RS sequence therefore carries unambiguously one of the 504 different cell identities. A cell specific frequency shift is applied to the patterns of reference shown in FIG. 26, denoted by $N_{ID}^{CELL}$ mode. The shift may help to avoid time specifics RSs from up to 6 adjacent cells. For interference mitigation protecting against 6 LTE-DL interfering base stations may be performed by cascading the cancelation circuit 6 times each with different signatures. The base station may have 6 antenna or more to accommodate the degrees of freedom. The value of $N_{ID}^{CELL}$ may be extracted from the PSS and the SSS signal and/or provided to the interference mitigation module, for example, by an external LTE analyzer.

There are two exemplary options for introducing the interference mitigation module in the protected base station, referred to herein as the unsynchronized case and the synchronized case.

The unsynchronized case refers to a non-LTE protected base station and/or LTE protected base station that is not synchronized the interfering base station.

Figure 28:
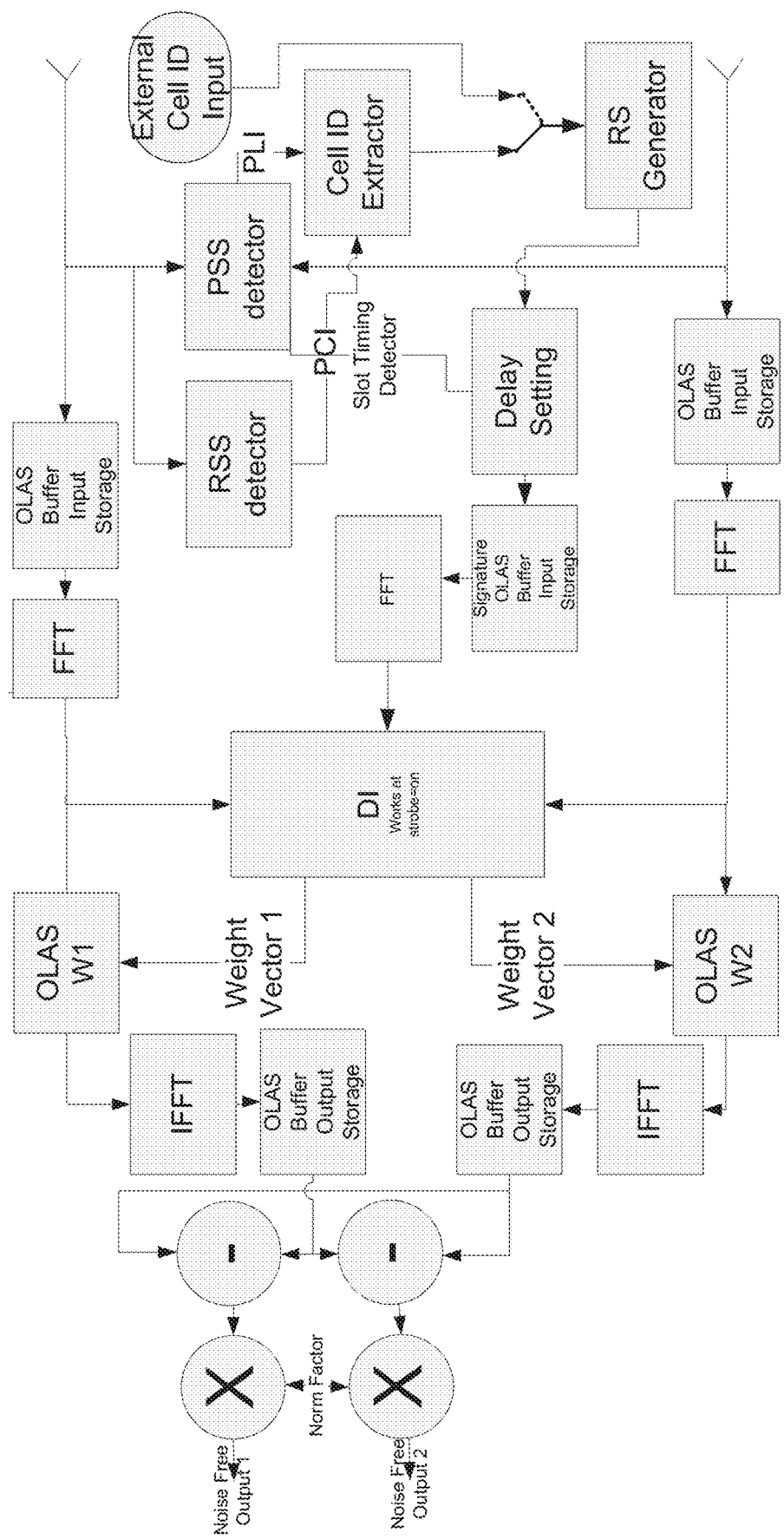
FIG. 28 is a schematic depicting the interference mitigation module processing DL-LTE interference in unsynchronized mode, in accordance with some embodiments of the present invention.

Reference is now made to FIG. 28, which is a schematic depicting the interference mitigation module processing DL-LTE interference in unsynchronized mode, in accordance with some embodiments of the present invention.

The synchronized case concerns the case when one (or several) LTE base stations interfere in their DL to another base station in its uplink (as explained herein). It may be assumed that both interfering and interfered base station are synchronized in frame and symbol timing and with carrier frequency through the GPS. The interference mitigation module may be embedded within the uplink receiver (SC-FDMA in case of LTE). Since the SC-FDMA employ FFT/DFT process the interference mitigation weighting that is aimed to cancel the interfering DL signal may be incorporated after the FFT.

Each DI component may calculate one set of weight vector for the pertinent antenna branch. The signature reference may be implemented by an RS generator that is equal to the RS of the LTE-DL interfering signal. The RS generator may be synchronized to the slot and/or symbol timing of the interfering signal. The RS is in frequency domain so the weight in the DI component is calculated on the subcarriers that are reference element in the DL. After the cancelation weights are calculated by DI and/or LMS for the subcarriers that contain RS the weights for the other FFT bins may be calculated through interpolation/extrapolation in order to complete the weights calculation process for all the SC-FDMA sub.

The specific RS content may be derived in the RS generator from the cell ID that is derived from the PHY indicator and/or the cell indicator out of the PSS and SSS respectively. Alternatively, the Cell ID is provided externally.

Reference is now made to FIG. 29, which is a schematic depicting a block diagram of a SC-FDMA front end receiver with interference mitigation module embedded therein, in accordance with some embodiments of the present invention.

Another example of protecting the LTE-LAA base station receiver against interference from WiFi transceivers using the interference mitigation module and/or systems, methods, apparatus, and/or code instructions described herein is now described. 3GPP promotes LTE usage of unsilenced bands under a new approach that is called LTE-U (LTE-Unlicensed), or LTE-LAA (LTE-License Assisted Access). The interference mitigation module and/or systems, methods, apparatus, and/or code instructions described herein may assist this emerging technology to overcome interference, for example, from local WiFi stations (access or terminal type) toward the LTE-LAA base station. The known preamble may be used by the interference mitigation module, for example, in one implementation using the Legacy Short Training Field (L-STF) and/or the Legacy Long Training Field (L-LTF) training preamble signals of the 802.11N WiFi or similar training fields that are incorporated in older WiFi standards. The interference mitigation module (e.g., that is incorporated within) used with the LTE-LAA base station may mitigate specific WiFi AP (or Aps) that its transceiver is known to be in close proximity to the base station.

In another example, mitigation of passive intermod interference (PIM) using the interference mitigation module and/or systems, methods, apparatus, and/or code instructions described herein is now described. Using known pattern of the interference may help to cancel PIM interference (external and internal). When the pattern that the interference has used is obtained, the $3^{rd}$ order and/or other order of the PIM may be derived for use as the signature and to utilize the interference mitigation module in order to cancel known interference signal which use known pattern(s) that may be distorted by known non-linear conversion.

It is expected that during the life of a patent maturing from this application many relevant interference signals and signature signals will be developed and the scope of the terms interference signals and signature signals are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this present invention may be presented in a range format. It should be understood that the description in range format is merely for convenience and brevity and should not be construed as an inflexible limitation on the scope of the present invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the present invention, which are, for clarity, described in the context of separate embodiments, may also be provided in combination in a single embodiment. Conversely, various features of the present invention, which are, for brevity, described in the context of a single embodiment, may also be provided separately or in any suitable subcombination or as suitable in any other described embodiment of the present invention. Certain features described in the context of various embodiments are not to be considered essential features of those embodiments, unless the embodiment is inoperative without those elements.

Although the present invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A mitigation module for mitigating interference complementing a receiver of a wireless network, the mitigation module comprising:
    at least one processor executing a code for:
        obtaining from a plurality of reception sources, digital baseband signals, each one of the digital baseband signals is received by another one of said plurality of reception sources;
        utilizing a signature signal of an interference signal by:
            matching at least a portion of said interference signature signal to at least a portion of two or more of the baseband signals, the interference signature signal indicative of a presence of interference signals originating from at least one external interference source;
            calculating a plurality of mitigation weights for at least the portion of two or more of the baseband signals corresponding to the matched at least portion of the interference signature signal;
        performing an interference mitigation process on the digital baseband signals received from the plurality of reception sources using the plurality of mitigation weights to generate one or more clean digital baseband signals; and
        providing the clean digital baseband signals to a receiver of the wireless network.

2. The mitigation module of claim 1, wherein the interference mitigation process is performed using the plurality of mitigation weights computed for the at least the portion of the two or more baseband signals corresponding to the matched at least portion of the interference signature signal, on the at least an unmatched portion of the baseband signals unmatched to at least the portion of the interference signature signal, and on the at least portion of the baseband signals matched to at least the portion of the interference signature signal, to generate the one or more clean digital baseband signals.

3. The mitigation module of claim 1, wherein when another portion of the baseband signals is unmatched to at least the portion of the interference signature signal, the plurality of mitigation weights is extrapolated for the another portion and the interference mitigation process is performed using the extrapolated plurality of mitigation weights for the unmatched portion of the baseband signals.

4. The mitigation module of claim 3, wherein a portion of a respective baseband signal that is matched to the at least portion of the interference signature signal comprises at least one frequency band, and another portion of the respective baseband signal that is unmatched to the baseband signals comprises another at least one frequency band, wherein the plurality of mitigation weights are computed for the at least one frequency band of the respective baseband signal that is matched and the plurality of mitigation weights are computed for the another at least one frequency band of the respective baseband signal that is unmatched by extrapolation from the said matched baseband signal frequency band computed plurality of mitigation weights.

5. The mitigation module of claim 3, wherein a portion of a respective baseband signal that is matched to the at least portion of the interference signature signal comprises at least one period of time, and another portion of the respective baseband signal that is unmatched to the baseband signals comprises another at least one period of time, wherein the plurality of mitigation weights are computed for the at least one period of time of the respective baseband signal that is matched and the plurality of mitigation weights are computed for the another at least one period of time of the respective baseband signal that is unmatched by extrapolation from the said matched baseband signal period of time computed plurality of mitigation weights.

6. The mitigation module of claim 5, wherein the portion of the respective baseband signal that is matched to the at least portion of the interference signature signal and the another portion of the respective baseband signal that is unmatched to the baseband signals are occur periodically over respective time-intervals.

7. The mitigation module of claim 6, wherein the plurality of mitigation weights is re-computed or adjusted by a certain factor for each periodic time-interval when the portion of the respective baseband signal is matched to the at least portion of the interference signature signal.

8. The mitigation module of claim 5, wherein the matching of the at least one portion of the interference signature signal to the at least one frequency band of the respective baseband signal is determined by a pertinent complex weight for each respective frequency band that is below a threshold.

9. The mitigation module of claim 1, further comprising storing in a memory a signal according to the interference signature signal, wherein the plurality of mitigation weights is computed based on the memory stored signal; wherein the signal synthetically generated according to the interference signature signal is aligned in time and/or in frequency with the obtained digital baseband signals.

10. The mitigation module of claim 9, wherein the aligned is performed based on an acquisition of a carrier frequency offset and timing of the matched portion of a respective baseband signal denoting interference signals and recovering a carrier frequency and rate of symbol and frame clock of the matched portion of the respective baseband signal denoting interference signals.

11. The mitigation module of claim 1, wherein matching the at least the portion of the signature to the at least the portion of the baseband signals is computed by a frequency offset correction for compensating a frequency difference between a frequency of the interference signature signal and a frequency of the digital baseband signals.

12. The mitigation module of claim 1, wherein the at least portion of the interference signature signal indicative of the presence of interference signals is computed by an analysis of the digital baseband signals, by identifying a common repetitive signal pattern in a plurality of sequential time intervals of the baseband signals.

13. The mitigation module of claim 1, further comprising computing a correlation between the plurality of mitigation weights for computing an estimate of an error of each respective mitigation weight, and performing the interference mitigation process when the correlation is above a threshold indicative of similarity of error for the plurality of mitigation weights, and not performing the mitigation process when the correlation is below the threshold.

14. The mitigation module of claim 1, wherein the baseband signals including a plurality of interference signals each associated with a certain interference signature signal of a plurality of interference signature signals, iterating the matching, the calculating the plurality of mitigation weights, and the performing the interference mitigation process for another of the plurality of different interference signature signals.

15. The mitigation module of claim 1, wherein the plurality of reception sources comprises a first and a second antenna, and a clean digital baseband signal is computed by subtracting from a direct baseband signal obtained from the first antenna, a weighted signal computed from the plurality of mitigation weights for the second antenna.

16. The mitigation module of claim 1, wherein the at least one portion of a same interference signature signal is matched to each one of a plurality of digital baseband signals respective received from the plurality of reception sources, and a set of the plurality of mitigation weights is computed for each one of the plurality of reception sources.

17. The mitigation module of claim 1, wherein the baseband signals include interference signals originating from a single source, diversity of the plurality of sources is preserved when a weighted frequency domain frequency bin of a respective baseband signal obtained from a certain reception source of the plurality of reception sources, and an output of a couple from a pair of reception sources the plurality of reception sources is a sum of outputs of the couple, where weighted outputs are arranged as couples where each weighted output participates in two pairs of reception sources.

18. The mitigation module of claim 1, wherein the number of reception source inputs into the mitigation module is higher than the number of signal outputs to the baseband receiver, wherein the number of interference signals is less than or equal to the number of reception source inputs into the mitigation module minus one, wherein there are sufficient degrees of freedom to perform the interference mitigation and to preserve inherent diversity gain.

19. The mitigation module of claim 1, wherein the interference signals comprise foreign signals that are received by a certain receiver of the wireless network and are not transmitted by a wireless transmitter that is part of the wireless network.

20. The mitigation module of claim 1, wherein said interference signature signal is a pre-known interference signature signal.

21. The mitigation module of claim 1, wherein said interference signature signal is an interference signature signal extracted from the obtained digital baseband signals.

22. A method for mitigating interference complementing a receiver of a wireless network, comprising:
   obtaining from a plurality of reception sources, digital baseband signals, each one of the digital baseband signals is received by another one of said plurality of reception sources;
   utilizing a signature signal of an interference signal by:
   matching at least a portion of said interference signature signal to at least a portion of two or more of the baseband signals, the interference signature signal indicative of a presence of interference signals originating from at least one external interference source;
   calculating a plurality of mitigation weights for at least the portion of two or more of the baseband signals corresponding to the matched at least portion of the interference signature signal;
   performing an interference mitigation process on the digital baseband signals received from the plurality of reception sources using the plurality of mitigation weights to generate one or more clean digital baseband signals; and providing the clean digital baseband signals to a receiver of the wireless network.

23. A computer program product for mitigating interference complementing a receiver of a wireless network, comprising:
- a non-transitory memory having stored thereon a code for execution by at least one hardware processor adapted to execute the code for:
  - obtaining from a plurality of reception sources, digital baseband signals each one of the digital baseband signal is received by another one of said plurality of reception sources;
  - utilizing a signature signal of an interference signal by:
  - matching at least a portion of said interference signature signal to at least a portion of two or more of the baseband signals, the interference signature signal indicative of a presence of interference signals originating from at least one external interference source;
  - calculating a plurality of mitigation weights for at least the portion of two or more of the baseband signals corresponding to the matched at least portion of the interference signature signal;
  - performing an interference mitigation process on the digital baseband signals received from the plurality of reception sources using the plurality of mitigation weights to generate one or more clean digital baseband signals; and
  - providing the clean digital baseband signals to a receiver of the wireless network.

\* \* \* \* \*